(12) United States Patent
Chen et al.

(10) Patent No.: US 9,538,483 B2
(45) Date of Patent: Jan. 3, 2017

(54) MAXIMIZING EFFICIENCY OF MULTI-USER COMMUNICATIONS NETWORKS

(71) Applicant: The Regents of the University of Colorado, a body corporate, Denver, CO (US)

(72) Inventors: Lijun Chen, Arcadia, CA (US); Xing Li, Boulder, CO (US); Youjian Liu, Westminster, CO (US)

(73) Assignee: The Regents of the University of Colorado, A Body Corporate, Denver, CO (US)

( * ) Notice: Subject to any disclaimer, the term of this patent is extended or adjusted under 35 U.S.C. 154(b) by 0 days.

(21) Appl. No.: 14/488,028

(22) Filed: Sep. 16, 2014

(65) Prior Publication Data
US 2015/0146646 A1  May 28, 2015

Related U.S. Application Data

(60) Provisional application No. 61/909,213, filed on Nov. 26, 2013.

(51) Int. Cl.
*H04W 52/24* (2009.01)
*H04B 17/391* (2015.01)
*H04W 52/34* (2009.01)

(52) U.S. Cl.
CPC ......... *H04W 52/243* (2013.01); *H04B 17/391* (2015.01); *H04W 52/346* (2013.01)

(58) Field of Classification Search
CPC .. H04L 5/0073; H04B 17/391; H04W 52/243; H04W 52/346
See application file for complete search history.

(56) References Cited

U.S. PATENT DOCUMENTS

| | | | |
|---|---|---|---|
| 2005/0101259 A1* | 5/2005 | Tong | H04B 7/0417 455/69 |
| 2007/0218950 A1* | 9/2007 | Codreanu | H04W 52/146 455/562.1 |
| 2012/0281569 A1* | 11/2012 | Yamamoto | H04L 1/1893 370/252 |
| 2012/0314665 A1* | 12/2012 | Ishida | H01Q 21/28 370/329 |
| 2013/0272170 A1* | 10/2013 | Chatterjee | H04W 28/02 370/280 |

(Continued)

*Primary Examiner* — Redentor Pasia
(74) *Attorney, Agent, or Firm* — Marsh Fischmann & Breyfogle LLP; Daniel J. Sherwinter

(57) ABSTRACT

Systems and methods are described for jointly optimizing communications in a multi-user network to maximize the weighted sum-rate of its data links. For example, embodiments seek to maximize overall link transmit rates, while minimizing link interference and/or noise in general multi-in multi-out (MIMO) interference networks having multiple interfering data links, each with one or more antennas at the transmitter and receiver. Novel algorithmic approaches, including an "iterative minimax" approach and a "dual link" approach, are described for solving the weighted sum-rate maximization in a manner that converges quickly and reliably on an optimal point. Some embodiments implement these approaches in a centralized transmission controller, while others implement these approaches in a distributed fashion.

20 Claims, 21 Drawing Sheets

(56) References Cited

U.S. PATENT DOCUMENTS

2014/0113638 A1* 4/2014 Zhang ................... H04W 16/18
455/446
2015/0105067 A1* 4/2015 Valliappan ........ H04W 74/0808
455/424

* cited by examiner

MAXIMIZING EFFICIENCY OF MULTI-USER COMMUNICATIONS NETWORKS

FIELD

Embodiments relate generally to communications networks, and, more particularly, to optimization of communications in multi-user communications networks.

BACKGROUND

Many typical wireless communications networks include multiple transmitters and multiple receivers desiring to communicate at the same time over the same frequencies (e.g., according to communications standards, such as CDMA 2000, UMTS, LTE, 802.11, etc.). For example, a typical cellular environment can have many base stations communicating with many cellular devices (e.g., phones); and a typical WiFi environment can have multiple WiFi access points communicating with multiple users (e.g., laptops, smart phones, etc.). In such communications networks, there are multiple communications links between transmitters and receivers, and each of those links can potentially interfere with others of those links. Interference and noise in such environments can limit the effective capacity of the communications network. For example, receivers can experience packet loss and bit errors, etc.; and transmitters can be forced to re-send data, send data using more robust schemes (which may use more bandwidth and lower the effective capacity), etc.

To exacerbate these issues, as mobile data communications have dramatically increased, a number of proposed approaches have suggested reducing cell sizes and increasing base station/access point density. Typically, the path loss versus distance curve is flatter at shorter distances and steeper at relatively long distances. As a result, the inter-cell interference can become significant as the cell size/coverage area shrinks. Therefore, joint transmit signal design for interference networks is a key technology for the next generation wireless communication systems. In particular, it can be desirable to maximize the capacity of the network (e.g., the transmission rate) by coordinating and minimizing the interference experienced by the communication links.

BRIEF SUMMARY

Among other things, embodiments are described herein for maximizing efficiency in terms of certain utility functions in multi-user communication networks. As the maximization of most practically useful utility functions can be decomposed to include the weighted sum-rate maximization as an important middle step, embodiments focus on weighted sum-rate maximization. The rates in weighted sum-rate are the communication rates of multiple data links in a wireless communication network. It should be understood that the invention can be applied for numerous other utility functions. For example, embodiments seek to maximize weighted sum-rate in general multi-in multi-out (MIMO) interference networks, where each transmitter or each receiver may have single or multiple antennas; multiple transmitters transmit signals at the same time and in the same frequency band; a transmitter may have wireless data links to multiple receivers and a receiver can have wireless data links from multiple receivers. Therefore, at a receiver, for each data link, there can be interference from undesired transmitters. Some novel methods are described for solving the weighted sum-rate maximization in a network in a manner that converges quickly and provably to an optimal point monotonically. Some such novel approaches herein (referred to herein as "iterative minimax" approaches) can operate on multiple linear constraints (e.g., to design or control a network in which each antenna on each transmitter is associated with its own power constraint) and can reformulate the weighted sum-rate maximization as an equivalent max-min problem by treating the interference-plus-noise covariance matrix definition as a constraint. Such approaches can construct an extended difference of the log-determinant function, and can apply matrix analysis techniques from robust control to establish an explicit saddle point solution for the Lagrangian of the equivalent max-min optimization. When the explicit solution is applied to the optimal dual variable, the Lagrangian duality of the equivalent max-min problem can provide an elegant way to establish the sum-rate duality between the interference network and its reciprocal. The resulting approach can have fast and provable convergence. Other novel approaches herein (referred to herein as "dual link" approaches) can provide fast and provable convergence by exploiting the optimal transmit signal structure for the general MIMO network in context of a single constraint (e.g., a total power constraint for all the transmitters in the network). For example, a term can be identified in the polite water-filling structure, which is equal to the reverse link signal covariance of the dual network at a stationary point. Solving first-order conditions of the weighted sum-rate maximization problem can reduce the optimal transmit signal to the water-filling structure for the MIMO parallel channels in a manner that can be used directly to alternatively update the forward link and reverse link signal covariance matrices. Some embodiments implement these multiple constraint and single constraint approaches in a centralized transmission controller, while others implement these approaches in a distributed fashion.

BRIEF DESCRIPTION OF THE DRAWINGS

The present disclosure is described in conjunction with the appended figures.

Figure 1:
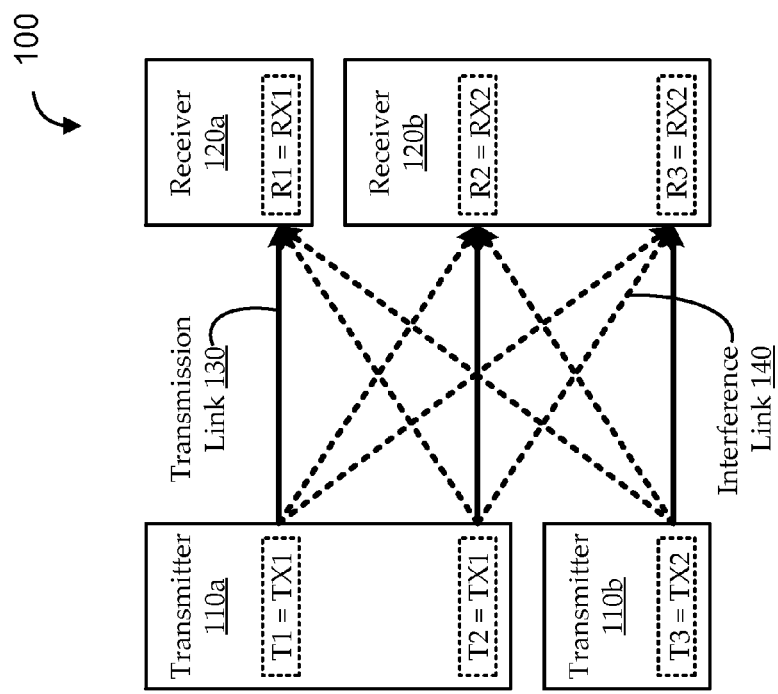
FIG. 1 shows an illustrative network with multiple data links as a context for various embodiments described herein.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention.

Many typical wireless communications networks include multiple transmitters and multiple receivers desiring to communicate at the same time over the same frequencies. For example, a typical cellular environment can have many base stations communicating with many cellular devices (e.g., phones); and a typical WiFi environment can have multiple WiFi access points communicating with multiple users (e.g., laptops, smart phones, etc.). In such communications networks, there are multiple communications links between transmitters and receivers, and each of those links can potentially interfere with others of those links. Interference and noise in such environments can limit the effective capacity of the communications network. For example, receivers can experience packet loss, bit errors, etc.; and transmitters can be forced to re-send data, send data using more robust schemes (which usesmore bandwidth and lowers the effective capacity), etc. Thus, it can be desirable to maximize the capacity of the network (e.g., the transmission rate) while minimizing the interference experienced by the communications links.

Comparing such an environment to people having conversations in a small, crowded room, each set of conversants can, for example, choose to: talk regardless (e.g., at the same time and volume) of others; or take turns to talk (e.g., by coordinating with other conversant). Most typical wireless networks operate in much the same manners. For example, some wireless networks (e.g., so-called "identity covariance" networks) opeate similarly to the first approach by allowing communications links to operate regardless of noise and/or interfefrence from other links. Some other wireless networks (e.g., time division multiple access (TDMA) networks) opeate similarly to the second approach by using protocols or other techniques to assign communications of certain links to respective time slots to avoid interference.

A third approach is to use some mechanism to direct the signal more effectively to the intended receivers while minimizing the interference to others. Embodiemnts described herein use such a third approach. Such an approach can effectively address both the interference and/or noise issues associated with the first approach (e.g., with all links communicating simultaneously over the same frequencies) and the capacity issues associated with the second approach (e.g., with each link being restricted to communicate only during designated time slots).

Varous implementations seek to jointly optimize transmit signals of all transmitters in the network to maximize the weighted sum-rate of the data links for the MIMO B-MAC network, assuming Gaussian transmit signal and availability of channel state information. This can be considered as typifying a class of problems that are key to the next generation of wireless communication networks, in which interference is a primary limiting factor, as described above. For example, maximizing the weighted sum-rate of the data links can correspond to maximizing the capacity of those links to communicate data. The maximization problem can be intuitively described in terms of maximizing overall link transmit rates (e.g., which can relate to a signal covariance), while minimizing link interference (e.g., which can relate to an interference-plus-noice covariance).

The weighted sum-rate maximization, which aims to maximize the weighted sum-rate of all users or data links in a network, is an important problem that serves as a basis for many resource management and network design problems. Some traditional approaches include classical results like the water-filling structure for parallel Gaussian channels, and more recent results, like the iterative weighted MMSE algorithm and polite water filling algorithm for MIMO interference channels. The weighted sum-rate maximization is, in general, a highly non-convex and non-deterministic Polynomial-time (NP) hard problem, such that, despite its importance and long history, it remains open for general channels/networks.

Embodiments consider the weighted sum-rate maximization in a general MIMO interference network that consists of a set of interfering data links, each equipped with multiple antennas at the transmitter and receiver. A MIMO interference network (e.g., also called "MIMO B-MAC" or "MIMO IBC") can include broadcast channels, multiple access channels, interference channels, small cell networks, and many other practical wireless networks as special cases. Implementations address a weighted sum-rate maximization with general linear power covariance matrix constraints, assuming a Gaussian transmit signal, Gaussian noise, and the availability of channel state information at the transmitter. Such problems typify a class of problems that can be considered highly important to next generation wireless communication networks, where interference can be an appreciably limiting factor.

Various solution approaches have been proposed for the weighted sum-rate maximization in the MIMO interference network or its special cases. Such approaches can generally be classified into three categories. One category exploits the relation between the mutual information and the minimum mean square error (MMSE), and solves the weighted sum-rate maximization based on the weighted MMSE (WMMSE). The WMMSE can transform the weighted sum-rate maximization into an equivalent weighted sum-MSE cost minimization problem, which can typically have three sets of variables, so as to be convex when any two variable sets are fixed. With the block coordinate descent technique, the WMMSE algorithm is guaranteed to converge to a stationary point, though the convergence is observed in simulations to be slower than the PWF algorithm.

Another category exploits the water-filling structure or its variants at the optimum to solve iteratively for so-called Karush—Kuhn—Tucker (KKT) conditions (i.e., first-order necessary conditions nonlinear programming optimization under satisfaction of particular regularity conditions). For example, some such approaches use the so-called "polite water-filling (PWF) algorithm" for the MIMO B-MAC network. The PWF algorithm is based on the identification of a polite water-filling structure that the optimal transmit signal possesses. It is an iterative algorithm with the forward link polite water-filling, followed by the virtual reverse link polite water-filling. Because it takes advantage of the optimal signal structure, the PWF algorithm has nearly the lowest complexity and the fastest convergence when it converges. For instance, it converges to the optimal solution in half iteration for parallel channels. However, the convergence of the traditional PWF algorithm is typically only guaranteed for the special case of interference tree networks, and it may oscillate under certain strong interference conditions.

Another category is based on an iterative convex approximation, which, at each iteration, linearizes the non-convex term around the point from the previous iteration. Many of the resulting algorithms are effectively meta-algorithms that involve solving a large convex optimization problem at each iteration, which can incur high computational complexity. Further, some such algorithms tpically do not provide guaranteed convergence.

Some embodiments described herein provide a novel approach to the weighted sum-rate maximization in the MIMO interference network, and apply a novel and efficient algorithm with guaranteed monotonic convergence as well as an elegant way to establish rate duality between an interference network and its reciprocal. Some implementations can reformulate the weighted sum-rate maximization as an equivalent max-min problem, by treating the interference-plus-noise covariance matrix definition as a constraint. Such implementations can then construct an extended difference of the log-determinant function, and can apply matrix analysis techniques from robust control to establish an explicit saddle point solution for the Lagrangian of the equivalent max-min optimization. When the explicit solution is applied to the optimal dual variable, the Lagrangian duality of the equivalent max-min problem can provide an elegant way to establish the sum-rate duality between the interference network and its reciprocal.

Some embodiments include a novel algorithm suggested by the explicit saddle solution, referred to herein as the "iterative minimax algorithm," for the weighted sum-rate maximization. The design and the convergence proof of the algorithm can use only general convex analysis. Still, they can apply and extend to other max-min problems, where the objective function is concave in the maximizing variables and convex in the minimizing variables, and the constraints are convex. Accordingly, they can provide a general class of algorithms for such optimization problems.

The novel iterative minimax algorithm can derive largely from an explicit saddle point solution for the Lagrangian of certain max-min optimization. Such explicit solutions have previously been identified for the case where the matrices involved are all square and invertible. However, some implementations described herein can establish the explicit solution for any general matrices, as long as the objective function is well-defined in a proper sense.

Notably, the iterative minimax approach can provide a general approach for networks having multiple linear constraints. For example, using such an approach, a network can be designed in which each antenna on each transmitter is associated with its own power constraint. In addition to such an approach, some embodiments described herein provide an approach for a special case in which a network is designed with a single, total power constraint. For example, under such a constraint, the total power from all the transmitters added together is constrained to be less than or equal to a predetermined maximum total power. This additional novel approach is referred to herein as a "dual link" approach.

The dual link approach can provide fast and provable convergence by exploiting the optimal transmit signal structure for the general MIMO B-MAC network. For example, a term can be identified in the polite water-filling structure, which is equal to the reverse link signal covariance of the dual network at a stationary point. Solving the KKT conditions of the weighted sum-rate maximization problem can reveal that the optimal transmit signal has the polite water-filling structure, which can reduce to the well known water-filling structure for the MIMO parallel channels. Instead of using this key finding to solve the KKT conditions, some implementations use it directly to alternatively update the forward link and reverse link signal covariance matrices. Numerical experiments performed by the inventors have demonstrated that such implementations could be a few iterations or more than ten iterations faster than the WMMSE algorithm, depending on the desired numerical accuracy. It is noted that being faster, even by a few iterations, can be significant in a distributed implementation, where the overhead associated with each iteration can cost significant signaling resources between the transmitters and the receivers. Indeed, such implementations can be highly scalable and suitable for distributed implementation with distributed channel estimation, for example because, for each data link, only its own channel state and the aggregated interference plus noise covariance needs to be estimated, regardless of the number of potential interferers.

It is worth noting that, while the description herein focuses largely on a centralized approach, similar techniques can be applied to a distributed approach. Further, as the proof of monotonic convergence of an underlying algorithm is shown herein using only very general convex analysis (and a particular scaling invariance property for the weighted sum-rate maximization problem), the proof and associated scaling invariance are expected to hold for many non-convex problems in communication networks that involve the rate or throughput maximization.

For the sake of illustration, consider the single total power constraint, which limits the total power of multiple transmitters. In each transmitter, the information bearing message, which is often represented by a binary sequence, is mapped to a sequence of complex vector signals. The dimension of a vector is equal to the number of transmit antennas. Each complex number in the vector is modulated and transmitted on one of the antennas. Because the message is considered as a random variable, the sequence of vector signals is a vector random process. If the mapping makes the random vectors having a zero mean Gaussian distribution with certain convariance matrix, the data rate can be maximized. An embodiment of the invention includes a central controller that designs the convariance matrices jointly and sends each covariance matrix to its corresponding transmitter along with a target data rate. Then each transmitter uses the data rate and the covariance matrix to map information message to transmit signal vector. An example of the mapping is to use the eigen-vectors and square root of the eigenvalues of the given covariance matrix to form a precoding matrix to produce the signal vectors. The central controller can use channel state information collected from receivers to jointly and intelligiently design the covariance matrices so that the transmit signals from multiple transmitters can coordinate the interference and achieve (local) maximum wegithed sum-rate. The channel state information of a data link is a matrix, the dimension of which being the number of the receive antennas of the receiver of this data link by the number of transmit antennas of of the transmitter of this data link. Such channel state information can be estimated at a receiver and feed back to the central controller. Such an approach can be implemented in a central transmit controller as an embodiment of the dual link approach, as described more fully below. For example, such a dual link approach can use the channel state information to generate the covariance matrices needed for the transmitters and can iteratively update and normalize them to concurrently improve the weighted sum-rate of all users and maintain the total power constraint.

For the sake of further illustration, a distributed implementation of a dual link approach is described. The above centralized dual link approach involves a central controller in the network gathering channel information, jointly designing the transmit covariance matrices for all the transmitters, and sending the calculated results to the transmitters. This can involve a lot of information exchange among transmitters, receivers, and the central controller. These overheads will grow exponentially with the number of users in the network and can greatly lower the efficiency of the actual data transmission. Thus, a corresponding distributed embodiment can be implemented without a central controller, which can significantly reduce overheads. The distributed approach can take advantage of the iterative nature of the dual link approach, and can use properly designed training sequences to pass information between transmitters and receivers. By estimating the training sequences for needed information and calculating their own covariance matrices locally at each transmitter and receiver, the distributed dual link approach can avoid extensive matrices messages exchange and achieve similar performance without a centralized controller. Particularly, in TDD networks (time division duplexing networks, in which forward and reverse links use the same frequency and communicate in different times), the channel reciprocity can simplify the design of the training sequences because reverse-link training sequences can be physically transmitted, and the channels can have done the summation of the signals "for free," regardless of the number of users. In FDD networks (frequency division duplexing networks, in which the forward and reverse links use different frequencies and communicate in the same times), it can be important to properly design the reverse-link training sequences to pass covariance information. Such distributed implementations are described more fully below.

For the sake of even further illustration, consider a network with multiple linear constraints, where, for example, each individual constraint may correspond to the total power budget of a certain subgroup of data links. For such networks, an embodiment of the iterative minimax approach can be implemented with a central controller, which can operate in a similar way to the central controller for the network with a single total power constraint described in the above (i.e., the centralized dual link approach). Unlike in the dual link approach, the central controller of the iterative minimax approach, after calculating power covariance matrices, can determine a normalization factor used to normalize the power covariance matrices (and thus beam-forming matrices) to meet power constraints. This normalization factor can be determined efficiently, for example, by a bisection method. Other emdodiments can include a distributed implementation of the iterative minimax approach, which can operate in a similar way to the network with a single total power constraint described in the above (i.e., the distributed dual link approach), except that a message passing procedure can be used to facilicate calculation of the normalization factor in a distributed manner.

For initial context, FIG. 1 shows an illustrative B-MAC network 100 with multiple data links. Each data link is shown originating at a transmitter 110 and ending at a receiver 120. In some implementations, the "transmitter" and "receiver" designations are intended for a particular transaction, as their roles can switch when communicating data in the opposite direction. It is assumed that the transmitters 110 and receivers 120 desire to communicate at substantially the same time over substantially the same frequencies. Accordingly, a particular communication between a transmitter-receiver pair can be affected by interference and/or noise from other communications by other transmitter-receiver pairs. This phenomenon is illustrated by showing transmission links 130 with solid lines and interfering links 140 with dashed lines. For example, three communications are shown. A first communication is from transmitter 110a to receiver 120a, a second communication is from transmitter 110a to receiver 120b, and a third communication is from transmitter 110b to receiver 120b. Each of these communications is shown as interfering with each of the other communications. In some implementations, when multiple data links have the same receiver or the same transmitter, techniques such as successive decoding and cancellation or dirty paper coding can be applied.

The illustrated transmitters 110 and receivers 120 can each be part of a larger system of transmitters 110 and/or receivers 120, and/or each can include multiple transmitters 110 and/or receivers 120. For example, each transmitter 110 and each receiver 120 can include one or more respective antennas. In some embodiments described below, the design of the system seeks to optimize capacity under a total power constraint across all the transmitters 110 (e.g., each antenna of each transmitter 110). In other embodiments described below, the design of the system seeks to optimize capacity under multiple linear constraints, such as independent power constraints for each antenna of each transmitter 110.

As used herein, capital letters (e.g., "L") denote sets, capital letters in bold (e.g., "H") denote matrices, and lower case letters in bold (e.g., "x") denote vectors. The identity matrix is denoted by "I," and the zero matrix is denoted by "0." The trace of matrix A is denoted by "Tr(A)." For two n×n Hermitain matrices A and B, "A>B" and "A≥B" refer to generalized inequalities under the positive semidefinite cone "$S_+^n$." Accordingly, the inequality "A≥0" (or "A>0") indicates that matrix A is positive semi-definite (or positive definite).

The received signal at $R_l$ is:

$$y_l = \sum_{k=1}^{L} H_{l,k} x_k + w_l,$$

where $X_k \in C^{LTk \times 1}$ is the transmit signal of link k and is assumed to be circularly symmetric complex Gaussian; $H_{l,k} \in C^{LRl \times LTk}$ is the channel matrix between $T_k$ and $R_l$; and $W_l \in C^{LRl \times 1}$ is a circularly symmetric complex Gaussian noise vector with identity covariance matrix. The circularly symmetric assumption of the transmit signal can be dropped easily by applying the proposed algorithm to real Gaussian signals with twice the dimension.

Assuming the availability of channel state information at the transmitters, an achievable rate of link l is:

$$I_l(\Sigma_{1:L}) = \log|I + H_{l,l} \Sigma_l H_{l,l}^\dagger \Omega_l^{-1}|$$

where $\Sigma_l$ is the covariance matrix of $x_l$; the interferences from other links are treated as noise; and $\Omega_l$ is the interference-plus-noise covariance matrix of the lth link, which is:

$$\Omega_l = I + \sum_{\substack{k=1 \\ k \neq l}}^{L} H_{l,k} \Sigma_k H_{l,k}^\dagger.$$

If the interference from link k to link l is completely cancelled using successive decoding and cancellation or dirty paper coding, $H_{l,k}$ can be set to zero in the above equation. This can allow coverage of a wide range of communication techniques.

The input covariance matrix $\Sigma_l$ determines the transmit signal structure and power allocation for each link, proper selection of which can maximize the system throughput or sum-rate. Once $\Sigma_l$ is known, the covariance of link l's transmitted signal can be adjusted to $\Sigma_l$. For example, given rate $I_l$ for link l, the intended transmit information can be encoded into a series of random vectors $s_l$ with identity covariance matrix I. If $\Sigma_l$ has eigen decomposition $\Sigma_l = U_l D_l U_l^\dagger$, where $U_l$ is unitary matrix and $D_l$ is diagonal matrix with non-negative entries, the final transmitted signal $x_l$ can be calculated as $x_l = U_l \sqrt{D_l} s_l$, and its covariance matrix will be $\Sigma_l$. At the reveicer, the received signal will be $H_{l,l} U_l \sqrt{D_l} s_l$ plus interference and noise. When $H_{l,l} U_l \sqrt{D_l}$ is obtained using feedback or other means, $s_l$ can be properly decoded.

Figure 2:
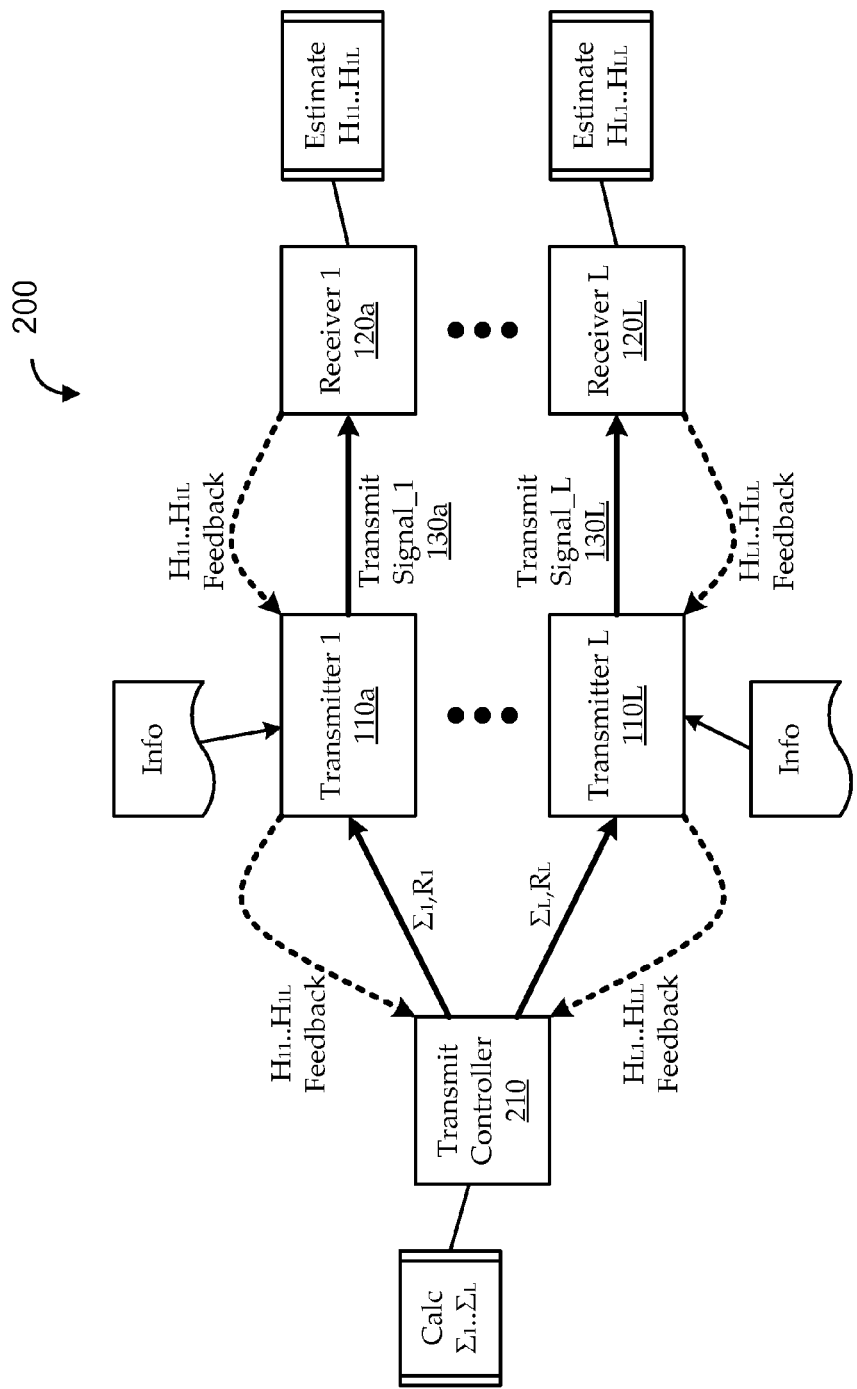
FIG. 2 shows a block diagram of an illustrative communications system in which some centralized embodiments described herein can be implemented.

FIG. 2 shows a block diagram of an illustrative communications system 200 in which some centralized embodiments described herein can be implemented. As in FIG. 1, the communications system 200 includes transmitters 110 and receivers 120. For the sake of clarity, interfering links are not shown. For a particular communications transaction, it is desired to communicate information from a transmitter 110 to a receiver 120. The transmitter 110 receives the information and generates a transmit signal 130 by which the information can be communicated.

When transmitting, each transmitter can effectively be directed by a transmit controller 210 (e.g., centralized) to adjust its transmission according to the current channel state. The current channel state information (e.g., represented by H) can be used, for example, to compute a beam forming matrix for adapting the transmission to the present channel state (e.g., by multiplying the transmission data signal by the beam forming matrix). In some implementations, the transmission information is a vector (e.g., of binary data) that is encoded by an error control encoder. The output of the error encoder can, for example, be a set of vectors (e.g., the error encoder encodes a 100-bit data signal into fifty vectors), and each vector can be multiplied by the beam forming matrix to generate the transmission signal.

In the illustrated implementation, each receiver 120 can measure its channel information corresponding to all the transmitters 110 and returns $H_{il}$, value for its link. The respective transmitters 110 can feedback the $H_{il}$ values to the transmit controller 210, which can effectively provide centralized control of the transmitters 110. As described below, the transmit controller 210 can use the fed-back values to update a present model of the network according to channel matrices, interference-plus-noise covariance matrices, and/or other suitable information (e.g., a total power constraint of the network, multiple linear constraints, etc.). The transmit controller 210 can use this information to calculate the input covariance matrix ($\Sigma_l$) for each transmit signal, which can be communicated to the transmitters 110 for use in generating their respective transmit signals. In some alternative embodiments, the transmit controller 210 can maintain its own H as a non-dynamic model of channel state. In such embodiments, corresponding feedback may not be needed, though the transmission may not adapt to dynamic changes in the channel state.

Figure 24:
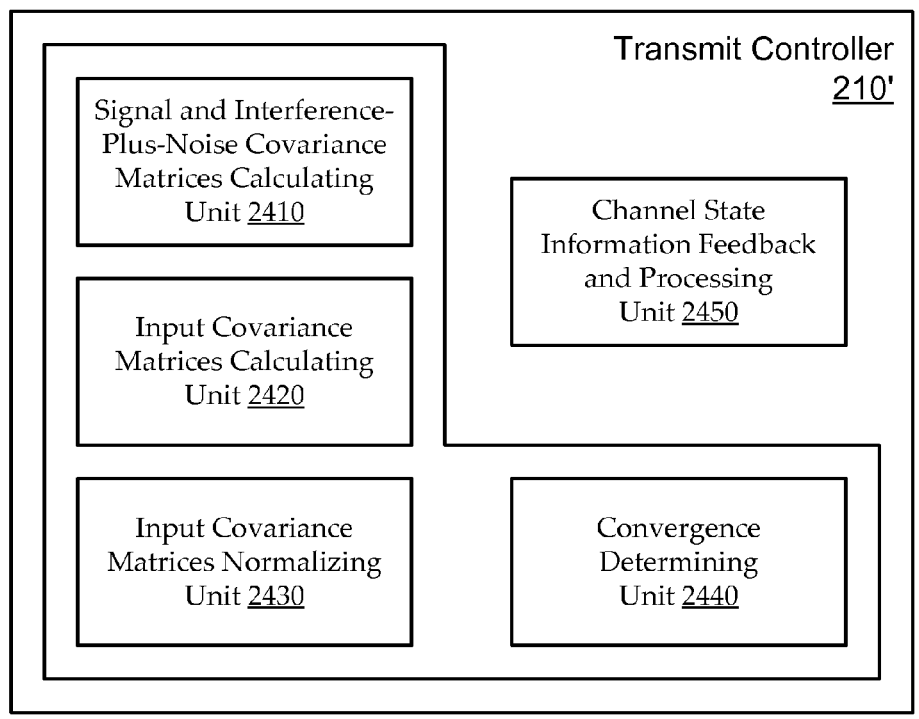
FIG. 24 shows an illustrative communication controller device for use with a centralized dual link approach, according to various embodiments.

For the sake of illustration, FIG. 24 shows an illustrative transmit controller 210' for use with a centralized dual link approach, according to various embodiments. The transmit controller can be an implementation of the one shown in FIG. 2. As illustrated, the transmit controller 210' can include a signal and interference-plus-noise covariance matrices calculating unit 2410, an input covariance matrices calculating unit 2420, an input covariance matrices normalizing unit 2430, a convergence determining unit 2440, and a channel state information feedback and processing unit 2450. As described herein, embodiments of the channel state information feedback and processing unit 2450 receive feedback from the network (e.g., transmitters and/or receivers) and pass that information to the other units of the transmit controller 210'. The other units can use the feedback information to compute an appropriate input covariance matrix for each transmit signal. The transmit controller 210' can then communicate the input covariance matrices to the transmitters for use in generating their respective transmit signals.

Figure 26:
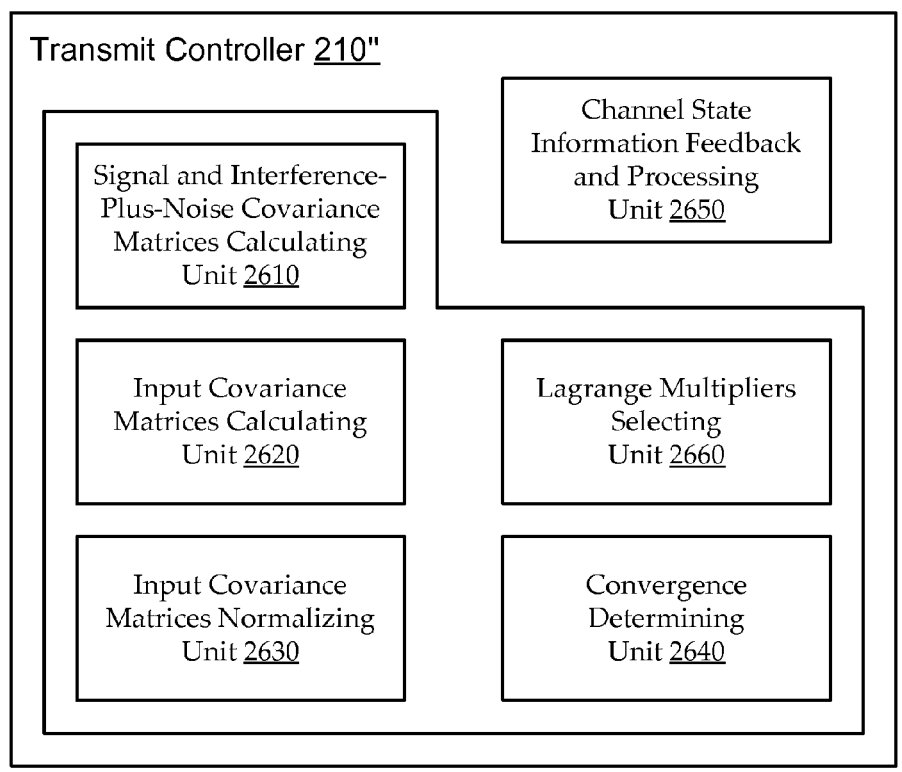
FIG. 26 shows an illustrative communication controller device for use with a centralized iterative minimax approach, according to various embodiments.

Similarly, FIG. 26 shows an illustrative transmit controller 210″ for use with a centralized iterative minimax approach, according to various embodiments. The transmit controller can be another implementation of the one shown in FIG. 2. As in FIG. 24, the transmit controller 210″ can include a signal and interference-plus-noise covariance matrices calculating unit 2610, an input covariance matrices calculating unit 2620, an input covariance matrices normalizing unit 2630, a convergence determining unit 2640, and a channel state information feedback and processing unit 2650. The transmit controller 210″ can also include a Lagrange multipliers selecting unit 2660. As described herein, embodiments of the channel state information feedback and processing unit 2650 receive feedback from the network (e.g., transmitters and/or receivers) and pass that information to the other units of the transmit controller 210″. The other units can use the feedback information to compute appropriate power covariance matrices, after which it can determine a normalization factor to normalize the power covariance matrices (and thus beam-forming matrices) to meet multiple power constraints.

Figure 3:
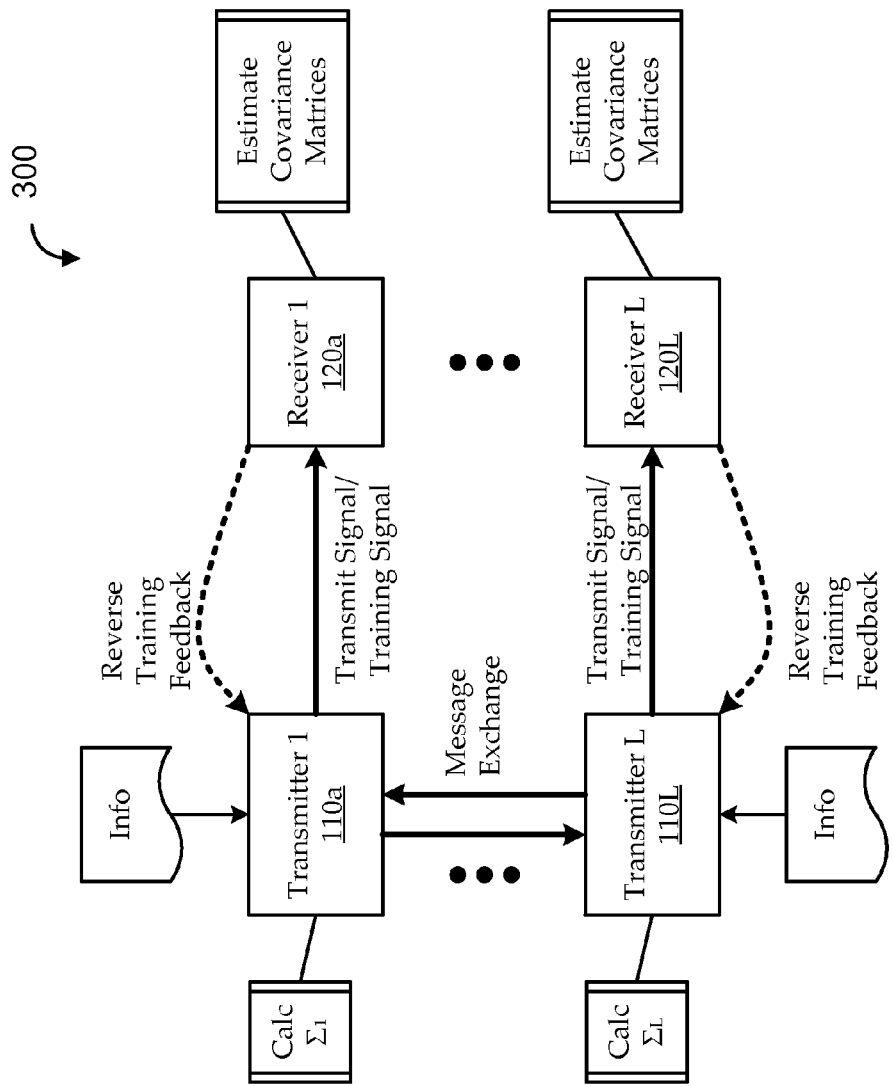
FIG. 3 shows a block diagram of a communications system in which some distributed embodiments described herein can be implemented.

FIG. 3 shows a block diagram of a communications system 300 in which some distributed embodiments described herein can be implemented. As in FIGS. 1 and 2, the communications system 300 includes transmitters 110 and receivers 120. Unlike in FIG. 2, however, there is no transmit controller (transmit controller 210 of FIG. 2). Rather than using a centralized controller to gather all the channel state information through feedbacks and to calculate and send input covariance matrices to all the transmisters 310, each transmitter 110 or receiver 120 can use properly designed training sequences to pass information at the same time. In some implementations, the receiver 120 only feeds back a single scalar variable, the calculated data rate, to its corresponding transmitter 110, instead of all the channel matrices. Using the estimated signal and interference-plus-noise covariance matrices, the transmitters 110 can calculate their own input covariance matrices and further generate their transmit signals.

Figure 25:
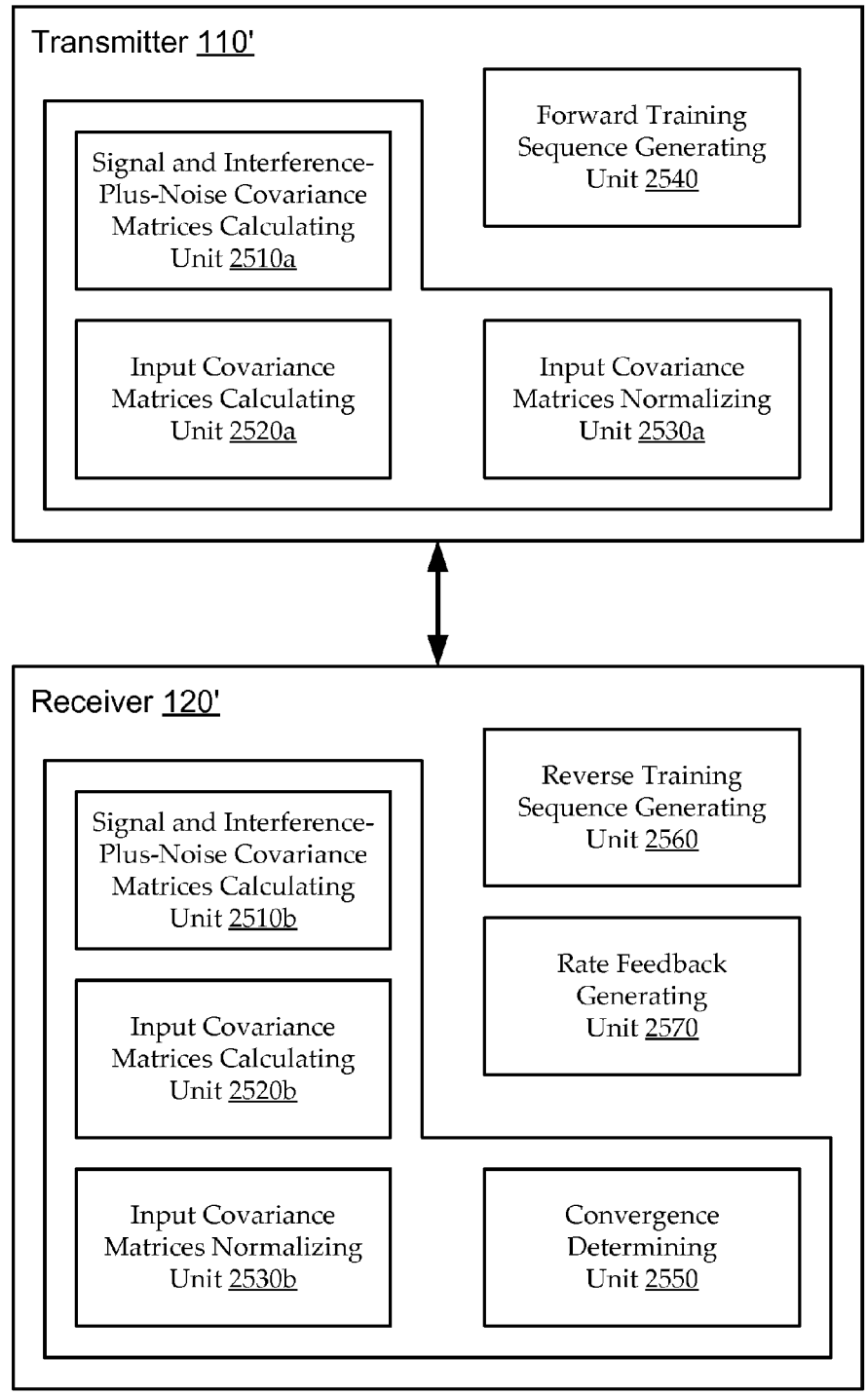
FIG. 25 shows an illustrative transmitter and an illustrative receiver for use with a centralized dual link approach, according to various embodiments.

For the sake of illustration, FIG. 25 shows an illustrative transmitter 110′ in communication with an illustrative receiver 120′, both for use with a distributed dual link approach, according to various embodiments. The transmitter 110′ and receiver 120′ can be implementations of instances of the respective transmitters and receivers shown in FIG. 3. As illustrated, each of the transmitter 110′ and the receiver 120′ includes a respective signal and interference-plus-noise covariance matrices estimating unit 2510, an input covariance matrices calculating unit 2520, and an input covariance matrices normalizing unit 2530. The transmitter 110′ further includes a forward training sequence generating unit 2540. The receiver 120′ further includes a convergence determining unit 2550, a reverse training sequence generating unit 2560, and a rate feedback generating unit 2570.

Figure 27:
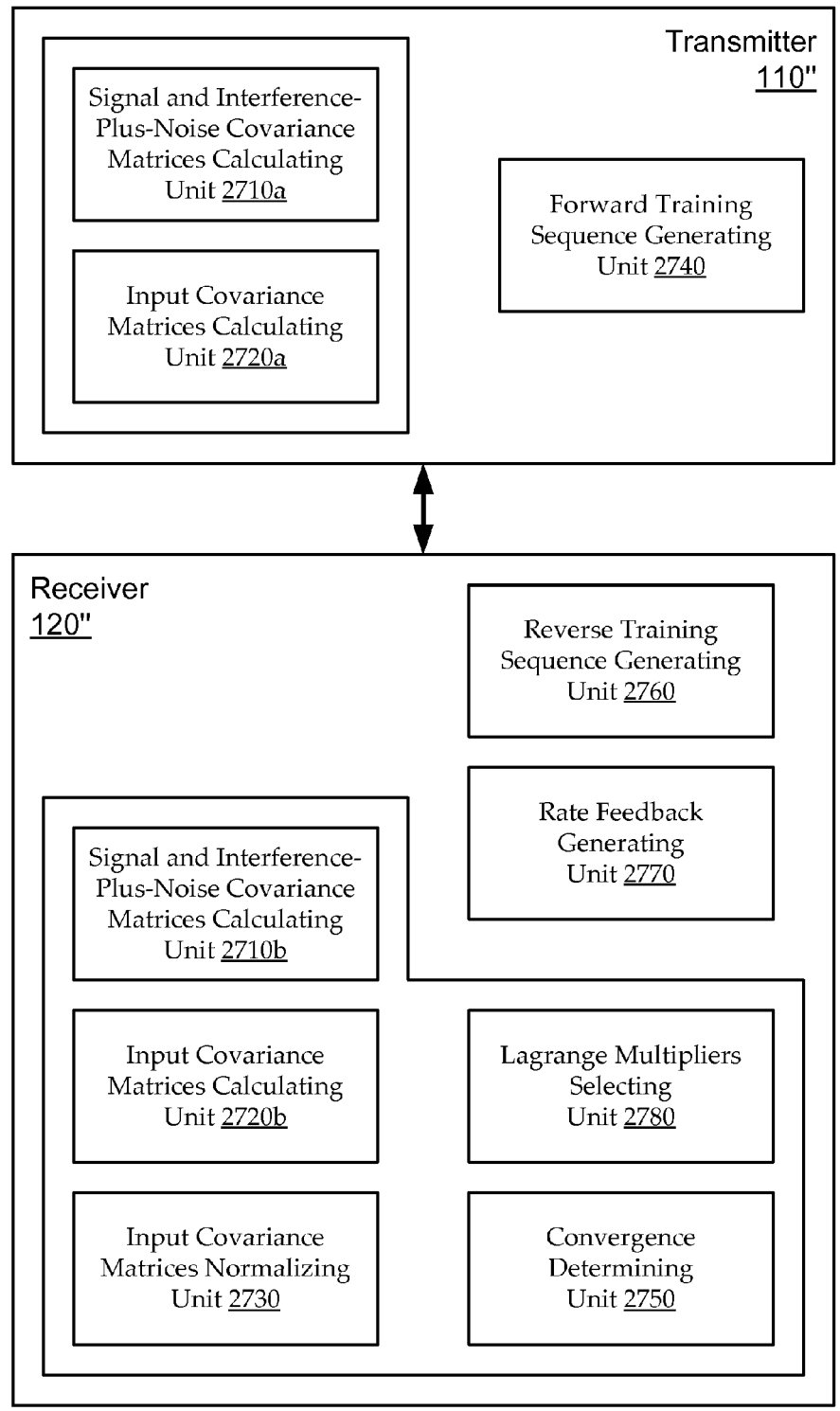
FIG. 27 shows an illustrative transmitter and an illustrative receiver for use with a centralized iterative minimax approach, according to various embodiments.

Similarly, FIG. 27 shows an illustrative transmitter 110″ in communication with an illustrative receiver 120″, both for use with a distributed iterative minimax approach, according to various embodiments. The transmitter 110″ and receiver 120″ can be other implementations of instances of the respective transmitters and receivers shown in FIG. 3. As illustrated, each of the transmitter 110″ and the receiver 120″ includes a respective signal and interference-plus-noise covariance matrices estimating unit 2710 and an input covariance matrices calculating unit 2720. The transmitter 110″ further includes a forward training sequence generating unit 2740. The receiver 120″ further includes an input covariance matrices normalizing unit 2730, a convergence determining unit 2550, a Lagrange multipliers selecting unit 2780, a reverse training sequence generating unit 2760, and a rate feedback generating unit 2770.

For the sake of clarity, the formulation of the problem can be considered in context of a system model of a communications network. Consider a general interference network N (e.g., the networks shown in FIGS. 1-3) with a set L of multi-in multi-out (MIMO) data links, or users, with the transmitter $t_l$ and receiver $r_l$ of link $l \in L$ being equipped with $n_l$ and $m_l$ antennas respectively. Let $x_l \in \mathbb{C}^{n_l \times 1}$ denote the transmit signal of link l, which is assumed to be circularly symmetric complex Gaussian. The received signal $y_l \in \mathbb{C}^{m_l \times 1}$ at the receiver $r_l$ can be written as:

$$y_l = \sum_{k \in L} H_{lk} x_k + w_l, \quad (1)$$

where $H_{lk} \in \mathbb{C}^{m_l \times n_k}$ denotes the channel matrix from the transmitter $t_k$ to the receiver $r_l$, and $w_l \in \mathbb{C}^{m_l \times 1}$ denotes the additive circularly symmetric complex Gaussian noise with identity covariance matrix.

The interference network described above is intended to be very general and to include, as special cases, many practical channels and networks such as broadcast channels, multiple access channels, small cell networks, and heterogeneous networks, etc.

Denote by $\Sigma_l \geq 0$ the covariance matrix of the transmit signal $x_l$, $l \in L$. Constraints on these power covariance matrices can be specified. Assume that the links are grouped into a set S of non-empty subsets $L^s$, $s \in S$ that cover all of L. Each subset $L^s$ may correspond to those links that are controlled or managed by a certain entity or for a certain purpose. These subsets may overlap with each other; and some of them may even be identical, corresponding to the situation where there may be multiple constraints on the same subset of links.

For each link $l \in L$, denote by $S^l$ the set of those subsets that include the link, i.e., $S^l = \{s \in S | l \in L^s\}$. Each link $l \in L$ can be associated with an $n_l \times n_l$ constraint matrix $Q_l^s > 0$ for each $s \in S^l$; and two of these matrices may be identical. Assuming that each group of links $L^s$, $s \in S$ is subject to a linear power covariance matrix constraint can yield the following:

$$\sum_{l \in L^s} Tr(\Sigma_l Q_l^s) \leq 1, s \in S. \quad (2)$$

The constraint (2) is very general and captures all reasonable linear constraints on power. For instance, when there is only a budget $P_T$ on the total power of all links, the cardinality $|S|=1$ and $$Q_l^s = \frac{1}{P_T} I.$$

When there is only a per-link power budget $p_l$, $l \in L$, each group $L^s$ contains only one link and $$Q_l^s = \frac{1}{P_T} I.$$

Each group $L^s$, $s \in S$ may also represent those links or users in a cell of a microcell network and each cell s is subject to a total power budget $P_s$. In this scenario, the subsets $L^s$ are non-overlapping and $$Q_l^s = \frac{1}{P_T} I,$$

$\forall l \in L^s$.

Notably, the descriptions above have assumed linear constraints on the power covariance matrices. However, as described below, related theory development and algorithm design can be based on general convex analysis. As such, some results discussed herein can be extended to networks with nonlinear convex power covariance matrix constraints.

The linear constraints on the power covariance matrices can be applied to maximize the weighted sum-rate of a network. For example, in the network described above, there can be many transmitters communicating with many receivers using many antennas, and the various communications can be occurring at substantially the same time using substantially the same frequency band. Accordingly, each communication can interfere with some or all of the other communications. One may thus consider that an objective of the network design is a reduction of noise and/or interference. However, it is noted that such an objective can easily be satisfied, for example, by not communicating at all over the network, thereby effectively avoiding interference. Such a solution is not useful, as the purpose of the network is to facilitate communications. Rather, a more useful objective can be to maximize its capacity, for example, by maximizing transmission rate. Embodiments herein approach that maximization problem as a weighted sum-rate maximization for the network, which is generally considered a "hard" non-convex problem. Still, the weighted sum-rate maximization represents a fundamental problem that can serve as a basis for many resource management and network design problems, and it still remains open for general channels/networks.

Assume that the channel state information is available at the transmitter. For given power covariance matrix $\Sigma_l$, $l \in L$, an achievable rate $c_l$ of the link l can be given by:

$$c_l = \log\left| I + H_{ll} \Sigma_l H_{ll}^+ \left( I + \sum_{k \in L \setminus \{l\}} H_{lk} \Sigma_k H_{lk}^+ \right)^{-1} \right|, \quad (3)$$

where |.| denotes the matrix determinant and the interferences from other links are treated as noise. Assume that each link $l \in L$ is associated with a weight $w_l > 0$. One objective can be to allocate power for each link so as to maximize the weighted sum-rate, subject to the power covariance matrix constraints:

$$\max_{\Sigma_l \geq 0} \sum_{l \in L} w_l c_l \quad (4)$$

s.t. $\sum_{l \in L^s} Tr(\Sigma_l Q_l^s) \leq 1, s \in S.$ (5)

For example, the power covariance matrix $\Sigma_l$, $l \in L$, can effectively correspond to a configuration of transmission antenna transmitting at particular respective powers and phases (e.g., at particular intensities and directions, etc.). The maximum weighted sum-rate, then, can correspond to a network configuration having a maximized capacity. For example, as described herein, the weighted sum-rate maximization for the network can be continually recomputed during operation of the network to yield a dynamic network design that effectively maximizes transmission rate while minimizing interference (or interference-plus-noise, etc.).

As described above, embodiments implement the weighted sum-rate maximization in a communications network in a manner that can involve continual re-computation. Accordingly, it can be desirable to find a solution approach to the problem that converges on a solution quickly and reliably, and yields feasible results (e.g., none of the antenna powers are negative, etc.). A novel approach described herein is to reformulate the weighted sum-rate maximization as an equivalent max-min problem, by treating the interference-plus-noise covariance matrix definition as a constraint. This reformulation has a number of implications: the Lagrangian duality of the equivalent max-min problem provides an elegant way to establish the sum-rate duality between an interference network and its reciprocal when such a duality exists; and such an approach suggests a new algorithm for the weighted sum-rate maximization.

Such an approach can begin by evaluating the minimax Lagrangian duality. Denote by $\Omega_l$, $l \in L$ the interference-plus-noise covariance matrix at the receiver $r_l$:

$$\Omega_l = I + \sum_{k \in L \setminus \{l\}} H_{lk} \Sigma_k H_{lk}^+. \quad (6)$$

The weighted sum-rate maximization (4)-(5) can be rewritten equivalently as the following max-min problem:

$$\max_{\Sigma_l \geq 0} \min_{\Omega_l \geq 0} \sum_{l \in L} w_l (\log|\Omega_l + H_{ll} \Sigma_l H_{ll}^+| - \log|\Omega_l|) \quad (7)$$

s.t. $\sum_{l \in L^s} Tr(\Sigma_l Q_l^s) \leq 1, s \in S,$ (8)

$$\Omega_l = I + \sum_{k \in L \setminus \{l\}} H_{lk} \Sigma_k H_{lk}^+, l \in L. \quad (9)$$

Note that, when $H_{ll} \Sigma_l H_{ll}^+$ is not of full rank, the above problem can be considered as a truncated system, where $\Omega_l$ is restricted to $\Omega_l = H_{ll} X_l H_{ll}^+$, $X_l \geq 0$. Intuitively, this can follow from the fact that, when the signal at a channel is zero, its interference-plus-noise does not impact its achieved rate. For example, if there is no communication over a particular link, the interference-plus-noise of the system does not impact that link. Mathematically, this can cause technical difficulty regarding singular matrices.

The objective function of problem (7)-(9)

$$F(\Sigma, \Omega) = \sum_{l \in L} w_l (\log|\Omega_l + H_{ll}\Sigma_l H_{ll}^+| - \log|\Omega_l|)$$

is concave in $\Sigma$ and convex in $\Omega$. So, the "max-min" expression of the function is equal to the "min-max" expression of the function, and the optimum is a saddle point. Consider the Lagrangian:

$$\mathcal{L}(\Sigma, \Omega, \Lambda, \mu) = F(\Sigma, \Omega) + \sum_{s \in S} \mu_s \left(1 - \sum_{l \in L^s} Tr(\Sigma_l Q_l^s)\right) + \sum_{l \in L} Tr\left(\Lambda_l \left(\Omega_l - I - \sum_{k \in L\setminus\{l\}} H_{lk}\Sigma_k H_{lk}^+\right)\right),$$

where $\mu = \{\mu_s\}_{s \in S}$ with $\mu_s \geq 0$ the dual variable associated with the power covariance matrix constraint (8), and $\Lambda = \{\Lambda_l\}_{l \in L}$ with $\Lambda_l \geq 0$ the dual variable associated with the interference-plus-noise covariance matrix definition (9). For any given $(\Lambda, \mu)$, L is concave in $\Sigma$ and convex in $\Omega$ as F is.

The first order conditions (e.g., part of the Karush—Kuhn—Tucker (KKT) conditions) can be considered for optimizing the solution in context of the Lagrange multipliers, for example, as:

$$w_l H_{ll}^+ (\Omega_l + H_{ll}\Sigma_l H_{ll}^+)^{-1} H_{ll} = \Phi_l, \quad (10)$$

$$w_l (\Omega_l^{-1} - (\Omega_l + H_{ll}\Sigma_l H_{ll}^+)^{-1}) = \Lambda_l, \quad (11)$$

where:

$$\Phi_l = \sum_{s \in S_l} \mu_s Q_l^s + \sum_{k \in L\setminus\{l\}} H_{kl}^+ \Lambda_k H_{kl}.$$

For any given feasible dual variable $(\Lambda, \mu)$, the above condition gives the saddle point condition of Lagrangian L as a function of $(\Sigma, \Omega)$; and, when $(\Lambda, \mu)$ is a dual optimum, solving the equations (10)-(11) can yield a primal optimum. As described below, some embodiments exploit such a result to formulate a novel algorithm for solving the weighted sum-rate maximization.

According to the above, the following theorem ("Theorem 1") can be established. Given feasible dual variables $(\Phi, \mu)$, an explicit solution $(\Sigma, \Omega)$ for the saddle point equations (10)-(11) can be given by:

$$\Omega_l = w_l H_{ll}(\Phi_l + H_{ll}^+ \Lambda_l H_{ll})^{-1} H_{ll}^+, \quad (12)$$

$$\Sigma_l = w_l (\Phi_l^{-1} - (\Phi_l + H_{ll}^+ \Lambda_l H_{ll})^{-1}). \quad (13)$$

The solution (12)-(13) represents a primal-dual optimum, where, correspondingly, the optimal power covariance matrix $\Sigma$, and the interference-plus-noise matrix $\Omega_l$ are assumed to be positive definite, and the channel matrix $H_{ll}$ is assumed to be square and invertible. Here, the explicit solution (12)-(13) can be established for any given feasible dual variables, the power covariance matrix and the interference-plus-noise matrix are positive semi-definite, and the channel matrix can be any general matrix. However, the solution is for an equivalent, truncated system where the interference-plus-noise can be ignored for a channel whose signal is zero, and "−1" denotes pseudo inverse if the matrix involved is singular.

For the sake of completeness, the following is a proof of the explicit solution (12)-(13). It is instructive first to define an "extended difference of logdet (log-determinant)" function. Let A, $B \in S_+^n$. The difference of logdet function:

$$F(A, B) = \log|A + B| - \log|B|$$

is not well-defined, if B is not positive definite. If there exists a nonsingular square matrix T, such that:

$$T^+ A T = \begin{bmatrix} A_1 & \\ & 0 \end{bmatrix}, T^+ B T = \begin{bmatrix} B_1 & \\ & 0 \end{bmatrix}$$

where $A_1 \in S_+^m$, $B_1 \in S_{++}^m$ for some $m \leq n$, then an "extended difference of logdet" function can be defined, as follows:

$$F(A, B) := \log|A_1 + B_1| - \log|B_1|.$$

With the definition of the above extended function, matrix inverse resulting from the derivative of logdet function is pseudo inverse when the matrix involved is singular. As used herein, a "difference of logdet function" is intended to be the extended difference of logdet function, and a "matrix inverse" is a pseudo inverse when the matrix involved is singular.

Such functions can provided a context for a proof of Theorem 1. For simplicity of presentation, and without loss of generality, notations can be reloaded to consider the following problem:

$$\max_{\Sigma \geq 0} \min_{\Omega \geq 0} \log|\Omega + H\Sigma H^+| - \log|\Omega| + Tr(\Lambda\Omega) - Tr(\Phi\Sigma) \quad (51)$$

where $\Lambda \geq 0$ and $\Phi \geq 0$. The goal of the proof is to demonstrate that problem (51) is equivalent to a problem with $\Omega$ restricted to $\Omega = HXH^+$, $X \geq 0$.

The following "Lemma 1" can be stated: problem (51) can be considered as equivalent to the following problem:

$$\max_{\Sigma \geq 0} \min_{\Omega \geq 0} \log|\Omega + H\Sigma H^+| - \log|\Omega| + Tr(\Lambda\Omega) - Tr(\Phi\Sigma) \quad (52)$$

$$\text{s.t.} \quad \Omega = HXH^+, X \geq 0. \quad (53)$$

Lemma 1 can be proven by the following. Since $H\Sigma H^+ \geq 0$ and $\Lambda \geq 0$, there exists a nonsingular square matrix T such that $$T\Lambda T^+ = \begin{bmatrix} S_1 & & & \\ & 0 & & \\ & & S_3 & \\ & & & 0 \end{bmatrix},$$

$$(T^+)^{-1} H\Sigma H^+ T^{-1} = \begin{bmatrix} S_1 & & & \\ & S_2 & & \\ & & 0 & \\ & & & 0 \end{bmatrix},$$

where $S_1$, $S_2$, $S_3$ are diagonal and positive definite. Let $\Omega = T^+ \tilde{\Omega} T$, problem (51) becomes $$\max_{\Sigma \geq 0} \min_{\tilde{\Omega} \geq 0} \log\left|\tilde{\Omega} + (T^+)^{-1} H\Sigma H^+ T^{-1}\right| - \log|\tilde{\Omega}| + Tr(T\Lambda T^+ \tilde{\Omega}) - Tr(\Phi\Sigma).$$

Now, consider those terms in the objective function that depend on $\tilde{\Omega}$:

$$\tilde{\mathcal{L}}(\tilde{\Omega}) = \log|\tilde{\Omega} + (T^+)^{-1}H\Sigma H^+ T^{-1}| - \log|\tilde{\Omega}| + Tr(T\Lambda T^+\tilde{\Omega})$$ (5)

$$= \log\left\|\begin{bmatrix} \tilde{\Omega}_{11}+S_1 & \tilde{\Omega}_{12} & \tilde{\Omega}_{13} & \tilde{\Omega}_{14} \\ \tilde{\Omega}_{12}^+ & \tilde{\Omega}_{22}+S_2 & \tilde{\Omega}_{23} & \tilde{\Omega}_{24} \\ \tilde{\Omega}_{13}^+ & \tilde{\Omega}_{23}^+ & \tilde{\Omega}_{33} & \tilde{\Omega}_{34} \\ \tilde{\Omega}_{14}^+ & \tilde{\Omega}_{24}^+ & \tilde{\Omega}_{34}^+ & \tilde{\Omega}_{44} \end{bmatrix}\right\| -$$

$$\log\left\|\begin{bmatrix} \tilde{\Omega}_{11} & \tilde{\Omega}_{12} & \tilde{\Omega}_{13} & \tilde{\Omega}_{14} \\ \tilde{\Omega}_{12}^+ & \tilde{\Omega}_{22} & \tilde{\Omega}_{23} & \tilde{\Omega}_{24} \\ \tilde{\Omega}_{13}^+ & \tilde{\Omega}_{23}^+ & \tilde{\Omega}_{33} & \tilde{\Omega}_{34} \\ \tilde{\Omega}_{14}^+ & \tilde{\Omega}_{24}^+ & \tilde{\Omega}_{34}^+ & \tilde{\Omega}_{44} \end{bmatrix}\right\| + Tr(S_1\tilde{\Omega}_{11}) + Tr(S_3\tilde{\Omega}_{33})$$

and its minimization over $\tilde{\Omega} \geq 0$. By the determinant formula for a block matrix, when A is invertible:

$$\left\|\begin{bmatrix} A & B \\ C & D \end{bmatrix}\right\| = |A||D - CA^{-1}B|.$$

Because the determinant is a continuous function, this can yield:

$$\tilde{\mathcal{L}}(\tilde{\Omega}) \geq \log\left\|\begin{bmatrix} \tilde{\Omega}_{11}+S_1 & \tilde{\Omega}_{12} & \tilde{\Omega}_{13} \\ \tilde{\Omega}_{12}^+ & \tilde{\Omega}_{22}+S_2 & \tilde{\Omega}_{23} \\ \tilde{\Omega}_{13}^+ & \tilde{\Omega}_{23}^+ & \tilde{\Omega}_{33} \end{bmatrix}\right\| -$$

$$\log\left\|\begin{bmatrix} \tilde{\Omega}_{11} & \tilde{\Omega}_{12} & \tilde{\Omega}_{13} \\ \tilde{\Omega}_{12}^+ & \tilde{\Omega}_{22} & \tilde{\Omega}_{23} \\ \tilde{\Omega}_{13}^+ & \tilde{\Omega}_{23}^+ & \tilde{\Omega}_{33} \end{bmatrix}\right\| + Tr(S_1\tilde{\Omega}_{11}) + Tr(S_3\tilde{\Omega}_{33}),$$

where the equality holds when $\tilde{\Omega}_{44} \to \infty$, but can be achieved when $\tilde{\Omega}_{i4}=0$ for all i=1, 2, 3, 4. $\tilde{\Omega}$ can be restricted to those with $\tilde{\Omega}_{i4}=0$ for all i=1, 2, 3, 4, as the equality is achieved at one of those matrices.

Since $S_3 \geq 0$ and $\tilde{\Omega}_{33} \geq 0$, $Tr(S_3\tilde{\Omega}_{33}) \geq 0$, this can further yield:

$$\tilde{\mathcal{L}}(\tilde{\Omega}) \geq \log\left\|\begin{bmatrix} \tilde{\Omega}_{11}+S_1 & \tilde{\Omega}_{12} \\ \tilde{\Omega}_{12}^+ & \tilde{\Omega}_{22}+S_2 \end{bmatrix}\right\| - \log\left\|\begin{bmatrix} \tilde{\Omega}_{11} & \tilde{\Omega}_{12} \\ \tilde{\Omega}_{12}^+ & \tilde{\Omega}_{22} \end{bmatrix}\right\| + Tr(S_1\tilde{\Omega}_{11}),$$

where the equality is achieved when additionally $\tilde{\Omega}_{i3}=0$ for all i=1, 2, 3. Therefore, it can be concluded that there exists a minimizer $\tilde{\Omega}^*$ with the form:

$$\tilde{\Omega}^* = \begin{bmatrix} \tilde{\Omega}_{11} & \tilde{\Omega}_{12} & & \\ \tilde{\Omega}_{12}^+ & \tilde{\Omega}_{22} & & \\ & & 0 & \\ & & & 0 \end{bmatrix}.$$

The above manipulation effectively restricts the problem to an equivalent, truncated system, where the interference-plus-noise can be ignored for a channel having a signal of zero. As described above, intuitively, the equivalence of this truncated system to the original max-min problem can follow from the fact that when the signal is zero, the interference-plus-noise is effectively not relevant.

Now, consider a vector v such that $H^+v=0$. This yields:

$$v^+ H\Sigma H^T v = v^+ T^+ \begin{bmatrix} S_1 & & & \\ & S_2 & & \\ & & 0 & \\ & & & 0 \end{bmatrix} Tv$$

$$= 0,$$

which implies $$Tv = \begin{bmatrix} 0 & 0 & \bar{v}_3 & \bar{v}_4 \end{bmatrix}^T.$$

Therefore, $$v^+ \Omega^* v = v^+ T^+ \tilde{\Omega}^* Tv$$

$$= v^+ T^+ \begin{bmatrix} \tilde{\Omega}_{11} & \tilde{\Omega}_{12} & & \\ \tilde{\Omega}_{12}^+ & \tilde{\Omega}_{22} & & \\ & & 0 & \\ & & & 0 \end{bmatrix} Tv$$

$$= 0.$$

This implies the null space $N(H+) \subset N(\Omega^*)$, and further, the range $R(H) \supset R(\Omega^{*+})=R(\Omega^*)$. Therefore, there exists a matrix $X \geq 0$ such that:

$$\Omega^* = HXH^+.$$

Accordingly, there exists an optimal solution with $\Omega^*=HXH^+$. Thus, problem (51) and problem (52)-(53) are equivalent.

With Lemma 1, the explicit saddle point solution can be presented. Consider the logdet terms in the objective function:

$$\log|\Omega + H\Sigma H^+| - \log|\Omega| = \log|HXH^+ + H\Sigma H^+| - \log|HXH^+|$$

$$= \log|H^+ H(X+\Sigma)| - \log|H^+ HX|$$

$$= \log|X+\Sigma| - \log|X|.$$

The singularity issue comes out when $H^+H$ is not invertible, but this can be handled by adding a small term $\kappa I$, $\kappa>0$ to $H^+H$ and then taking the limit $\kappa \to 0$. Thus, problem (51) can be transformed into the following:

$$\max_{\Sigma \geq 0} \min_{X \geq 0} \log|X+\Sigma| - \log|X| + Tr(H^+\Lambda HX) - Tr(\Phi\Sigma). \quad (54)$$

The first order optimality condition for the saddle point can yield:

$(X+\Sigma)^{-1}-\Phi=0,$ $(X+\Sigma)^{-1}-X^{-1}+H^+\Lambda H=0,$ from which the following explicit saddle point solution can be obtained:

$\Sigma=\Phi^{-1}-(\Phi+H^+\Lambda H)^{-1},$ $X=(\Phi+H^+\Lambda H)^{-1},$ (55)

and in terms of $\Omega$:

$\Omega=HXH^+=H(\Phi+H^+\Lambda H)^{-1}H^+.$ (56)

Note that problem (54) is well-defined only when $\Sigma$, X satisfy the property specified for matrices A, B above. This can be verified using the following "Proposition 1": The objective function in problem (54) is well-defined for matrices $\Sigma$, X that are given by (55)-(56).

Proposition 1 can be proven by the following. Let $\Psi = \Phi + H^+ \Lambda H$, to yield the null space $N(\Psi) \subset N(\Phi)$. To see this, note that $\Phi \geq 0$ and $H^+ \Lambda H \geq 0$. Suppose $v \in N(\Psi)$; then $v^T \Psi v = v^T \Phi v + v^T H^+ \Lambda H v = 0$. As each term is non-negative, $v^T \Phi v = 0$, i.e., $v \in N(\Phi)$.

Since $N(\Psi) \subset N(\Phi)$, there exists a unitary matrix U such that:

$$U^+ \Psi U = \begin{bmatrix} \Psi_1 & \\ & 0 \end{bmatrix}, U^+ \Phi U = \begin{bmatrix} \Phi_1 & \\ & 0 \end{bmatrix}$$

where $\Psi_1 > 0$ and $\Phi_1 \geq 0$. By equations (55)-(56), $$X = U \begin{bmatrix} \Psi_1^{-1} & \\ & 0 \end{bmatrix} U^+, \Sigma = U \begin{bmatrix} \Phi_1^{-1} - \Psi_1^{-1} & \\ & 0 \end{bmatrix} U^+.$$

Note that $\Psi_1^{-1} > 0$, so, by the definition of the extended difference of logdet function, the objective function in problem (54) is well-defined.

With (55)-(56), the explicit solution (12)-(13) can be recovered. As such, the proof of Theorem 1 is concluded.

Having proven the explicit solution (12)-(13), it can be noted that equations (10)-(11) and equations (12)-(13) have similar structures. This can be exploited to establish the sum-rate duality between an interference network and its reciprocal based on the Lagrangian dual of the (truncated) max-min problem (7)-(9).

For the sake of clarity, a "reciprocal" can be defined in this context. Consider an interference network N with a set L of MIMO links and channel matrix $H_{kl}$ from the transmitter of link $l \in L$ to the receiver of link $k \in L$. Its "reciprocal" $\hat{N}$ is defined as a network with the same set L of links but with reversed directions where the channel matrix $\hat{H}_{kl}$ from the transmitter of link l to the receiver of link k is given by $\hat{H}_{kl} = H_{lk}^+$. The transmitter (receiver) of a link in the reciprocal network $\hat{N}$ is the receiver (transmitter) of the corresponding link in the original network N. For instance, for a broadcast channel with a channel matrix H, its reciprocal is a multiple access channel with channel matrix $H^+$, and vice versa.

A weighted sum-rate maximization problem can be defined for the reciprocal network, such that its first order condition for optimality is equivalently the equations (12)-(13). However, such a weighted sum-rate maximization problem may not be uniquely defined in terms of the noise covariance matrices and the power covariance matrix constraints. Moreover, such a problem may involve the optimal primary and/or dual variables of the weighted sum-rate maximization of the original network. For example, consider the following weighted sum-rate maximization for the reciprocal network:

$$\max_{\hat{\Sigma}_l \geq 0} \min_{\hat{\Omega}_l \geq 0} \sum_{l \in L} w_l \left( \log |\hat{\Omega}_l + \hat{H}_{ll} \hat{\Sigma}_l \hat{H}_{ll}^+| - \log |\hat{\Omega}_l| \right) \quad (14)$$

$$\text{s.t. } Tr(\hat{\Sigma}_l) \leq 1, l \in L, \quad (15)$$

$$\hat{\Omega}_l = \sum_{s \in S_l} \mu_s Q_l^s + \sum_{k \in L \setminus \{l\}} \hat{H}_{lk} \hat{\Sigma}_k \hat{H}_{lk}^+, l \in L, \quad (16)$$

where $\mu_s$, $s \in S$ are the optimal duals associated with the constraints (8), the noise covariance matrix at link $l \in L$ is given by $\sum_{s \in S_l} \mu_s Q_l^s$, and the power covariance matrices $\hat{\Sigma}_l$ are independently constrained. While the above problem can achieve the same maximal sum-rate as problem (7)-(9) of the original network, its constraints depend on the optimum of problem (7)-(9) while also having a very different structure from those of problem (7)-(9). As such, the rate duality between the two networks can become less appealing.

Still, some networks provide more appealing cases with "strong" rate duality, such that the weighted sum-rate maximization problem of the reciprocal network has exactly the same structure as that of the original network. For each case, the minimax Lagrangian duality can be used to establish the strong rate duality between the interference network and its reciprocal, as shown below.

One type of network having strong rate duality includes per-link power constraints without interlink interference. Such a network can be illustrated by setting $S = L$, $\Omega_l = I$ (i.e., the interference-plus-noise covariance matrix is set to an identity matrix), and $$Q_l^s = \frac{1}{P_T} I$$

with $P_l$ the power budget at each link $l \in L$. As each link is independent (e.g., there is no interference from other links), a single link can be examined:

$$\max_{\Sigma_l \geq 0} \min_{\Omega_l \geq 0} \log |\Omega_l + H_{ll} \Sigma_l H_{ll}^+| - \log |\Omega_l| \quad (17)$$

$$\text{s.t. } Tr\left(\frac{\Sigma_l}{P_l}\right) \leq 1, \Omega_l = I. \quad (18)$$

The first order condition (10)-(11) can reduce to:

$$w_l H_{ll}^+ (\Omega_l + H_{ll} \Sigma_l H_{ll}^+)^{-1} H_{ll} = \mu_l \frac{I}{P_l},$$

$$w_l (\Omega_l^{-1} - (\Omega_l + H_{ll} \Sigma_l H_{ll}^+)^{-1}) = \Lambda_l,$$

where $\mu_l \geq 0$ is the dual variable associated with the power covariance matrix constraint.

Define:

$$\hat{\Sigma}_l = \frac{P_l}{\mu_l} \Lambda_l,$$

$$\hat{\Omega}_l = I.$$

The first order condition becomes:

$$w_l H_{ll}^+ (\Omega_l + H_{ll} \Sigma_l H_{ll}^+)^{-1} H_{ll} = \frac{\mu_l}{P_l} \hat{\Omega}_l, \quad (19)$$

-continued $$w_l(\Omega_l^{-1} - (\Omega_l + H_{ll}\Sigma_l H_{ll}^+)^{-1}) = \frac{\mu_l}{P_l}\hat{\Sigma}_l, \quad (20)$$

and the explicit solution (12)-(13) becomes:

$$w_l H_{ll}(\hat{\Omega}_l + H_{ll}^+ \hat{\Sigma}_l H_{ll})^{-1} H_{ll}^+ = \frac{\mu_l}{P_l}\Omega_l, \quad (21)$$

$$w_l(\hat{\Omega}_l^{-1} - (\hat{\Omega}_l + H_{ll}^+ \hat{\Sigma}_l H_{ll})^{-1}) = \frac{\mu_l}{P_l}\Sigma_l. \quad (22)$$

Comparing equations (19)-(20) and equations (21)-(22), it can be concluded that the Lagrangian dual of the max-min problem (17)-(18) is also the following max-min problem:

$$\max_{\hat{\Sigma}_l \geq 0} \min_{\hat{\Omega}_l \geq 0} \log|\hat{\Omega}_l + H_{ll}^+ \hat{\Sigma}_l H_{ll}| - \log|\hat{\Omega}_l| \quad (23)$$

$$\text{s.t. } Tr\left(\frac{\hat{\Sigma}_l}{P_l}\right) \leq 1, \hat{\Omega}_l = I, \quad (24)$$

which is the sum-rate maximization problem defined on the reciprocal link with channel matrix $H_l^+$. At the corresponding saddle points, the two problems achieve the same rate, since one is the dual of the other. Furthermore, introducing the dual variables $\hat{\mu}$ and $\hat{\Lambda}_l$ for the problem (23)-(24) can yield the following correspondence:

$$(\Sigma_l; \Lambda_l, \mu_l) = \left(\frac{P_l}{\hat{\mu}_l}\hat{\Lambda}_l; \frac{\hat{\mu}_l}{P_l}\hat{\Sigma}_l, \hat{\mu}_l\right), \quad (25)$$

$$(\hat{\Sigma}_l; \hat{\Lambda}_l, \hat{\mu}_l) = \left(\frac{P_l}{\mu_l}\Lambda_l; \frac{\mu_l}{P_l}\Sigma_l, \mu_l\right). \quad (26)$$

This recovers a traditionally known result. A difference, however, is that the approach described herein can establish the explicit solution (21)-(22) and the correspondence (25)-(26) for general power covariance matrices and channel matrices and at any saddle points of the Lagrangian function (e.g., rather than only at an optimum).

Another type of network having strong rate duality includes a total power constraint. Such a network can be illustrated by setting $|S|=1$ and $$Q_l^s = \frac{1}{P_T}I,$$

with $P_T$ as the total power budget. The max-min problem (7)-(9) reduces to:

$$\max_{\Sigma_l \geq 0} \min_{\Omega_l \geq 0} \sum_l w_l(\log|\Omega_l + H_{ll}\Sigma_l H_{ll}^+| - \log|\Omega_l|) \quad (27)$$

$$\text{s.t. } \sum_l Tr\left(\frac{\Sigma_l}{P_T}\right) \leq 1, \quad (28)$$

$$\Omega_l = I + \sum_{k \in L\setminus\{l\}} H_{lk}\Sigma_k H_{lk}^+, \quad (29)$$

and the first order condition (10)-(11) reduces to:

$$w_l H_{ll}^+ (\Omega_l + H_{ll}\Sigma_l H_{ll}^+)^{-1} H_{ll} = \Phi_l,$$

$$w_l(\Omega_l^{-1} - (\Omega_l + H_{ll}\Sigma_l H_{ll}^+)^{-1}) = \Lambda_l,$$

with:

$$\Phi_l = \mu \frac{I}{P_l} + \sum_{k \in L\setminus\{l\}} H_{kl}^+ \Lambda_k H_{kl},$$

where $\mu \geq 0$ is the dual variable associated with the total power constraint.

Define:

$$\hat{\Sigma}_l = \frac{P_T}{\mu}\Lambda_l,$$

$$\hat{\Omega}_l = I + \sum_{k \in L\setminus\{l\}} H_{kl}^+ \hat{\Sigma}_k H_{kl}.$$

The first order condition becomes:

$$w_l H_{ll}^+ (\Omega_l + H_{ll}\Sigma_l H_{ll}^+)^{-1} H_{ll} = \frac{\mu}{P_T}\hat{\Omega}_l, \quad (30)$$

$$w_l(\Omega_l^{-1} - (\Omega_l + H_{ll}\Sigma_l H_{ll}^+)^{-1}) = \frac{\mu}{P_T}\hat{\Sigma}_l, \quad (31)$$

and the explicit solution (12)-(13) becomes:

$$w_l H_{ll}(\hat{\Omega}_l + H_{ll}^+ \hat{\Sigma}_l H_{ll})^{-1} H_{ll}^+ = \frac{\mu}{P_T}\Omega_l, \quad (32)$$

$$w_l(\hat{\Omega}_l^{-1} - (\hat{\Omega}_l + H_{ll}^+ \hat{\Sigma}_l H_{ll})^{-1}) = \frac{\mu}{P_T}\Sigma_l. \quad (33)$$

Comparing equations (30)-(31) and equations (32)-(33), it can be concluded that the Lagrangian dual of the max-min problem (27)-(29) is also a max-min problem:

$$\max_{\hat{\Sigma}_l \geq 0} \min_{\hat{\Omega}_l \geq 0} \sum_l w_l(\log|\hat{\Omega}_l + H_{ll}^+ \hat{\Sigma}_l H_{ll}| - \log|\hat{\Omega}_l|) \quad (34)$$

$$\text{s.t. } \sum_l Tr\left(\frac{\hat{\Sigma}_l}{P_T}\right) \leq 1, \quad (35)$$

$$\hat{\Omega}_l = I + \sum_{k \in L\setminus\{l\}} H_{kl}^+ \hat{\Sigma}_k H_{lk}, \quad (36)$$

which is the weighted sum-rate maximization problem defined on a network of reciprocal channels with channel matrix $H^+$. At the corresponding saddle points, the two problems achieve the same weighted sum-rate, since one is the dual of the other. Furthermore, introducing the dual variables $\hat{\mu}$ and $\hat{\Lambda}_l$ for the problem (34)-(36) yields the following correspondence:

$$(\Sigma_l; \Lambda_l, \mu) = \left(\frac{P_T}{\hat{\mu}}\hat{\Lambda}_l; \frac{\hat{\mu}}{P_T}\hat{\Sigma}_l, \hat{\mu}\right), \quad (37)$$

-continued $$(\hat{\Sigma}_l; \hat{\Lambda}_l, \hat{\mu}) = \left(\frac{P_T}{\mu}\Lambda_l; \frac{\mu}{P_T}\Sigma_l, \mu\right). \quad (38)$$

Accordingly, the weighted sum-rate duality for the MIMO interference network with the total power constraint can be proven.

The above illustrates that there is a minimax Lagrangian duality. As described below, such a duality can motivate a novel "iterative minimax" approach (e.g., application of a novel algorithm) for the weighted sum-rate maximization with fast and reliable convergence properties. Such an iterative minimax approach can provide a general approach for networks having multiple linear constraints. For example, using such an approach, a network can be designed in which each antenna on each transmitter is associated with its own power constraint.

Prior to describing the more general iterative minimax approach that allows for multiple linear constraints, a more specialized novel approach is described. The more specialized approach, referred to herein as a "dual link" approach, can operate in a special case in which a network is designed with a single (e.g., total power) constraint. For example, under such a constraint, the total power from all the transmitters added together is constrained to be less than or equal to a predetermined maximum total power.

An illustrative general network system model can be used as a context for dual link approach embodiments. Some such illustrative network embodiments, including both centralized and distributed implementations, are discussed above with reference to FIGS. 1-3. As described above, the illustrative network system is a general interference network, such as as a MIMO B-MAC network. A transmitter in the MIMO B-MAC network can send independent data to different receivers (e.g., via a broadcast channel (BC)), and a receiver can receive independent data from different transmitters (e.g., via a multi-access channel (MAC)). It is assumed that there are L mutually interfering data links. The set of physical transmitter labels is designated as T={TX1, TX2, TX3, . . . }, and the set of physical receiver labels is designated as R={RX1, RX2, RX3, . . . }. Transmitter $T_l$ of link l can be defined as a mapping from l to link l's physical transmitter label in T, and receiver $R_l$ can be defined as a mapping from l to link l's physical receiver label in R. The numbers of antennas at $T_l$ and $R_l$ are $LT_l$ and $LR_l$ respectively.

For purposes of the dual link approach, the optimization problem can be characterized as the weighted sum-rate maximization under a total power constraint:

WSRM_TP: $\max_{\Sigma_{1:L}} \sum_{l=1}^{L} w_l I_l(\Sigma_{1:L})$ s.t. $\Sigma_l \succeq 0, \forall l,$ $\sum_{l=1}^{L} Tr(\Sigma_l) \leq P_T,$ where $w_l > 0$ is the weight for link l. For example, an objective function can be optimized to maximize the weighted sum-rate while constraining all transmitters to operate within a maximum total power. Various techniques can be used to generalize this to multiple linear constraints.

To provide added context to novel implementations described herein, the following is a review of the polite water-filling structure and algorithm used in some traditional approaches. For example, though the problem (e.g., shown above as "WSRM_TP") is non-convex and may not be solvable directly, the optimal transmit signal can be considered as having a polite water-filling structure. An illustrative algorithm designed on this basis and its results are briefly described herein, beginning with the duality results. Let $$\left([H_{l,k}], \sum_{l=1}^{L} Tr(\Sigma_l) \leq P_T\right)$$

denote a network with total power constraint and channel matrices $[H_{l,k}]$ (e.g., as in the WSRM_TP problem above). An achievable rate region of this equation is defined as:

$$R(P_T) \triangleq \bigcup_{\Sigma_{1:L}: \sum_{l=1}^{L} Tr(\Sigma_l) \leq P_T} \left\{r \in \mathbb{R}_+^L : r_l \leq I_l\left(\sum_{1:L}\right), 1 \leq l \leq L\right\}.$$

Its dual network or reverse links is defined as:

$$\left([H_{k,l}^\dagger], \sum_{l=1}^{L} Tr(\hat{\Sigma}_l) \leq P_T\right),$$

where the roles of all transmitters and receivers are reversed, and the channel matrices are replaced with their conjugate transpose. The "^" denotes the corresponding terms in the reverse links. Similarly, the interference-plus-noise covariance matrix of reverse link l is:

$$\hat{\Omega}_l = I + \sum_{\substack{k=1 \\ k \neq l}}^{L} H_{k,l}^\dagger \hat{\Sigma}_k H_{k,l};$$

the achievable rate of reverse link l is:

$$\hat{I}_l(\hat{\Sigma}_{1:L}) = \log|I + H_{l,l}^\dagger \hat{\Sigma}_l H_{l,l} \hat{\Omega}_l^{-1}|;$$

and the reverse link achievable rate region is defined as:

$$\hat{R}(P_T) \triangleq \bigcup_{\hat{\Sigma}_{1:L}: \sum_{l=1}^{L} Tr(\hat{\Sigma}_l) \leq P_T} \left\{\hat{r} \in \mathbb{R}_+^L : \hat{r}_l \leq \hat{I}_l\left(\sum_{1:L}\right), 1 \leq l \leq L\right\}.$$

The rate duality states that the achievable rate regions of the forward and reverse links are the same. A covariance transformation calculates the reverse link input covariance matrices from the forward ones. The rate duality is proved by showing that the reverse link input covariance matrices calculated from the covariance transformation achieves equal or higher rates than the forward link rates under the same value of linear constraint $P_T$.

The Lagrange function of the WSRM_TP problem is:

$$L(\mu, \Theta_{1:L}, \Sigma_{1:L}) = \sum_{l=1}^{L} w_l \log |I + H_{l,l} \Sigma_l H_{l,l}^\dagger \Omega_l^{-1}| + \sum_{l=1}^{L} Tr(\Sigma_l \Theta_l) + \mu \left( P_T - \sum_{l=1}^{L} Tr(\Sigma_l) \right),$$

where $\Theta_{1:L}$ and $\mu$ are Lagrange multipliers. The KKT conditions are:

$$\nabla_{\Sigma_l} L = w_l H_{l,l}^\dagger (\Omega_l + H_{l,l} \Sigma_l H_{l,l}^\dagger)^{-1} H_{l,l} + \Theta_l - \mu I -$$
$$\sum_{k \neq l} w_k H_{k,l}^\dagger (\Omega_k^{-1} - (\Omega_k + H_{k,k} \Sigma_k H_{k,k}^\dagger)^{-1}) H_{k,l}$$
$$= 0,$$

$$\mu \left( P_T - \sum_{l=1}^{L} Tr(\Sigma_l) \right) = 0,$$

$$tr(\Sigma_l \Theta_l) = 0,$$

$$\Sigma_l, \Theta_l \succcurlyeq 0, \mu \geq 0.$$

The polite water-filling structure is given as follows. A key finding leading to the polite water-filling structure is that at a stationary point, the dual input covariance matrices $\hat{\Sigma}_{1:L}$ calculated from the covariance transformation satisfies:

$$\hat{\Sigma}_l = \frac{w_l}{\mu} (\Omega_l^{-1} - (\Omega_l + H_{l,l} \Sigma_l H_{l,l}^\dagger)^{-1}), l = 1, \ldots, L.$$

Substituting this into the preceding equation yields the polite water-filling structure, $$Q_l = G_l D_l G_l^\dagger,$$

$$D_l = (v_l I - \Delta_l^{-2})^+,$$

where $$Q_l \triangleq \hat{\Omega}_l^{\frac{1}{2}} \Sigma_l \hat{\Omega}_l^{\frac{1}{2}}$$

is the equivalent input covariance matrix of the link l; $G_l$ and $\Delta_l$ are from SVD decomposition of the equivalent single-user channel $\overline{H}_l = F_l \Delta_l G_l$; $\overline{H}_l$ is given by $\overline{H}_l = \Omega_l^{-1/2} H_{l,l} \hat{\Omega}_l^{-1/2}$; $\hat{\Sigma}_{1:L}$ is obtained from $\Sigma_{1:L}$ by the covariance transformation described in reference [5] (Definition 4), and is used to calculate the corresponding $$\hat{\Omega}_{1:L}; v_l = \frac{w_l}{\mu} \geq 0$$

is the water-filling level. That is the link l's equivalent input covariance matrix $Q_l$ is a water-filling over the equivalent channel $\overline{H}_l$.

In addition, at a stationary point, the $\hat{\Sigma}_{1:L}$ obtained from the covariance transformation also have the polite water-filling structure and satisfy the following KKT conditions of the following dual problem:

$$\text{WSRM\_TP\_D: } \max_{\hat{\Sigma}_{1:L}} \sum_{l=1}^{L} w_l \hat{I}_l(\hat{\Sigma}_{1:L})$$

$$\text{s.t. } \hat{\Sigma}_l \succcurlyeq 0, \forall l,$$

$$\sum_{l=1}^{L} Tr(\hat{\Sigma}_l) \leq P_T,$$

whose KKT conditions are:

$$w_l H_{l,l} (\hat{\Omega}_l + H_{l,l}^\dagger \hat{\Sigma}_l H_{l,l})^{-1} H_{l,l}^\dagger + \hat{\Theta}_l - \hat{\mu} I -$$
$$\sum_{k \neq l} w_k H_{k,l} \left( \hat{\Omega}_k^{-1} - \left( \hat{\Omega}_k + H_{k,k}^\dagger \hat{\Sigma}_k H_{k,k} \right)^{-1} \right) H_{k,l}^\dagger = 0,$$

$$\hat{\mu} \left( P_T - \sum_{l=1}^{L} Tr(\hat{\Sigma}_l) \right) = 0,$$

$$tr(\hat{\Sigma}_l \hat{\Theta}_l) = 0,$$

$$\hat{\Sigma}_l, \hat{\Theta}_l \succcurlyeq 0, \hat{\mu} \geq 0.$$

Similar to the derivation performed above, the polite water-filling structure on reverse links can yield:

$$\Sigma_l = \frac{w_l}{\hat{\mu}} (\hat{\Omega}_l^{-1} - (\hat{\Omega}_l + H_{l,l}^\dagger \hat{\Sigma}_l H_{l,l})^{-1}), l = 1, \ldots, L.$$

It is known that $\Sigma_{l=1}^{L} Tr(\Sigma_l) = P_T$ when $\Sigma_{1:L}$ is a stationary point of the WSRM_TP problem, which can indicate that the full power should be used. Since the covariance transformation preserves total power, this further indicates that $\Sigma_{l=1}^{L} Tr(\Sigma_l) = \Sigma_{l=1}^{L} Tr(\hat{\Sigma}_l) = P_T$. It can also be proved that $Tr(Q_l) = Tr(\hat{Q}_l)$, where $$\hat{Q}_l \triangleq \Omega_l^{\frac{1}{2}} \hat{\Sigma}_l \Omega_l^{\frac{1}{2}}$$

are the reverse link equivalent covariance matrices.

The polite water-filling algorithm can be described as follows. After initializing the reverse link interference-plus-noise covariance matrices $\hat{\Omega}_{1:L}$, a forward link polite water-filling can be performed using equations presented above, followed by a reverse link polite water-filling, which is defined to be one iteration. The iterations can stop when the change of the objective function is less than a threshold or when a predetermined number of iterations is reached. Because the algorithm enforces the optimal signal structure at each iteration, it can converge very quickly. In particular, for parallel channels, it can reduce to the traditional water-filling and gives the optimal solution in half of an iteration with initial values $\hat{\Omega}_l = I$, $\forall l$. Unfortunately, this remarkable algorithm sometimes does not converge and the objective function has some oscillation, especially in very strong interference cases.

Instead of using the equations for $\Sigma$ and $\hat{\Sigma}$ described above to solve the KKT condition for the polite water-filling structure, some embodiments directly use these two equations to update $\Sigma_{1:L}$ and $\hat{\Sigma}_{1:L}$. Note that, since the full power is used, Lagrange multiplier $\mu$ can be chosen to satisfy the power constraint $\Sigma_{l=1}^{L} Tr(\Sigma_l) = P_T$ as:

$$\mu = \frac{1}{P_T} \sum_{l=1}^{L} w_l tr\left(\hat{\Omega}_l^{-1} - \left(\hat{\Omega}_l + H_{l,l}^\dagger \hat{\Sigma}_l H_{l,l}\right)^{-1}\right).$$

This provides a novel approach, referred to herein as a "dual link" approach for exploiting the structure of the weighted sum-rate maximization problem, and, as confirmed by analytical analysis and numerical experiments, has fast monotonic convergence. It converges to a stationary point of both the WSRM_TP and WSRM_TP_D problems simultaneously. Further, at the stationary point, both the $\Sigma$ and $\hat{\Sigma}$ achieve the same sum-rate For the sake of illustration, the dual link approach can be described as follows:

1. Initialize $\Sigma_l$'s, s.t. $\sum_{l=1}^{L} Tr(\Sigma_l) = P_T$

2. $R \Leftarrow \sum_{l=1}^{L} w_l \mathcal{I}_l(\Sigma_{1:L})$

3. Repeat

4. $R' \Leftarrow R$

5. $\Omega_l \Leftarrow I + \sum_{k \neq l} H_{lk} \Sigma_k H_{lk}^\dagger$

6. $\hat{\Sigma}_l \Leftarrow \dfrac{P_T w_l \left(\Omega_l^{-1} - \left(\Omega_l + H_{ll} \Sigma_l H_{ll}^\dagger\right)^{-1}\right)}{\sum_{l=1}^{L} w_l tr\left(\Omega_l^{-1} - \left(\Omega_l + H_{ll} \Sigma_l H_{ll}^\dagger\right)^{-1}\right)}$ 7. $\hat{\Omega}_l \Leftarrow I + \sum_{k \neq l} H_{kl}^\dagger \hat{\Sigma}_k H_{kl}$ 8. $\Sigma_l = \dfrac{P_T w_l \left(\hat{\Omega}_l^{-1} - \left(\hat{\Omega}_l + H_{ll}^\dagger \hat{\Sigma}_l H_{ll}\right)^{-1}\right)}{\sum_{l=1}^{L} w_l tr\left(\hat{\Omega}_l^{-1} - \left(\hat{\Omega}_l + H_{ll}^\dagger \hat{\Sigma}_l H_{ll}\right)^{-1}\right)}$ 9. $R \Leftarrow \sum_{l=1}^{L} w_l \mathcal{I}_l(\Sigma_{1:L})$ 10. until $|R - R'| \leq \epsilon$.

Figure 4A:
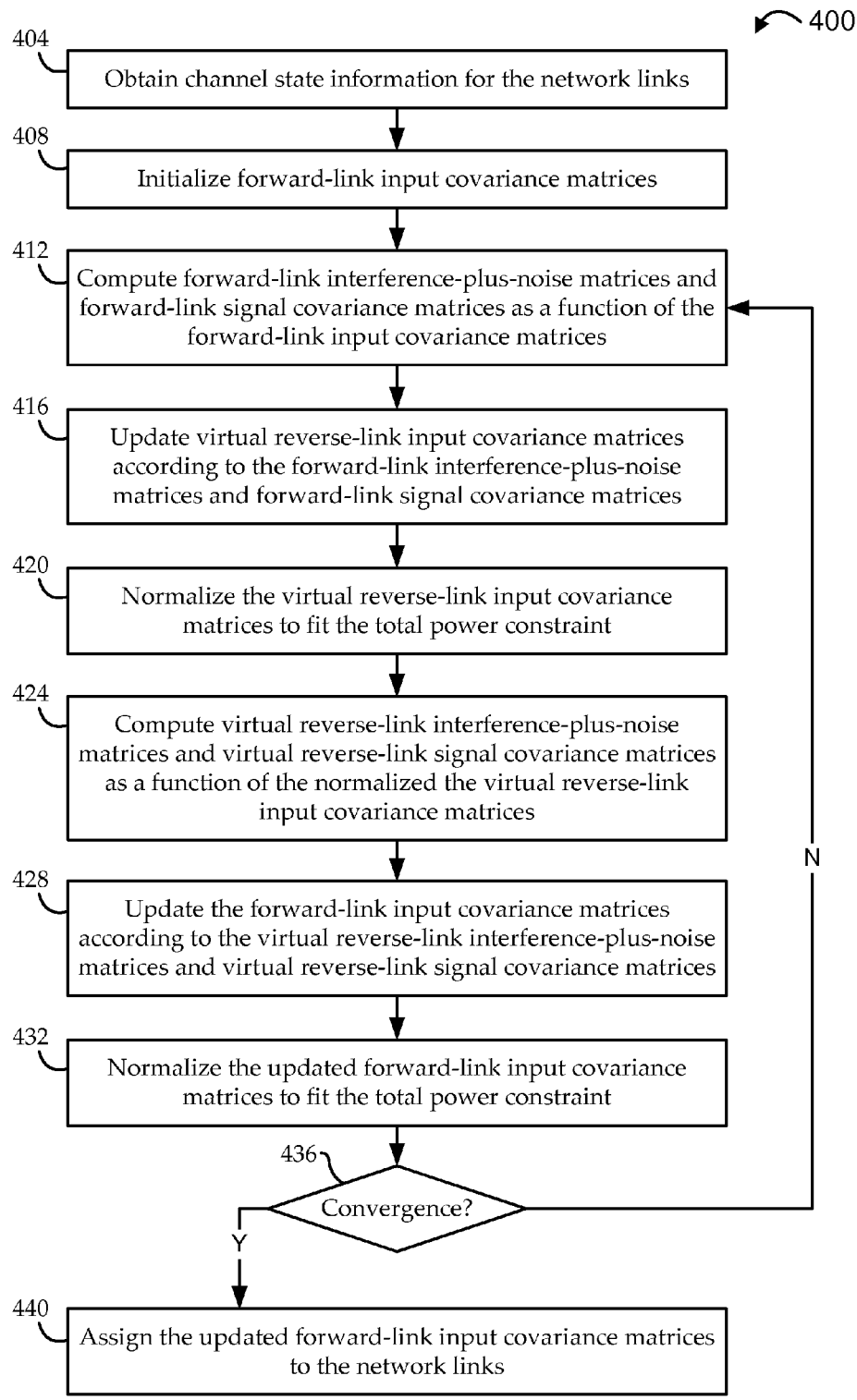
FIG. 4A shows a flow diagram of an illustrative method for applying a centralized dual link approach to a communications network, according to various embodiments.

FIG. 4A shows a flow diagram of an illustrative method 400 for applying a centralized dual link approach to a communications network, according to various embodiments. Embodiments of the method 400 begin at stage 404 by obtaining channel state information for all the links. This can be done, for example, by sending pilot training sequences from transmitters to receivers and feeding back all the estimated channel matrices to the central controller.

At stage 408, an initial point can be selected for the optimization, as an initial forward-link signal communication model. This can be implemented as initializing a signal covariance matrix $\Sigma_l$ (e.g., as in step 1 above). This initial point can represent a random point, a corner case (e.g., all power being assigned to one of the transmitters), or any other suitable point (e.g., evenly distributed power to all transmitters, etc.). The forward-link signal communication model can represent how each transmitter will transmit (e.g., the amount of power, phase, etc.).

Implementations can then iterate to find an optimal point. For example, each iteration can begin at stage 412, and the objective function value or weighted sum-rate (R') is calcuted from the initial $\Sigma_l$ generated at stage 408. Each iteration can end at stage 432, when an updated objective function value (R) is computed. The iterations can continue until a convergence criterion is met (e.g., |R-R'| is less than some threshold $\epsilon$), at stage 436. Theoretically, the iteration can continue until the solution fully converges (i.e., there is no change from one iteration to the next). Practically, however, it can be desirable to stop iterating when less than a threshold change is experienced, which may occur very quickly and well before a full convergence.

In general, the iterative optimization steps can be described as follows. At stage 412, forward-link interference-plus-noise matrices and forward-link signal covariance matrices can be computed as a function of the last-updated forward-link input covariance matrices (e.g., the initialized forward-link input covariance matrices from stage 408 in the first iteration, and the normalized last-updated forward-link input covariance matrices in subsequent iterations).

At stage 416, the forward-link properties can be used to compute virtual reverse-link properties; the present signal transmission model and calculated interference-plus-noise model for the forward links of the network can be used to calculate corresponding models for the virtual reverse links of the network. According to some centralized implementations, the reverse link network is a dual of the physically existing forward link network, and no physical signal is transmitted on the virtual reverse links. In particular, at stage 416, the forward-link interference-plus-noise covariance matrices and the forward-link signal covariance matrices can be used to update virtual reverse-link input covariance matrices (e.g., representing a reverse-link signal communication model). The updated reverse-link input covariance matrices can be normalized at stage 420 to fit the total power constraint. For example, in step 6 of the dual-link algorithm above, $P_T$ and the denominator part of the right-side equation form the normalizing factor of the total power constraint. At stage 424, the normalized updated reverse-link input covariance matrices can be used to compute virtual reverse-link interference-plus-noise covariance matrices and virtual reverse-link input covariance matrices.

Stages 428 and 432 can effectively update and normalize the forward-link model according to the virtual reverse-link interference model computed in stage 424 in much the same way that the stages 416 and 420 update and normalize the virtual reverse-link model according to the forward-link interference model computed in stage 412. For example, at stage 428, the virtual reverse-link interference-plus-noise covariance matrices and the virtual reverse-link signal covariance matrices can be used to update the forward-link input covariance matrices. The updated forward-link input covariance matrices can be normalized at stage 432 to fit the total power constraint. The normalized updated forward-link input covariance matrices can be used to compute the updated solution (R) to the objective function as part of stage 432, or as part of the determination at stage 436 as to whether the previous solution (R') differs from the updated solution (R) by less than a predetermined threshold amount. If so, embodiments can carry out another iteration of stages 412-436, based on the updated solution and the updated forward-link signal communication model.

If it is determined at stage 436 that the solution had adequately converged (e.g., that |R-R'|<$\epsilon$), embodiments can consider the solution to be optimal. At stage 440, embodiments can send the last-updated forward-link signal communication model (i.e., the normalized last-updated forward-link input covariance matrices) to all the transmitters for use in setting their transmission characteristcs. For example, the last-updated forward-link signal covariance matrix can be used to compute a beam forming matrix, which can be multiplied by error encoded transmission data vectors at the transmitters to generate transmission signals.

Figure 4B:
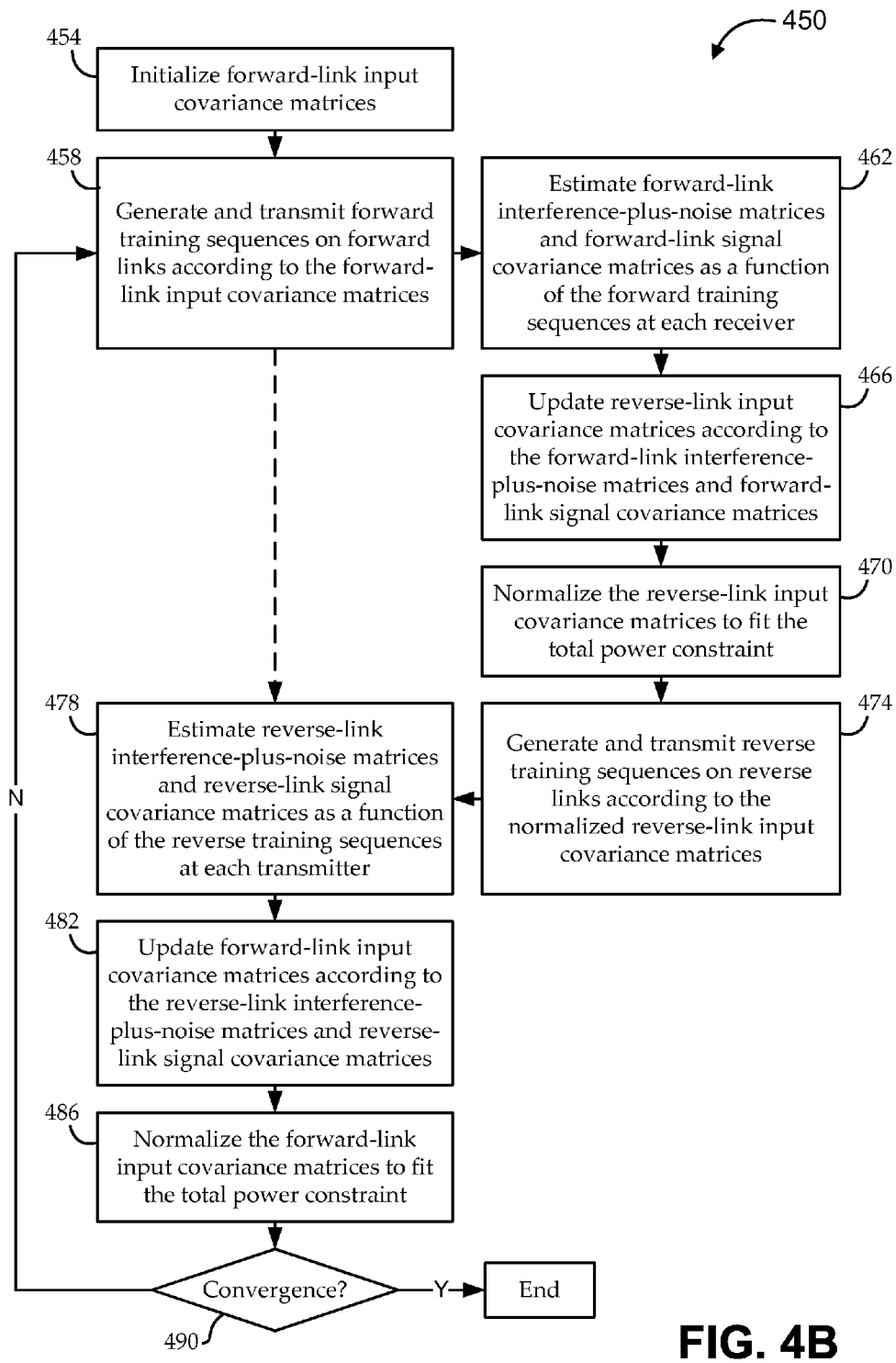
FIG. 4B shows a flow diagram of an illustrative method for applying a distributed dual link approach to a communications network, according to various embodiments.

FIG. 4B shows a flow diagram of an illustrative method 450 for applying a distributed dual link approach to a communications network, according to various embodiments. As illustrated in FIG. 3, a distributed approach can be implemented without a central controller. Instead of feeding back all the channel information back to the central controller (as in stage 404 of the method 400 of FIG. 4A), and sending the calculated input covariance matrices to different transmitters (as in stage 440 of the method 400 of FIG. 4A), embodiments of the method 450 of FIG. 4B can use properly designed forward-link and reverse-link training sequences to pass information between transmitters and receivers without matrix feedbacks and can run its iterations on the air.

At stage 454, each transmitter initializes its own initial forward-link signal communication model in a manner that the total power constraint is satisfied. For example, L transmitters can each use Pt/L power when the total power constraint for these L transmitters is Pt. At stage 458, each transmitter sends out a forward-link training sequence that contains information about its forward-link signal communication model.

At stage 462, each receiver estimates its forward-link interference-plus-noise covariance matrix ($\Omega_l$) and forward-link signal covariance matrix ($H_l\Sigma_l H_l^\dagger$). For example, each transmitter can transmit random vector sequences that has covariance $H_l\Sigma_l H_l^\dagger$ at different time slots, and each receiver can listen to all the forward-link signal covariance matrices including its own. After all the transmitters finish their respective transmissions, every receiver can estimate its own $\Omega_l$ and $H_l\Sigma_l H_l^\dagger$.

Embodiments of the method 450 proceed with stages 466 and 470 in a similar fashion as described above with reference to stages 416 and 420 of FIG. 4A. For example, oce a receiver has estimated its $\Omega_l$ and $H_l\Sigma_l H_l^\dagger$, it can update and normalize its reverse-link input covariance matrices according to the estimated covariance matrices in stages 466 and 470, respectively. At stage 474, the receivers can generate and transmit reverse-link training sequences on their respective reverse links. A receiver's reverse-link training sequences can include information about its reverse-link signal communication model to the transmitters.

At stage 478, the transmitters can estimate reverse-link interference-plus-noise covariance matrices and reverse-link signal covariance matrices according to the reverse-link training sequences. As in stages 428 and 432 of FIG. 4A, embodiments of the method 450 can proceed at stages 482 and 486, respectively, to update and normalize the forward-link input covariance matrices as a function of the estimated reverse-link interference-plus-noise covariance matrices and reverse-link signal covariance matrices. A new objective function value R can be calculated and compared with the previous value R', and a determination can be made at stage 490 as to whether the convergence criterion is met. If so, the method 450 can end. If not, embodiments can return to stage 458 for another iteration using the normalized last-updated forward-link input covariance matrices.

It is noted that the centralized and distributed approaches perform largely the same computations. If the number of users L in the interference network grows large, the distributed method 450 can manifest significantly lower overhead then that of the centralized method 400. This at least because the system resources used to feed back the channel matrices grows at $O(L^2)$, while the resources used for forward and reverse link training grows at $O(L)$.

As noted above, the dual link approach provides a solution that converges quickly and reliably. The following provides an illliustrative proof of the monotonic convergence of the dual link algorithmic described above. For the sake of context, some preliminaries are provided.

Lagrangian of the weighted sum-rate function: The WSRM_TP problem discussed above can be considered as equivalent to the following problem:

$$\max_{\Sigma_{1:L},\Omega_{1:L}} \sum_{l=1}^{L} w_l\left(\log|\Omega_l + H_{l,l}\Sigma_l H_{l,l}^\dagger| - \log|\Omega_l|\right)$$

$$\text{s.t.} \quad \Sigma_l \succeq 0, \forall l,$$

$$\sum_{l=1}^{L} Tr(\Sigma_l) \leq P_T,$$

$$\Omega_l = I + \sum_{k \neq l} H_{l,k}\Sigma_k H_{l,k}^\dagger, \forall l,$$

which is non-convex. Consider the Lagrangian of the above problem:

$$F(\Sigma, \Omega, \Lambda, \mu) = \sum_{l=1}^{L} w_l\left(\log|\Omega_l + H_{l,l}\Sigma_l H_{l,l}^\dagger| - \log|\Omega_l|\right) +$$

$$\mu\left\{P_T - \sum_{l=1}^{L} Tr(\Sigma_l)\right\} + \sum_{l=1}^{L} Tr\left(\Lambda_l\left(\Omega_l - I - \sum_{k \neq l} H_{l,k}\Sigma_k H_{l,k}^\dagger\right)\right),$$

where the domain of F is:

$$\left\{\Sigma, \Omega, \Lambda, \mu \,\middle|\, \Sigma_l \in \mathbb{H}_+^{L_{R_l} \times L_{R_l}}, \Omega_l \in \mathbb{H}_{++}^{L_{R_l} \times L_{R_l}}, \Lambda_l \in \mathbb{H}_+^{L_{R_l} \times L_{R_l}}, \mu \in \mathbb{R}^+\right\}.$$

Here $\mathbb{H}^{n \times n}$, $\mathbb{H}_+^{n \times n}$, $\mathbb{H}_{++}^{n \times n}$ mean n by n Hermitian matrix, positive semidefinite matrix, and positive definite matrix, respectively.

One can verify that the function F is concave in $\Sigma$ and convex in $\Omega$ (i.e., there is a saddle point). Furthermore, the partial derivatives are given by:

$$\frac{\partial F}{\partial \Sigma_l} = w_l H_{l,l}^\dagger\left(\Omega_l + H_{l,l}\Sigma_l H_{l,l}^\dagger\right)^{-1} H_{l,l} - \mu I - \sum_{k \neq l} H_{k,l}^\dagger \Lambda_l H_{k,l},$$

$$\frac{\partial F}{\partial \Omega_l} = w_l\left(\left(\Omega_l + H_{l,l}\Sigma_l H_{l,l}^\dagger\right)^{-1} - \Omega_l^{-1}\right) + \Lambda_l.$$

Now suppose the pair ($\Sigma$, $\Omega$), such that:

$$\sum_{l=1}^{L} Tr(\Sigma_l) = P_T,$$

$$\Omega_l = I + \sum_{k \neq l} H_{l,k}\Sigma_k H_{l,k}^\dagger,$$

then, $$F(\Sigma, \Omega, \Lambda, \mu) = \sum_{l=1}^{L} w_l \left( \log|\Omega_l + H_{l,l} \Sigma_l H_{l,l}^\dagger| - \log|\Omega_l| \right),$$

which is the original weighted sum-rate function. For notational simplicity, the weighted sum-rate function can be denoted by $V(\Sigma)$, such that:

$$V(\Sigma) = \sum_{l=1}^{L} w_l \left( \log \left| I + \sum_{k \neq l} H_{l,k} \Sigma_k H_{l,k}^\dagger + H_{l,l} \Sigma_l H_{l,l}^\dagger \right| - \log \left| I + \sum_{k \neq l} H_{l,k} \Sigma_k H_{l,k}^\dagger \right| \right).$$

Solution of the first-order condition: To solve the following system of equations in terms of $(\Sigma, \Omega)$, for given $(\Lambda, \mu)$:

$$\frac{\partial F}{\partial \Sigma_l} = 0,$$

$$\frac{\partial F}{\partial \Omega_l} = 0.$$

Define:

$$\hat{\Sigma}_l = \frac{1}{\mu} \Lambda_l,$$

$$\hat{\Omega}_l = I + \sum_{k \neq n} H_{k,l}^\dagger \hat{\Sigma}_l H_{k,l},$$

and the above system of equations becomes:

$$w_l H_{l,l}^\dagger (\Omega_l + H_{l,l} \Sigma_l H_{l,l}^\dagger)^{-1} H_{l,l} = \mu \hat{\Omega}_l,$$

$$w_l (\Omega_l^{-1} - (\Omega_l + H_{l,l} \Sigma_l H_{l,l}^\dagger)^{-1}) = \mu \hat{\Sigma}_l.$$

A solution to this system of equations is given by:

$$\Sigma_l = \frac{w_l}{\mu} \left( \hat{\Omega}_l^{-1} - (\hat{\Omega}_l + H_{l,l}^\dagger \hat{\Sigma}_l H_{l,l})^{-1} \right)$$

$$\Omega_l = \frac{w_l}{\mu} H_{l,l} (H_{l,l}^\dagger \hat{\Sigma}_l H_{l,l} + \hat{\Omega}_l)^{-1} H_{l,l}^\dagger.$$

In light of the above preliminaries, illustrative convergence results can be presented for the dual link approch. Denote by $\Sigma^{(n)}$ the $\Sigma$ value at the nth iteration of the dual link algorithm.

A theorem ("Theorem 2") can be provided as follows. The objective value, i.e., the weighted sum-rate, is monotonically increasing in the dual link algorithm, as:

$$V(\Sigma^{(n)}) \leq V(\Sigma^{(n+1)}).$$

From the above theorem, the following conclusion is immediate: The sequence $V_n = V(\Sigma^{(n)})$ converges to some limit point $V_\infty$. This can be proven as follows. Since $V(\Sigma)$ is a continuous function and its domain $\{\Sigma | \Sigma \geq 0, \text{Tr}(\Sigma) \leq P_T\}$ is a compact set, $V_n$ is bounded above. From Theorem 1, $\{V_n\}$ is a monotone increasing sequence. Therefore, there exists a limit point $V_\infty$ such that $\lim_{n \to \infty} V_n = V_\infty$. If a stationary point $(\Sigma^*)$ of the dual link algorithm is defined as $\Sigma^{(n)} = \Sigma^*$ implies $\Sigma^{(n+k)} = \Sigma^*$ for all $k = 0, 1, \ldots$, then we have the following result: The dual link algorithm converges to a stationary point $\Sigma^*$ ("Theorem 3").

For further context, a few inequalities are established, and a particular scaling property is identified of the Lagrangian F. According to a first inequality, suppose a feasible point $\Sigma^{(n)} \geq 0$, and $\Sigma_{l=1}^{L} \text{Tr}(\Sigma_l^{(n)}) = P_T$. In the dual link algorithm, generate $\Omega_l^{(n)}$ can be generated, such that:

$$\Omega_l^{(n)} = I + \sum_{k \neq l} H_{l,k} \Sigma_k^{(n)} H_{l,k}^\dagger.$$

This can yield a pair $(\Sigma^{(n)}, \Omega^{(n)})$. Using this pair, $(\Lambda^{(n)}, \mu^{(n)})$ can be computed, such that:

$$\Lambda_l^{(n)} = w_l \left( \Omega_l^{(n)-1} - (\Omega_l^{(n)} + H_{l,l} \Sigma_l^{(n)} H_{l,l}^\dagger)^{-1} \right),$$

$$\mu^{(n)} = \frac{1}{P_T} \sum_{l=1}^{L} \text{Tr}(\Lambda_l^{(n)}).$$

Note that $\hat{\Sigma}^{(n)}$ in the dual link approach is equal to:

$$\hat{\Sigma}_l^{(n)} = \frac{\Lambda_l^{(n)}}{\mu^{(n)}}.$$

From this, the gradient of F with respect to $\Omega$ at the point $(\Sigma^{(n)}, \Omega^{(n)})$ vanishes, such that:

$$\left. \frac{\partial F(\Sigma^{(n)}, \Omega, \Lambda^{(n)}, \mu^{(n)})}{\partial \Omega} \right|_{\Omega^{(n)}} = 0.$$

Since F is convex in $\Omega$, fixing $\Sigma = \Sigma^{(n)}$, $\Omega^{(n)}$ is a global minimizer of F. In other words, $$F(\Sigma^{(n)}, \Omega^{(n)}, \Lambda^{(n)}, \mu^{(n)}) \leq F(\Sigma^{(n)}, \Omega, \Lambda^{(n)}, \mu^{(n)}),$$

for all $\Omega > 0$.

Scaling invariance of F: A scaling invariance property of F is identified, which plays a key role in the convergence proof of the dual link algorithm. For given $(\Sigma^{(n)}, \Omega^{(n)}, \Lambda^{(n)}, \mu^{(n)})$:

$$F\left(\frac{1}{\alpha} \Sigma^{(n)}, \frac{1}{\alpha} \Omega^{(n)}, \alpha \Lambda^{(n)}, \alpha \mu^{(n)}\right) = F(\Sigma^{(n)}, \Omega^{(n)}, \Lambda^{(n)}, \mu^{(n)})$$

for all $\alpha > 0$. To show this scaling invariance property, note that:

$$\Omega_l^{(n)} - \sum_{k \neq l} H_{l,k} \Sigma_k^{(n)} H_{l,k}^\dagger = I,$$

$$\sum_{l=1}^{L} \text{Tr}(\Sigma_l^{(n)}) = P_T,$$

$$P_T \mu^{(n)} = \sum_{l=1}^{L} \text{Tr}(\Lambda_l^{(n)}).$$

Applying the above equalities and some mathematical manipulations can yeild:

$$F\left(\frac{1}{\alpha}\Sigma^{(n)}, \frac{1}{\alpha}\Omega^{(n)}, \alpha\Lambda^{(n)}, \alpha\mu^{(n)}\right) = \sum_{l=1}^{L} w_l \left(\log|\Omega_l^{(n)} + H_{l,l}\Sigma_l^{(n)}H_{l,l}^\dagger| - \log|\Omega_l^{(n)}|\right) + \alpha\mu^{(n)}\left\{P_T - \frac{1}{\alpha}P_T\right\} +$$

$$\sum_{l=1}^{L} Tr\left(\alpha\Lambda_l^{(n)}\left(\frac{1}{\alpha}I - I\right)\right)$$

$$= \sum_{l=1}^{L} w_l \left(\log|\Omega_l^{(n)} + H_{l,l}\Sigma_l^{(n)}H_{l,l}^\dagger| - \log|\Omega_l^{(n)}|\right) + (\alpha-1)\mu^{(n)}P_T +$$

$$(1-\alpha)\sum_{l=1}^{L} Tr(\Lambda_l^{(n)})$$

$$= \sum_{l=1}^{L} w_l \left(\log|\Omega_l^{(n)} + H_{l,l}\Sigma_l^{(n)}H_{l,l}^\dagger| - \log|\Omega_l^{(n)}|\right)$$

$$= F(\Sigma^{(n)}, \Omega^{(n)}, \Lambda^{(n)}, \mu^{(n)}),$$

where the first equality uses the fact that $$\log\left|\frac{1}{\alpha}(\Omega_l^{(n)} + H_{l,l}\Sigma_l^{(n)}H_{l,l}^\dagger)\right| - \log\left|\frac{1}{\alpha}\Omega_l^{(n)}\right| = \log|\Omega_l^{(n)} + H_{l,l}\Sigma_l^{(n)}H_{l,l}^\dagger| - \log|\Omega_l^{(n)}|.$$

Furthermore, $$\frac{\partial F\left(\frac{1}{\alpha}\Sigma^{(n)}, \Omega, \alpha\Lambda^{(n)}, \alpha\mu^{(n)}\right)}{\partial \Omega}\bigg|_{\frac{1}{\alpha}\Omega^{(n)}} = w_l\left(\left(\frac{1}{\alpha}\Omega_l^{(n)} + H_{l,l}\frac{1}{\alpha}\Sigma_l^{(n)}H_{l,l}^\dagger\right)^{-1} - \left(\frac{1}{\alpha}\Omega_l^{(n)}\right)^{-1}\right) + \alpha\Lambda_l^{(n)}$$

$$= \alpha\frac{\partial F(\Sigma^{(n)}, \Omega, \Lambda^{(n)}, \mu^{(n)})}{\partial \Omega}\bigg|_{\Omega^{(n)}}$$

$$= 0.$$

Therefore, $$\frac{1}{\alpha}\Omega^{(n)}$$

is a global minimizer of $$F\left(\frac{1}{\alpha}\Sigma^{(n)}, \Omega, \alpha\Lambda^{(n)}, \alpha\mu^{(n)}\right),$$

as F is convex in $\Omega$.

The second and third inequalities: Given $(\alpha\Lambda^{(n)}, \alpha\mu^{(n)})$, $\tilde{\Sigma}$, $\tilde{\Omega}$ can be generated using equations described above for $\Sigma_l$ and $\Omega_l$, respectively. If $\alpha$ is chosen so that $\Sigma_{l=1}^{L}\tilde{\Sigma}_l=P_T$, then $\tilde{\Sigma}=\Sigma^{(n+1)}$ in the dual link algorithm. Since $(\Sigma^{(n+1)}, \tilde{\Omega})$ is chosen to make partial derivatives zero:

$$\frac{\partial F(\Sigma, \tilde{\Omega}, \alpha\Lambda^{(n)}, \alpha\mu^{(n)})}{\partial \Sigma_l}\bigg|_{\Sigma^{(n+1)}} = 0,$$

$$\frac{\partial F(\Sigma^{(n+1)}, \Omega, \alpha\Lambda^{(n)}, \alpha\mu^{(n)})}{\partial \Omega_l}\bigg|_{\tilde{\Omega}} = 0,$$

It can be concluded that $\Sigma^{(n+1)}$ is a global maximizer, such that:

$$F(\Sigma, \tilde{\Omega}, \alpha\Lambda^{(n+1)}, \alpha\mu^{(n+1)}) \leq F(\Sigma^{(n+1)}, \tilde{\Omega}, \alpha\Lambda^{(n)}, \alpha\mu^{(n)})$$

for all $\Sigma \geq 0$; and $\tilde{\Omega}$ is a global minimizer, such that:

$$F(\Sigma^{(n+1)}, \tilde{\Omega}, \alpha\Lambda^{(n)}, \alpha\mu^{(n)}) \leq F(\Sigma^{(n+1)}, \Omega, \alpha\Lambda^{(n)}, \alpha\mu^{(n)})$$

for all $\Omega > 0$.

With the three inequalities obtained above, a proof is provided for Theorem 2. As in the dual link algorithm $\Omega_l^{(n+1)} = I + \Sigma_{k \neq l} H_{l,k} \Sigma_k^{(n+1)} H_{l,k}^\dagger$:

$$V(\Sigma^{(n+1)}) = F(\Sigma^{(n+1)}, \Omega^{(n+1)}, \alpha\Lambda^{(n)}, \alpha\mu^{(n)})$$

$$\geq F(\Sigma^{(n+1)}, \tilde{\Omega}, \alpha\Lambda^{(n)}, \alpha\mu^{(n)})$$

$$\geq F\left(\frac{1}{\alpha}\Sigma^{(n)}, \tilde{\Omega}, \alpha\Lambda^{(n)}, \alpha\mu^{(n)}\right)$$

$$\geq F\left(\frac{1}{\alpha}\Sigma^{(n)}, \frac{1}{\alpha}\Omega^{(n)}, \alpha\Lambda^{(n)}, \alpha\mu^{(n)}\right)$$

$$= F(\Sigma^{(n)}, \Omega^{(n)}, \Lambda^{(n)}, \mu^{(n)})$$

$$= V(\Sigma^{(n)}),$$

where the inequalities follows from those obtained above (in reverse order).

Proof of Theorem 3: It has been shown above that $V_n$ converges to a limit point under the dual link algorithm. To show the convergence of the algorithm, it is enough to show that if $V(\Sigma^{(n)}) = V(\Sigma^{(n+1)})$, then $\Sigma^{(n+1)} = \Sigma^{(n+k)}$ for all $k=1, 2, \ldots$. Supposing $V(\Sigma^{(n)}) = V(\Sigma^{(n+1)})$, the proof in the above yeilds:

$$F(\Sigma^{(n+1)}, \Omega^{(n+1)}, \alpha\Lambda^{(n)}, \alpha\mu^{(n)}) = F(\Sigma^{(n+1)}, \tilde{\Omega}, \alpha\Lambda^{(n)}, \alpha\mu^{(n)}).$$

Since $\tilde{\Omega}$ is a global minimizer, the above equality implies $\Omega^{(n+1)}$ is also a global minimizer.

The first order condition for optimality can yeild:

$$\frac{\partial F(\Sigma^{(n+1)}, \Omega, \alpha\Lambda^{(n)}, \alpha\mu^{(n+1)})}{\partial \Omega_l}\bigg|_{\Omega^{(n+1)}} = w_l\left((\Omega_l^{(n+1)} + H_{l,l}\Sigma_l^{(n+1)}H_{l,l}^\dagger)^{-1} - \{\Omega_l^{(n+1)}\}^{-1}\right) + \alpha\Lambda_l^{(n)}$$

$$= 0.$$

On the other hand, $\Lambda^{(n+1)}$ can be generated such that:

$$\Lambda_l^{(n+1)} = w_l\left(\Omega_l^{(n+1)^{-1}} - (\Omega_l^{(n+1)} + H_{l,l}\Sigma_l^{(n+1)}H_{l,l}^\dagger)^{-1}\right)$$

$$= \alpha\Lambda_l^{(n)}.$$

This shows $\hat{\Sigma}^{(n+1)} \propto \hat{\Sigma}^{(n)}$. However, since the trace of each matrix is the same, it can be concluded that:

$$\hat{\Sigma}^{(n+1)} = \hat{\Sigma}^{(n)}.$$

From this it is follows that $\hat{\Sigma}^{(n)} = \hat{\Sigma}^{(n+1)} = \ldots$, and $\Sigma^{(n+1)} = \Sigma^{(n+2)} = \ldots$.

Various numerical examples are provided to verify some of the analyses presented above, and to provide further comparison between the dual link approach and previous approaches, such as those based on traditional PWF and WMMSE algorithms. Consider a B-MAC network with L=10 links among 10 transmitter-receiver pairs that fully interfere with each other. Each link has 3 transmit antennas and 4 receive antennas. For each simulation, the channel matrices are independently generated by one realization of $H_{l,k} = \sqrt{g_{l,k}} H_{l,k}^{(W)}$, $\forall k, l$, where $H_{l,k}^{(W)}$ has zero-mean, independent and identically distributed, complex Gaussian entries with unit variance, and $g_{l,k}$ is the average channel gain. The weights $w_l$'s are uniformly chosen from 0.5 to 1. The total transmit power $P_T$ in the network is 100.

Figure 5:
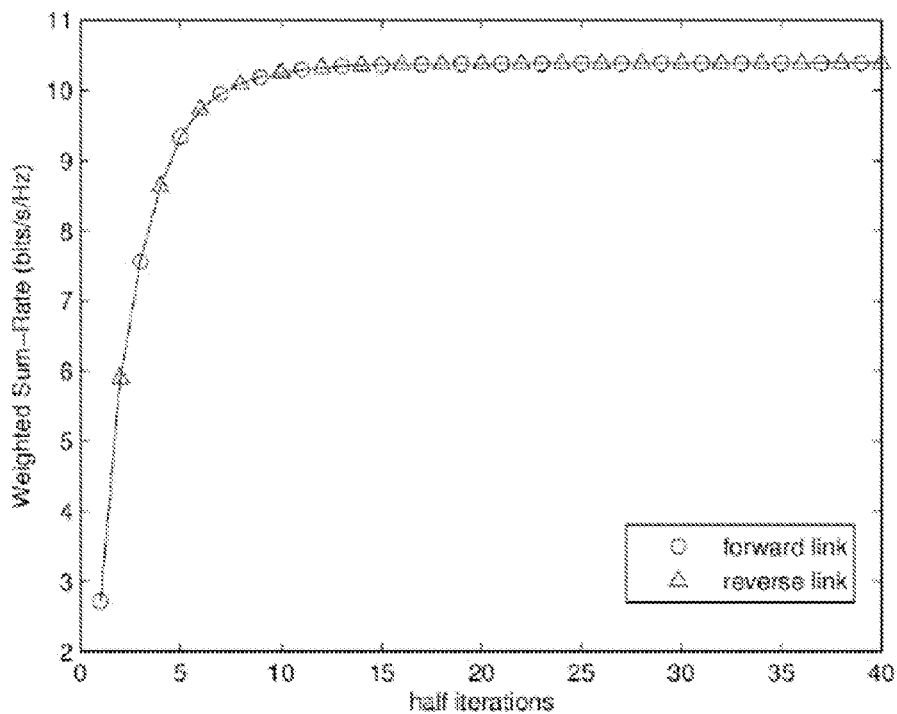
FIG. 5 shows the convergence of the dual link algorithm for a particular network configuration.

FIG. 5 shows the convergence of the dual link algorithm for a network with $g_{l,k}=0$ dB, $\forall l, k$. For example, from the proof of Theorem 2 above, the weighted sum-rate of the forward links and that of the reverse links not only increase monotonically over iterations, but also can increase over each other over half iterations. According to the dual link approach (e.g., the method 400 of FIG. 4), the reverse link transmit signal covariance matrices can be updated in the first half of each iteration, and the forward link transmit signal covariance matrices can be updated in the second half of each iteration. FIG. 5 illustrates that the weighted sum-rates of the forward links and reverse links can increase in turns until they converge to a same value, which can also confirm that the WSRM_TP problem and its dual WSRM_TP_D problem can reach their stationary points at the same time.

Figure 6:
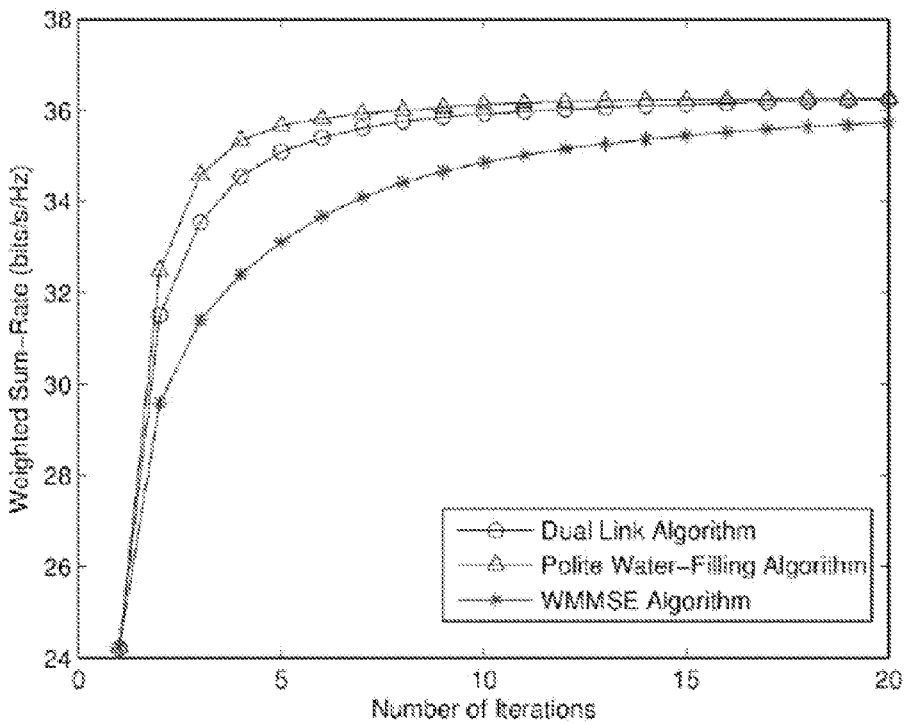
FIG. 6 shows a dual link convergence comparison under a weak interference condition.
Figure 7:
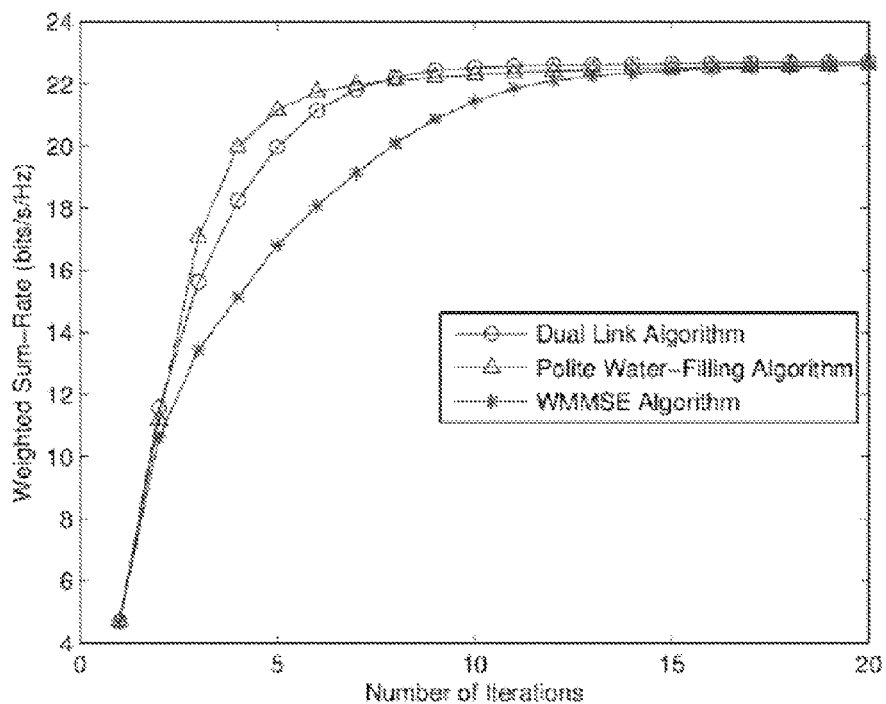
FIG. 7 shows a dual link convergence comparison under a moderate interference condition.

To further illustrate certain features, the performance of the dual link algorithm are compared with PWF and WMMSE algorithms under different channel conditions. In particular, FIG. 6 shows a comparison under a weak interference condition ($P_T=100$, $g_{l,l}=0$ dB, and $g_{l,k}=-10$ dB for $l \neq k$); FIG. 7 shows a comparison under a moderate interference condition ($P_T=100$, and $g_{l,k}=0$ dB, $\forall l, k$); and FIG. 8 shows a comparison under a strong interference condition ($P_T=100$, $g_{l,l}=0$ dB, and $g_{l,k}=10$dB for $l \neq k$).

Turning to FIG. 6, the PWF algorithm converges slightly faster than the dual link algorithm, and it is close to the stationary point in three iterations. The reason for this remarkable convergence is that under the weak interference condition, the channels in the network are close to parallel channels, and the PWF algorithm can converge to the optimal solution in half an iteration. The dual link algorithm exploits the polite water-filling structure and also exhibits a fast convergence. In contrast, the WMMSE algorithm's convergence under such a channel condition is significantly slower (e.g., more than ten iterations slower to reach some high value of the weighted sum-rate, particularly if a high numerical accuracy is desired).

When the gain of the interfering channels is comparable to that of the desired channel, as shown in FIG. 7, the difference in the convergence speed between the PWF and the dual link algorithm versus the WMMSE algorithm is less than that of the weak interference case. Still, the approximately five-iteration difference for some high value of the weighted sum-rate can still be significant. Under some strong interference conditions, as shown in FIG. 8, the PWF algorithm oscillates around certain points and no longer converges, while the other two algorithms still have the guaranteed convergence. The dual link algorithm still converges faster than the WMMSE algorithm and the difference is significant, particularly if a high value of the weighted sum-rate is desired. Even in the case that one is satisfied with smaller weighted sum-rate, being faster by a few iterations can be significant in distributed implementation where the overhead of each iteration costs significant signaling resources between the transmitters and the receivers.

Figure 8:
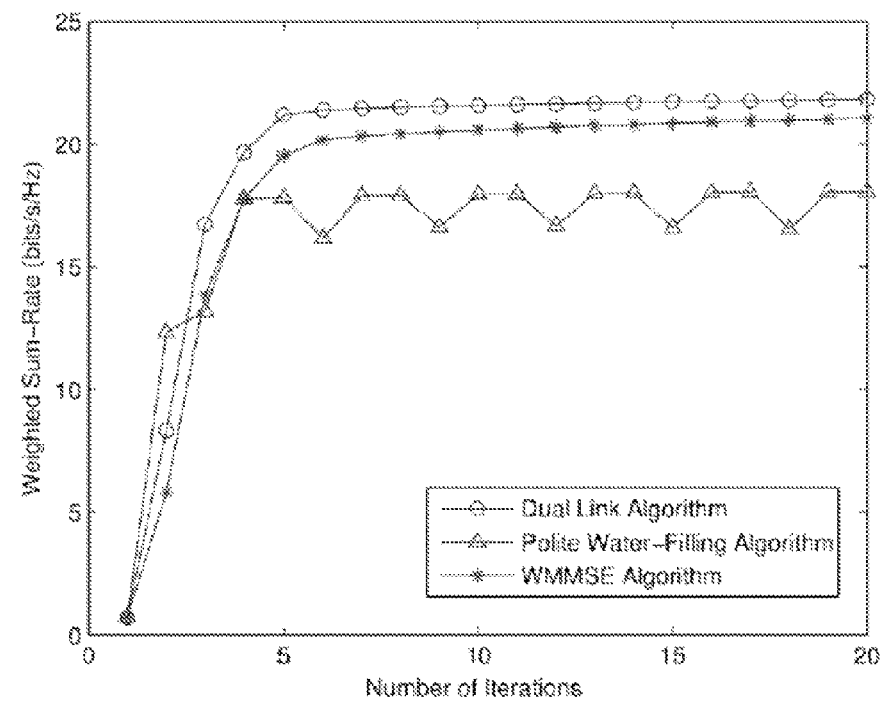
FIG. 8 shows a dual link convergence comparison under a strong interference condition.

Combining the three cases of FIGS. 6-8 together demonstrates that, while both algorithms are provably convergent, the dual link algorithm can outperform the WMMSE algorithm in all situations, especially in the weak interference case. Further, although the PWF algorithm can have better convergence over the dual link algorithm in some instances, it does not converge under certain strong interference channels, while the dual link algorithm still converges in such cases.

Figure 9:
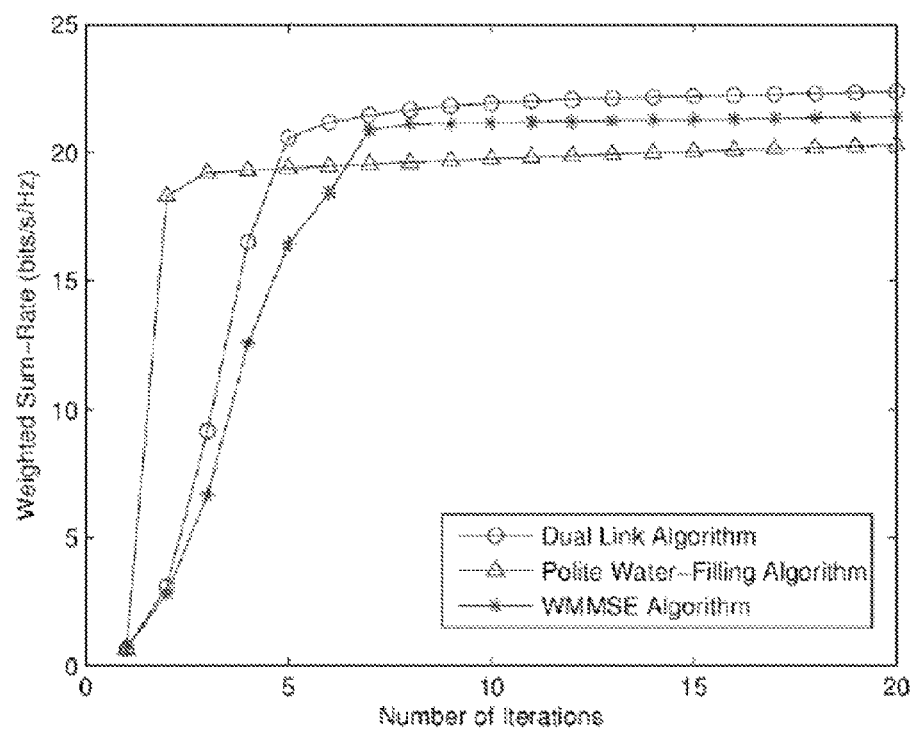
FIG. 9 shows convergence to different stationary points by different algorithms, including the dual link approach, given a common initial point.

It is noted that, given the same initial point, the three illustrated algorithms may converge to different stationary points, as shown in FIG. 9 ($P_T=100$, $g_{l,l}=0$ dB, and $g_{l,k}=10$dB for $l \neq k$). Since the original weighted sum-rate maximization problem is non-convex, a stationary point is not necessarily a global maximum. In some implementations, the dual link algorithm can be run multiple times, starting from different initial points, so that a stationary point can be selected to yield an optimum (e.g., the largest) weighted sum-rate.

Figure 10:
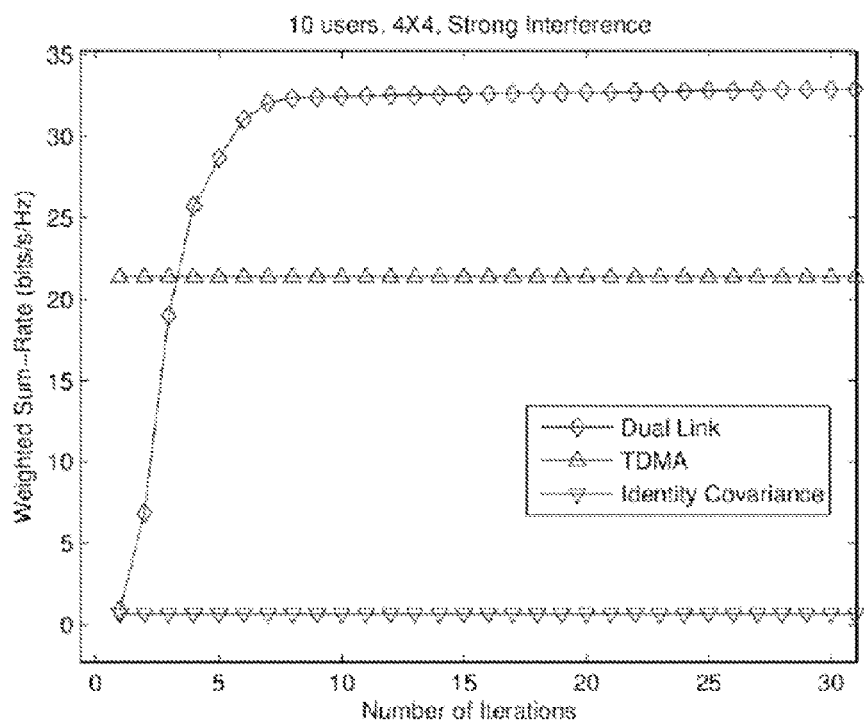
FIGS. 10 and 11 show strong and weak interference channel cases for a dual link approach implemented in an illustrative network, respectively, compare to traditional "identity covariance" and time-division multiple access (TDMA) approaches.
Figure 11:
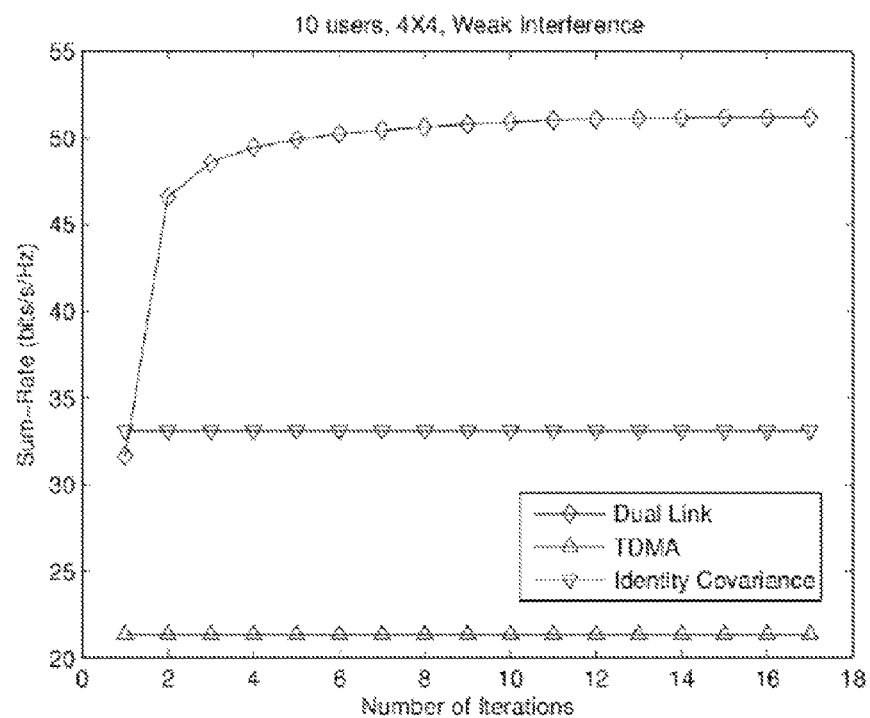

FIGS. 10-13 illustrate further illustrative features of the dual link approach. In general, some performance advantages of the dual link approach are as follows. First, in weak interference channels, the dual link approach can result in more than twice the throughput of an "identity covariance" type of network (e.g., where all links communicate simultaneously without accounting for interference) and 60% more throughput than that of a time-division multiple access (TDMA) network. In strong interference channels, the dual link approach can result in tens of times more throughput than that of the identity covariance case and 50% more throughput than that of the TDMA case. FIGS. 10 and 11 illustrate the strong and weak interference channel cases, respectively.

Figure 12:
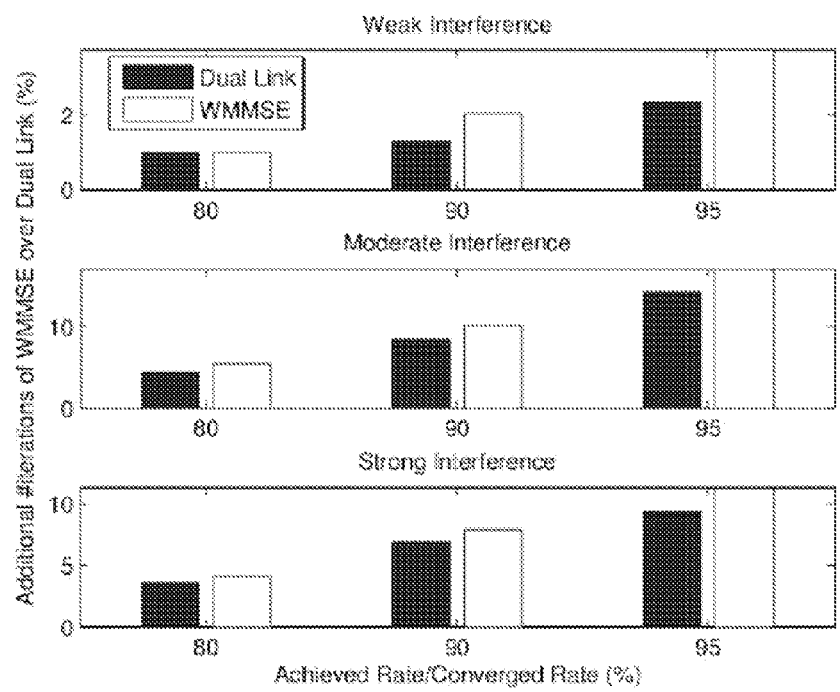
FIGS. 12 and 13 show performance comparisons between the dual link approach and a traditional weighted minimum mean square error (WMMSE) approach.
Figure 13:
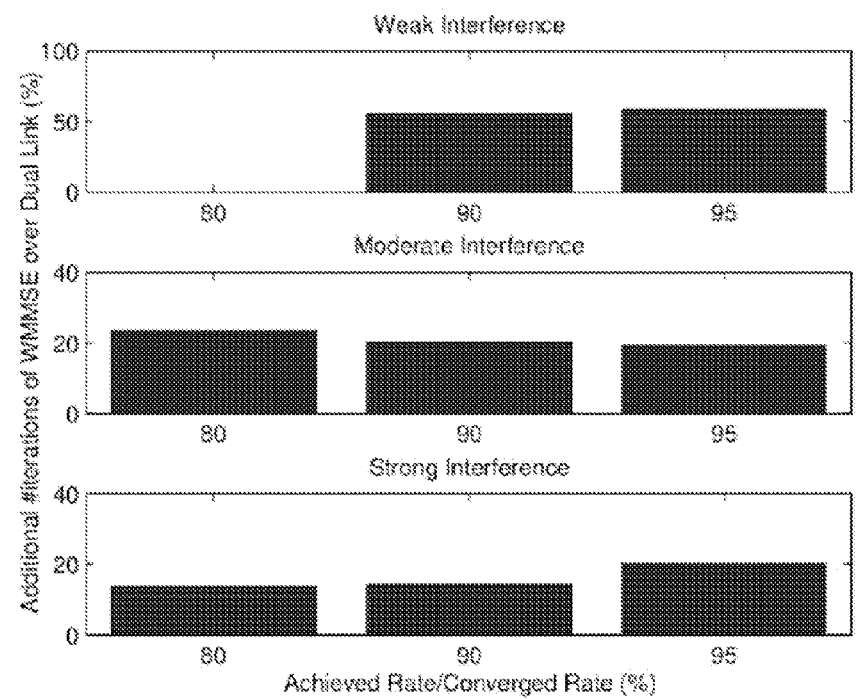

Another performance advantage is that the dual link approach can perform appreciably better than state-of-the-art approaches to weighted minimum mean square error (WMMSE). To achieve the same performance, WMMSE typically involves 20% to 50% more iterations, depending on how much throughput is desired, as shown in FIGS. 12 and 13. Using fewer iterations allows the dual link approach to accommodate faster channel variation. Yet another performance advantage is that the dual link approach can be readily implemented in a low complexity distributed fashion, making it suitable for the next iteration of wireless standards.

The simulation settings for FIGS. 10-13 can be similar to those described with reference to FIGS. 6-9. For example, an interference network has 10 data links among 10 transmitter-receiver pairs that fully interfere with each other. The direct channel gain $g_{l,l}$ is always 0 dB while the cross channel gain $g_{l,k}$, ($l \neq k$) is set to −10, 0 or 10 dB to represent weak, moderate or strong interference cases. The white noise has variance 1. Each transmitter or receiver has 4 antennas. The total transmit power of all pairs is $P_T=20$ dB. Each user's rate weight $w_l$ is chosen to be 1 for the sum-rate simulation. Notably, the dual link approach can use any weights, representing giving different priority to different users.

In some embodiments, a hybrid approach is used. For example, some implementations apply the PWF algorithm until monitoring of the system indicates that the weighted sum-rate has dropped (e.g., below a predetermined threshold), at which point such implementations can switch to the dual link algorithm for convergence to a stationary point. In this way, the hybrid algorithm can retain the PWF algorithm's fast convergence (e.g., at weaker interference levels), while also monotonically converging under stronger interference channel conditions where the PWF algorithm would otherwise tend to oscillate.

Having evaluated convergence properties of the dual link algorithm, it is further illustrative to analyze the complexity of each iteration for the dual link algorithm (e.g., in context of the PWF and WMMSE algorithms). Recall that L is the number of users or links, and for simplicity, assume that each user has N transmit (and receive) antennas, so that the resulting $\Sigma_l$ (and $\hat{\Sigma}_l$) is a N×N matrix. Using straightforward matrix multiplication and inversion, the complexity of these operations is $O(N^3)$. For the new algorithm, at each iteration, $\Omega_l$ incurs a complexity of $O(LN^3)$ and $\Omega_l + H_{l,l}\Sigma_l^{(n+1)}H_l$, $l^\dagger$ incurs a complexity of $O(LN^3)$. To obtain $\hat{\Sigma}_l$, we have to invert a N×N matrix, which incurs a complexity of $O(N^3)$. Therefore, the total complexity for calculating a $\hat{\Sigma}_l$ is given by $O(LN^3)$, and the complexity of generating $\hat{\Sigma}$ is given by $O(L^2N^3)$. As calculating $\Sigma$ incurs the same complexity as calculating $\hat{\Sigma}$, the complexity of the new algorithm is $O(L^2N^3)$ for each iteration. The computational complexity of each of the PWF and WMMSE algorithms is also $O(L^2N^3)$, so that all three algorithms have the same computational complexity per iteration if we use $O(N^3)$ matrix multiplication.

Having described the dual link approach and its respective cases, proofs, etc., the generalized iterative minimax approach can be described. Rather than using a single constraint (e.g., total power) as with the dual link approach, the iterative minimax approach allows for multiple linear constraints (e.g., an independent power constraint for each transmitter). To describe the iterative minimax approach, it is helpful to return to problems (7)-(13) described above, which illustrated, among other things, the minimax Lagrangian duality that gives rise to this novel weighted sum-rate maximization approach and helps establish its convergence properties.

Note that an optimum of the max-min problem (7)-(9) is a saddle point, and the first order condition (10)-(11) and its explicit solution (12)-(13) or part of them will give a saddle point, maximum, or minimum of Lagrangian L when certain subset of its variables is fixed and given. This motivates an iterative minimax algorithm to achieve an optimum, as follows.

Figure 23A:
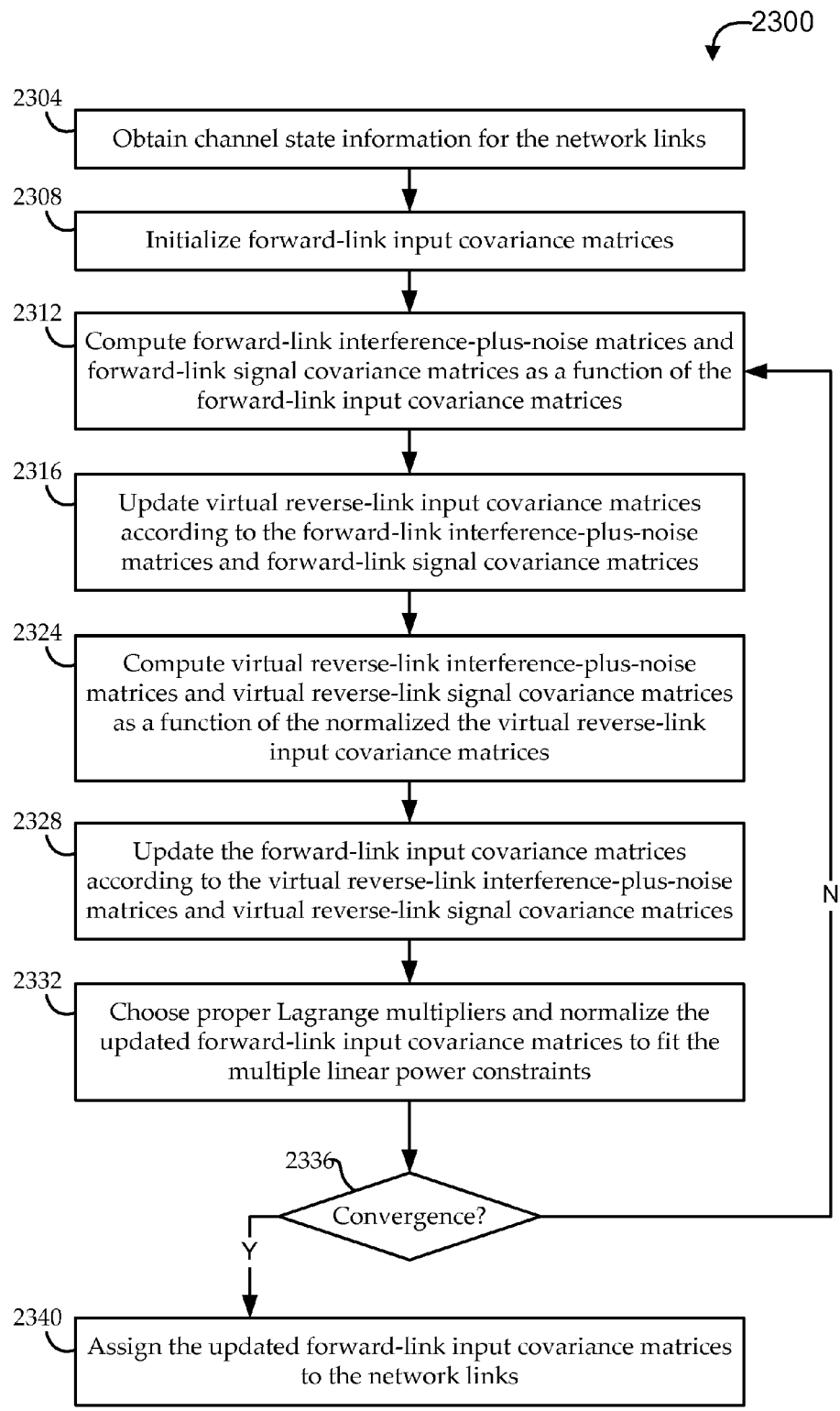
FIG. 23A shows a flow diagram of an illustrative method for applying a centralized iterative minimax approach to a communications network, according to various embodiments.

FIG. 23A shows a flow diagram of an illustrative method 2300 for applying a centralized iterative minimax approach to a communications network, according to various embodiments. A corresponding, illustrative algorithmic approach is shown in Table I below. Some "steps" of Table I are discussed along with the stages of the method 2300 for added clarity. It is noted that the steps of Table I generally involve relatively simple (fast, not computationally intensive) calculation.

TABLE I

THE ITERATIVE MINIMAX ALGORITHM

1) Initialize $\Sigma_l$, $l \in L$ such that
$\Sigma_{l \in L^s}$ Tr $(\Sigma_l Q_l^s) \leq 1$, $s \in S$
2) $\Omega_l \leftarrow I + \Sigma_{k \in L \setminus \{l\}} H_{lk} \Sigma_k H_{lk}^+$, $l \in L$
3) $\Lambda_l \leftarrow w_l ((\Omega_l)^{-1} - (\Omega_l + H_{ll}\Sigma_l H_{ll}^+)^{-1})$, $l \in L$ TABLE I-continued

THE ITERATIVE MINIMAX ALGORITHM

4) $\Phi_l \leftarrow \Sigma_{s \in S^j} \mu_s Q_l^s + \Sigma_{k \in L \setminus \{l\}} H_{kl}^+ \Lambda_k H_{kl}$, $l \in L$
5) $\hat{\Sigma}_l \leftarrow w_l ((\Phi_l)^{-1} - (\Phi_l + H_{ll}\Lambda_l H_{ll}^+)^{-1})$, $l \in L$
6) $T \leftarrow \{s \in S | \Sigma_{l \in L^s} $ Tr $(Q_l^s \hat{\Sigma}_l(\mu_{\bar{s}}^- = 0^+; \bar{s} \in S^j)) \geq 1\}$
7) $\mu_s \leftarrow 0$ if $s \in S \setminus T$
8) For $s \in T$, choose $\mu_s$ such that
$\Sigma_{l \in L^s}$ Tr $(Q_l^s \hat{\Sigma}_l(\mu_{\bar{s}}^-; \bar{s} \in S^j)) = 1$, $s \in T$
9) $\lambda \leftarrow \max_{s \in S} \Sigma_{l \in L^s}$ Tr$(\hat{\Sigma}_l Q_l^s)$ 10) $\Sigma_l \leftarrow \dfrac{\hat{\Sigma}_l}{\lambda}$, $l \in L$ 11) Go to 2)

Embodiments of the method 2300 begin at stage 2304 by obtaining channel state information for all the links. This can be done, for example, by sending pilot training sequences from transmitters to receivers and feeding back all the estimated channel matrices to the central controller. At stage 2308, an initial point can be selected for the optimization, as an initial forward-link signal communication model. This can be implemented as initializing a signal covariance matrix. This initial point can represent a random point, a corner case (e.g., all power being assigned to one of the transmitters), or any other suitable point (e.g., evenly distributed power to all transmitters, etc.). The forward-link signal communication model can represent how each transmitter will transmit (e.g., the amount of power, phase, etc.). For example, as shown in step 1 of Table I, implementations can start with given $\Sigma_l^n$, $l \in L$ that is feasible, i.e., $$\sum_{l \in L^s} Tr(\Sigma_l^n Q_l^s) \leq 1, s \in S,$$

as an initial condition for solving the optimization problem.

Implementations can then iterate to find an optimal point. For example, each iteration can begin at stage 2312, and the objective function value or weighted sum-rate (R') is calcuted from the initial $\Sigma_l$ generated at stage 2308. Each iteration can end at stage 2332, when an updated objective function value (R) is computed. The iterations can continue until a convergence criterion is met (e.g., |R-R'| is less than some threshold $\epsilon$), at stage 2336. Theoretically, the iteration can continue until the solution fully converges (i.e., there is no change from one iteration to the next). Practically, however, it can be desirable to stop iterating when less than a threshold change is experienced, which may occur very quickly and well before a full convergence.

In general, the iterative optimization steps can be described as follows. At stage 2312, forward-link interference-plus-noise matrices and forward-link signal covariance matrices can be computed as a function of the last-updated forward-link input covariance matrices (e.g., the initialized forward-link input covariance matrices from stage 2308 in the first iteration, and the normalized last-updated forward-link input covariance matrices in subsequent iterations). For example, as shown in step 2 of Table I, the present signal covariance matrix can be used to calculate a interference-plus-noise covariance matrix, such that $\Omega_l^n = I + \Sigma_{k \in L \setminus \{l\}} H_{lk} \Sigma_k^n H_{lk}^+$, $l \in L$.

At stage 2316, the forward-link properties can be used to compute virtual reverse-link properties; the present signal transmission model and calculated interference-plus-noise model for the forward links of the network can be used to calculate corresponding models for the virtual reverse links of the network. According to some centralized implementations, the reverse link network is a dual of the physically existing forward link network, and no physical signal is transmitted on the virtual reverse links. In particular, at stage 2316, the forward-link interference-plus-noise covariance matrices and the forward-link signal covariance matrices can be used to update virtual reverse-link input covariance matrices (e.g., representing a reverse-link signal communication model). At stage 2324, the normalized updated reverse-link input covariance matrices can be used to compute virtual reverse-link interference-plus-noise covariance matrices and virtual reverse-link input covariance matrices.

At stage 2328, the virtual reverse-link interference-plus-noise covariance matrices and the virtual reverse-link signal covariance matrices can be used to update the forward-link input covariance matrices. At stage 2332, proper Lagrange multipliers can be chosen and used to normalize the updated forward-link input covariance matrices to fit the multiple linear constraints. Some implementations can effectively use the interference-plus-noise model from stage 2324 to determine in which direction to move the signal communication model to improve on the solution to the objective function, and the normalization of stage 2328 to determine how far to move the model. For example, steps 3-5 of Table I demonstrate computation of the saddle point condition of the Lagrangian, involving various dual variables, to update the signal covariance matrix. In particular, by equation (11) the forward-link interference-plus-noise covariance matrix can give the condition for minimizing L over $\Omega_l$. $\Lambda_l^n \geq 0$ can be chosen, such that:

$$\Lambda_l^n = w_l((\Omega_l^n)^{-1} - (\Omega_l^n + H_{ll}\Sigma_l^n H_{ll}^+)^{-1}). \tag{39}$$

Therefore, for any $\Omega \geq 0$:

$$\mathcal{F}(\Sigma^n, \Omega^n) \leq \mathcal{L}(\Sigma^n, \Omega^n, \Lambda^n, \mu^n) \tag{40}$$
$$\leq \mathcal{L}(\Sigma^n, \Omega, \Lambda^n, \mu^n),$$

where $\mu^n \geq 0$ will be determined later. It is possible to define:

$$\Phi_l^n = \sum_{s \in S^l} \mu_s^n Q_l^s + \sum_{k \in L\setminus\{l\}} H_{kl}^+ \Lambda_k^n H_{kl}. \tag{41}$$

Note that $\Phi_l^n$ does not necessarily satisfy equation (10).

Given the above ($\Lambda_l^n$, $\Phi_l^n$) and $\mu^n$, by equations (12)-(13), ($\tilde{\Sigma}^{n+1}$, $\tilde{\Omega}^{n+1}$) can be chosen, such that:

$$\tilde{\Sigma}_l^{n+1} = w_l((\Phi_l^n)^{-1} - (\Phi_l^n + H_{ll}\Lambda_l^n H_{ll}^+)^{-1}). \tag{42}$$

$$\tilde{\Omega}_l^{n+1} = w_l H_{ll}(\Phi_l^n + H_{ll}\Lambda_l^n H_{ll}^+)^{-1} H_{ll}^+. \tag{43}$$

Plugging $\Omega = \tilde{\Omega}^{n+1}$ into inequality (40) can yield:

$$F(\Sigma^n, \Omega^n) \leq L(\Sigma^n, \tilde{\Omega}^{n+1}, \Lambda^n, \mu^n). \tag{44}$$

By the first order condition (10)-(11), ($\tilde{\Sigma}^{n+1}$, $\tilde{\Omega}^{n+1}$) is the saddle point of L($\Sigma$, $\Omega$, $\Lambda^n$, $\mu^n$). Thus, $$\mathcal{L}(\Sigma^n, \tilde{\Omega}^{n+1}, \Lambda^n, \mu^n) \leq \mathcal{L}(\tilde{\Sigma}^{n+1}, \tilde{\Omega}^{n+1}, \Lambda^n, \mu^n) \tag{45}$$
$$\leq L(\tilde{\Sigma}^{n+1}, \Omega, \Lambda^n, \mu^n)$$

for any $\Omega \geq 0$.

Notably, the updated signal communication model (e.g., signal covariance matrix) may not be feasible. For example, the result may indicate transmitters with negative power, etc. Accordingly, the normalization at stage 2332 can yield a feasible solution. Computation of the normalization factors can be seen generally in steps 6-9 of Table I, and are described more fully below. Notably, while the steps of Table I generally involve relatively simple calculation, step 8 can, in some instances, involve complicated computation. For example, computation of step 8 can involve solving sets of coupled equations when the subsets $L^s$, $s \in S$ overlap. However, in practice, it is expected that the subsets $L^s$, $s \in S$ seldom overlap. Further, even when overlap occurs, step 8 can typically be solved efficiently using, for example, the bisection search method.

To describe steps 6-9 more fully, it is noted that the matrix $\tilde{\Sigma}_l^{n+1}$ is a function of $\mu_s^n$, $s \in S^l$, denoted explicitly by $\tilde{\Sigma}_l^{n+1}(\mu_s^n; s \in S^l)$. The set T can be defined, such that:

$$T = \left\{ s \in S \,\middle|\, \sum_{l \in L^s} Tr(Q_l^s \tilde{\Sigma}_l^{n+1}(\mu_{\bar{s}}^n = 0^+; \bar{s} \in S^l)) \geq 1 \right\}.$$

For each $s \in S \setminus T$, $\mu_s^n$ can be set to 0. For those $s \in T$, $\mu_s^n$ can be chosen, such that:

$$\sum_{l \in L^s} Tr(Q_l^s \tilde{\Sigma}_l^{n+1}(\mu_{\bar{s}}^n; \bar{s} \in S^l)) = 1, s \in T. \tag{46}$$

Note that $Tr(\tilde{\Sigma}_l^{n+1}(\mu_s^n; s \in S^l))$ is decreasing in $\mu_s^n$, and there are |T| equations for |T| variables. So, there exists a solution to equation (46). With the choice of $\mu_s^n$, $s \in S$, it can be seen that:

$$\mu_s^n \left( 1 - \sum_{l \in L^s} Tr(\tilde{\Sigma}_l^{n+1} Q_l^s) \right) = 0. \tag{47}$$

The above is a complementary slackness condition (part of the KKT condition) that is required at an optimum, but implementations can enforce this condition at each iteration.

Next, let:

$$\lambda = \max_{s \in S} \sum_{l \in L^s} Tr(\tilde{\Sigma}_l^{n+1} Q_l^s).$$

It is apparent that $0 < \lambda \leq 1$. We then choose ($\Sigma_l^{n+1}$, $\Omega_l^{n+1}$) such that $$\Sigma_l^{n+1} = \frac{\tilde{\Sigma}_l^{n+1}}{\lambda}, \tag{48}$$

$$\Omega_l^{n+1} = I + \sum_{k \in L\setminus\{l\}} H_{lk} \Sigma_k^{n+1} H_{lk}^+. \tag{49}$$

Plugging $\tilde{\Sigma}^{n+1} = \lambda \Sigma^{n+1}$ and $\Omega = \lambda \Omega_l^{n+1}$ into the inequality (45) and combining with the inequality (44) can yield:

$$\mathcal{F}(\Sigma^n, \Omega^n) \leq \mathcal{L}(\lambda \Sigma^{n+1}, \lambda \Omega^{n+1}, \Lambda^n, \mu^n) \quad (50)$$

$$= \mathcal{F}(\Sigma^{n+1}, \Omega^{n+1}) + \sum_{l \in L}(\lambda - 1)\mathrm{Tr}(\Lambda_l^n) +$$

$$\sum_{s \in S} \mu_s^n \left(1 - \sum_{l \in L^s} \mathrm{Tr}(\tilde{\Sigma}_l^{n+1} Q_l^s)\right)$$

$$= \mathcal{F}(\Sigma^{n+1}, \Omega^{n+1}) + \sum_{l \in L}(\lambda - 1)\mathrm{Tr}(\Lambda_l^n) \leq$$

$$\mathcal{F}(\Sigma^{n+1}, \Omega^{n+1}),$$

where the second equality follows from equation (47) and the last inequality follows from the fact that $\lambda < 1$.

The normalized updated forward-link input covariance matrices can be used to compute the updated solution (R) to the objective function as part of stage 2332, or as part of the determination at stage 2336 as to whether the previous solution (R') differs from the updated solution (R) by less than a predetermined threshold amount. If so, embodiments can carry out another iteration of stages 2312-2336, based on the updated solution and the updated forward-link signal communication model. If it is determined at stage 2336 that the solution had adequately converged (e.g., that $|R-R'|<\epsilon$), embodiments can consider the solution to be optimal. At stage 2340, embodiments can send the last-updated forward-link signal communication model (i.e., the normalized last-updated forward-link input covariance matrices) to all the transmitters for use in setting their transmission characteristcs. For example, the last-updated forward-link signal covariance matrix can be used to compute a beam forming matrix, which can be multiplied by error encoded transmission data vectors at the transmitters to generate transmission signals.

Figure 23B:
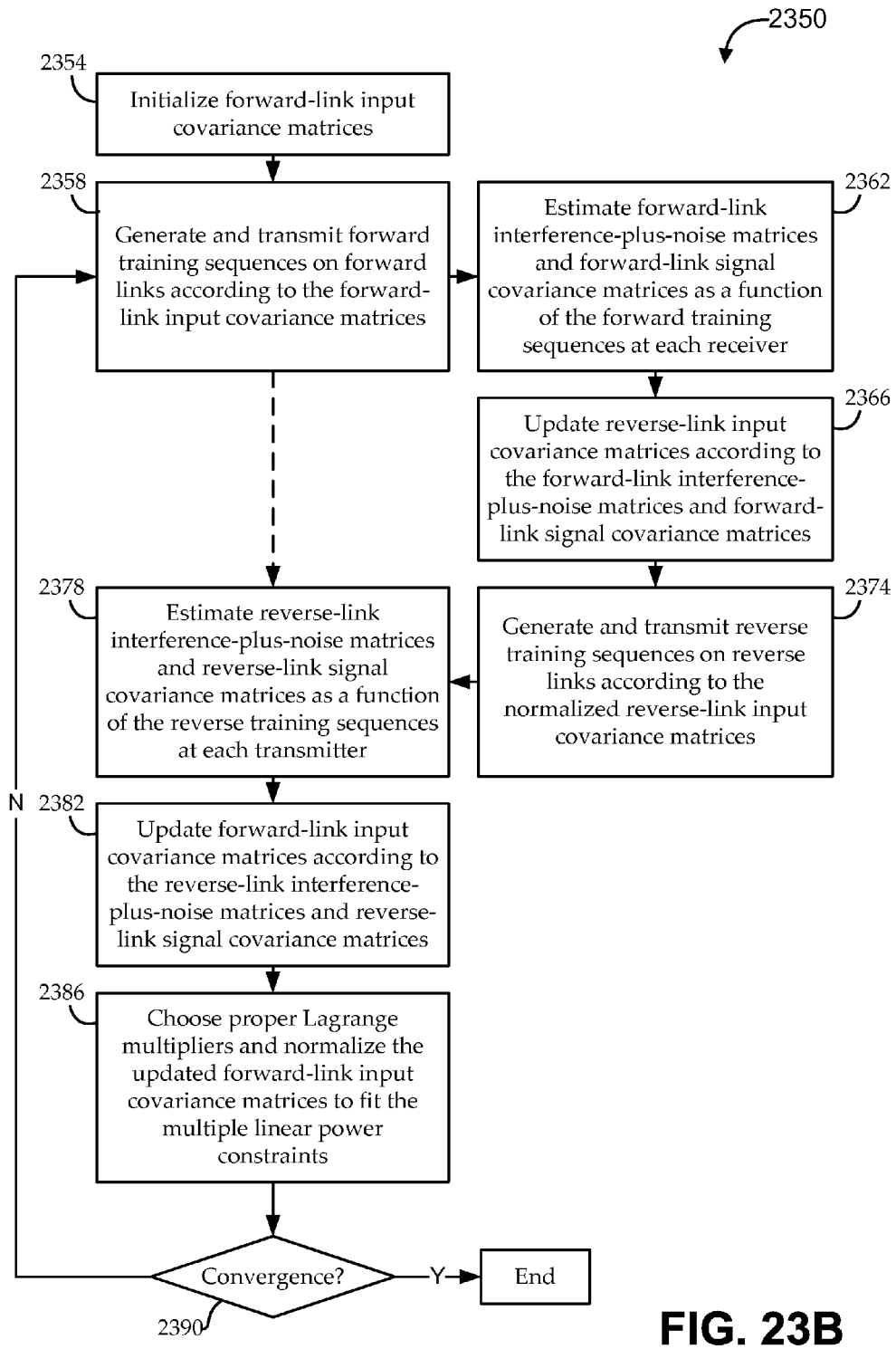
FIG. 23B shows a flow diagram of an illustrative method for applying a distributed iterative minimax approach to a communications network, according to various embodiments.

FIG. 23B shows a flow diagram of an illustrative method 2350 for applying a distributed iterative minimax approach to a communications network, according to various embodiments. As illustrated in FIG. 3, a distributed approach can be implemented without a central controller. Instead of feeding back all the channel information back to the central controller (as in stage 2304 of the method 2300 of FIG. 23A), and sending the calculated input covariance matrices to different transmitters (as in stage 2340 of the method 2300 of FIG. 23A), embodiments of the method 2350 of FIG. 23B can use properly designed forward-link and reverse-link training sequences to pass information between transmitters and receivers without matrix feedbacks and can run its iterations on the air.

At stage 2354, each transmitter initializes its own initial forward-link signal communication model in a manner that the total power constraint is satisfied. For example, L transmitters can each use Pt/L power when the total power constraint for these L transmitters is Pt. At stage 2358, each transmitter sends out a forward-link training sequence that contains information about its forward-link signal communication model.

At stage 2362, each receiver estimates its forward-link interference-plus-noise covariance matrix ($\Omega_l$) and forward-link signal covariance matrix ($H_l \Sigma_l H_l^\dagger$). For example, each transmitter can transmit random vector sequences that has covariance $H_l \Sigma_l H_l^\dagger$ at different time slots, and each receiver can listen to all the forward-link signal covariance matrices including its own. After all the transmitters finish their respective transmissions, every receiver can estimate its own $\Omega_l$ and $H_l \Sigma_l H_l^\dagger$.

Embodiments of the method 2350 proceed with stage 2366 in a similar fashion as described above with reference to stage 2316 of FIG. 23A. For example, once a receiver has estimated its $\Omega_l$ and $H_l \Sigma_l H_l^\dagger$, it can update its reverse-link input covariance matrices according to the estimated covariance matrices in stage 2366. At stage 2374, the receivers can generate and transmit reverse-link training sequences on their respective reverse links. A receiver's reverse-link training sequences can include information about its reverse-link signal communication model to the transmitters.

At stage 2378, the transmitters can estimate reverse-link interference-plus-noise covariance matrices and reverse-link signal covariance matrices according to the reverse-link training sequences. As in stages 2328 and 2332 of FIG. 23A, embodiments of the method 2350 can proceed at stages 2382 and 2386, respectively, to update and normalize the forward-link input covariance matrices as a function of the estimated reverse-link interference-plus-noise covariance matrices and reverse-link signal covariance matrices. In particular, at stage 2386, the normalization can involve choosing and applying proper Lagrange multipliers. A new objective function value R can be calculated and compared with the previous value R', and a determination can be made at stage 2390 as to whether the convergence criterion is met. If so, the method 2350 can end. If not, embodiments can return to stage 2358 for another iteration using the normalized last-updated forward-link input covariance matrices.

It is noted that the centralized and distributed approaches perform largely the same computations. If the number of users L in the interference network grows large, the distributed method 2350 can manifest significantly lower overhead then that of the centralized method 2300. This at least because the system resources used to feed back the channel matrices grows at $O(L^2)$, while the resources used for forward and reverse link training grows at $O(L)$.

Iterating the above approach can produce a monotone increasing sequence $\{F(\Sigma^n, \Omega^n)\}$, based on which it can be concluded that $(\Sigma^n, \Omega^n)$ converges to a saddle point of the max-min problem (7)-(9), and thus to an (local) optimum of the weighted sum-rate maximization (4)-(5). This iterative approach is referred to herein as the iterative minimax aproach. Unlike many existing algorithms, the iterative minimax algorithm is not a meta-algorithm that involves solving a large convex optimization problem at each iteration.

It is instructive to study the convergence properties of the iterative minimax algorithm. The following result is immediate ("Lemma 2"): Under the iterative minimax algorithm, the sequence $\{C^n = F(\Sigma^n, \Omega^n)\}$ converges to a limit point C*. This Lemma can be proven as follows. Since $F(\Sigma, \Omega)$ is a continuous function and its domain (specified by the constraints (8)-(9)) is a compact set, $C^n$ is bounded above. By inequality (50), the sequence $\{C^n\}$ is a monotone increasing sequence. Therefore, there exists a limit point C* such that $\lim_{n \to \infty} C^n = C^*$.

This can yield a theorem ("Theorem 4"): The iterative minimax algorithm converges to a saddle point $(\Sigma^*, \Omega^*)$ of the max-min problem (7)-(9); and $\Sigma^*$ is a (local) optimum of the weighted sum-rate maximization (4)-(5). Theorem 4 can be proven as follows. With Lemma 2, to show the convergence of the iterative minimax algorithm, it is enough to show that if $F(\Sigma^n, \Omega^n) = F(\Sigma^{n+1}, \Omega^{n+1})$, then $(\Sigma^n, \Omega^n) = (\Sigma^{n+1}, \Omega^{n+1})$:

Seen from the derivation of the inequality (50), if $F(\Sigma^n, \Omega^n) = F(\Sigma^{n+1}, \Omega^{n+1})$:

$$\mathcal{F}(\Sigma^n, \Omega^n) = \mathcal{L}(\Sigma^n, \Omega^n, \Lambda^n, \mu^n)$$
$$= \mathcal{L}(\Sigma^n, \tilde{\Omega}^{n+1}, \Lambda^n, \mu^n)$$
$$= \mathcal{L}(\tilde{\Sigma}^{n+1}, \tilde{\Omega}^{n+1}, \Lambda^n, \mu^n)$$
$$= \mathcal{L}(\Sigma^{n+1}, \Omega^{n+1}, \Lambda^n, \mu^n)$$
$$= \mathcal{F}(\Sigma^{n+1}, \Omega^{n+1}).$$

It follows that both $(\Sigma^n, \Omega^n, \Lambda^n, \mu^n)$ and $(\Sigma^{n+1}, \Omega^{n+1}, \Lambda^n, \mu^n)$ satisfy the KKT condition (the first order condition, the primal feasibility, the dual feasibility, and the complementary slackness) of the max-min problem (7)-(9), and, thus, both are saddle points of the max-min problem. Furthermore, for any given dual variables, the Lagrangian L is strictly concave in $\Sigma$. So, $\Sigma^n = \Sigma^{n+1}$, and $\Omega^n = \Omega^{n+1}$ follows. Therefore, the iterative minimax algorithm converges monotonically to a saddle point of the max-min problem (7)-(9). The second part of the theorem follows from the equivalence between the max-min problem and the weighted sum-rate maximization problem. It is notable that the iterative minimax algorithm converges fairly fast and can be implemented realtime. As each link knows its own power covariance matrix and can measure/estimate its interference-plus-noise covariance matrix, the algorithm admits a distributed implementation if used as a realtime algorithm (e.g., as described with reference to FIG. 3 above). It is further notable that the design and the convergence proof of the iterative minimax algorithm use only general convex analysis. They apply and extend to any max-min problems where the objective function is concave in the maximizing variables and convex in the minimizing variables and the constraints are convex, and thus provide a general class of algorithms for such optimization problems.

For the sake of illustration, two typical cases are discussed, along with their corresponding iterative minimax approaches. The first case is a network having a total power constraint. For example, this case can be similar to the cases discussed above with reference to the dual link approach. Here, $|S|=1$, and $$Q_l^s = \frac{1}{P_T} I$$

with $P_T$ the total power budget. The matrix $\tilde{\Sigma}_l$ can be a function of $\mu$, the dual variable associated with the total power constraint. The iterative minimax approach (e.g., the steps shown in FIG. 24) can reduce to the approach shown in Table II below.

TABLE II

THE ITERATIVE MINIMAX ALGORITHM
FOR THE NETWORK WITH THE
TOTAL POWER CONSTRAINT

| | |
|---|---|
| 1) | Initialize $\Sigma_l, l \in L$ such that $\Sigma_{l \in L} \mathrm{Tr}\left(\frac{\Sigma_l}{P_T}\right) \leq 1$ |
| 2) | $\Omega_l \leftarrow I + \Sigma_{k \in L \setminus \{l\}} H_{lk} \Sigma_k H_{lk}^+, l \in L$ |
| 3) | $\Lambda_l \leftarrow w_l ((\Omega_l)^{-1} - (\Omega_l + H_{ll} \Sigma_l H_{ll}^+)^{-1}), l \in L$ |
| 4) | $\Phi_l \leftarrow \mu I + \Sigma_{k \in L \setminus \{l\}} H_{kl}^+ \Lambda_k H_{kl}, l \in L$ |

TABLE II-continued

THE ITERATIVE MINIMAX ALGORITHM
FOR THE NETWORK WITH THE
TOTAL POWER CONSTRAINT

| | |
|---|---|
| 5) | $\tilde{\Sigma}_l \leftarrow w_l ((\Phi_l)^{-1} - (\Phi_l + H_{ll} \Lambda_l H_{ll}^+)^{-1}), l \in L$ |
| 6) | $\mu \leftarrow 0$ if $\Sigma_{l \in L} \mathrm{Tr}\left(\frac{\tilde{\Sigma}_l(0^+)}{P_T}\right) < 1$; otherwise, choose $\mu$ such that $\Sigma_{l \in L} \mathrm{Tr}\left(\frac{\tilde{\Sigma}_l(\mu)}{P_T}\right) = 1$ |
| 7) | $\lambda \leftarrow \Sigma_{l \in L} \mathrm{Tr}\left(\frac{\tilde{\Sigma}_l}{P_T}\right)$ |
| 8) | $\Sigma_l \leftarrow \frac{\tilde{\Sigma}_l}{\lambda}, l \in L$ |
| 9) | Go to 2) |

It is noted that the dual link approach described above uses the fact that the total power constraint is tight at an optimum, and normalizes $\mu$ such that $$\sum_{l \in L} Tr\left(\frac{\mu}{P_T} \tilde{\Sigma}_l\right) = 1,$$

i.e., the algorithm enforces the tightness of the total power constraint at the initial point and each iteration. In contrast, steps of Table II enforce the complementary slackness condition at each iteration and can start with any feasible $\Sigma$. Moreover, the reduced iterative dual link approach shown in Table II can offer additional insight over the dual link approach on algorithm design for networks having general linear power covariance matrix constraints.

The second illustrative case is a network having per-link power constraints. Here, the set S=L, and $$Q_l^s = \frac{1}{P_T} I$$

with $P_l$ me power Puaget at each link $l \in L$. The matrix $\tilde{\Sigma}_l$ defined above is a function the dual variable associated with the power constraint at link l. The iterative minimax approach (e.g., the steps of FIG. 24) can reduce to the approach shown in Table III below.

TABLE III

THE ITERATIVE MINIMAX ALGORITHM
FOR THE NETWORK WITH THE
PER-LINK POWER CONSTRAINTS

| | |
|---|---|
| 1) | Initialize $\Sigma_l, l \in L$ such that $\mathrm{Tr}\left(\frac{\Sigma_l}{P_T}\right) \leq 1$ |
| 2) | $\Omega_l \leftarrow I + \Sigma_{k \in L \setminus \{l\}} H_{lk} \Sigma_k H_{lk}^+, l \in L$ |
| 3) | $\Lambda_l \leftarrow w_l ((\Omega_l)^{-1} - (\Omega_l + H_{ll} \Sigma_l H_{ll}^+)^{-1}), l \in L$ |
| 4) | $\Phi_l \leftarrow \mu I + \Sigma_{k \in L \setminus \{l\}} H_{kl}^+ \Lambda_k H_{kl}, l \in L$ |
| 5) | $\tilde{\Sigma}_l \leftarrow w_l ((\Phi_l)^{-1} - (\Phi_l + H_{ll} \Lambda_l H_{ll}^+)^{-1}), l \in L$ |

TABLE III-continued

THE ITERATIVE MINIMAX ALGORITHM
FOR THE NETWORK WITH THE
PER-LINK POWER CONSTRAINTS

6) $\mu_l \leftarrow 0$ if $\text{Tr}\left(\frac{\bar{\Sigma}_l(0^+)}{P_l}\right) < 1;$ otherwise, choose $\mu_l$ such that $\text{Tr}\left(\frac{\bar{\Sigma}_l(\mu_l)}{P_l}\right) = 1$ 7) $\lambda \leftarrow \max_{l \in L} \text{Tr}\left(\frac{\Sigma_l}{P_T}\right)$ 8) $\Sigma_l \leftarrow \frac{\Sigma_l}{\lambda}, l \in L$ 9) Go to 2)

Several numerical examples are provided to complement the analysis above. Consider a network where each link is equipped with 3 (4) antennas at its transmitter (receiver), and the channel matrices have zero-mean, unit-variance, independent and identically distributed, complex Gaussian entries. The examples consider and compare networks having low, moderate, and high interference, which are characterized by scaling the interference channel matrices $H_{ij}$, $i \neq j$ with a factor of 0.1, 1, and 5 respectively. The weights $w_l$'s are uniformly drawn from [0.5, 1].

Implementing the iterative minimax approach can be straightforward, involving only basic matrix operations, except for finding $\mu$ (for which a bisection search method is used). This is different from many other algorithms that involve additional problem parsers, or use the interior point method, which are often hard to implement in practical applications.

Figure 14:
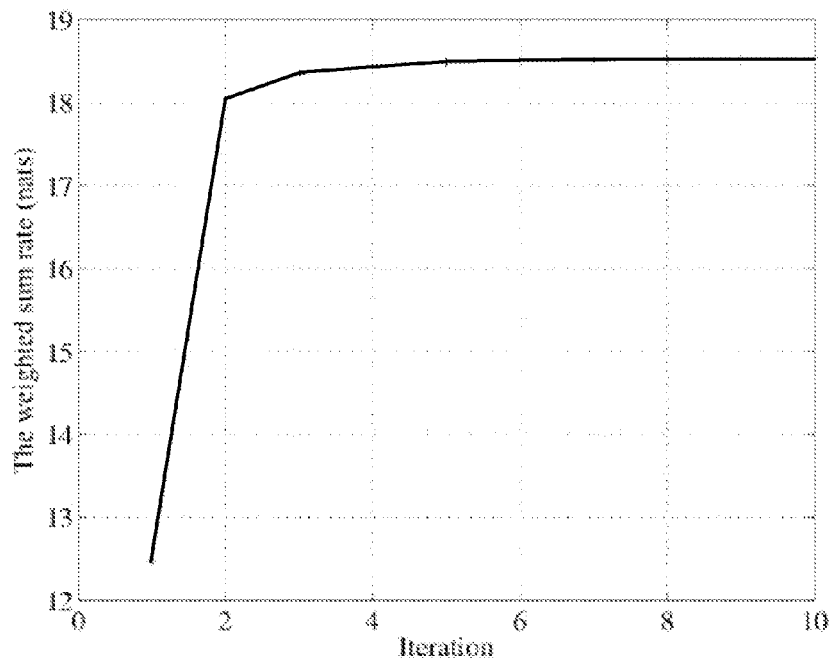
FIGS. 14-16 show monotonic convergence of a reduced iterative minimax approach in a particular illustrative network with total power constraint for cases where the interferences are low, moderate and high, respectively.
Figure 15:
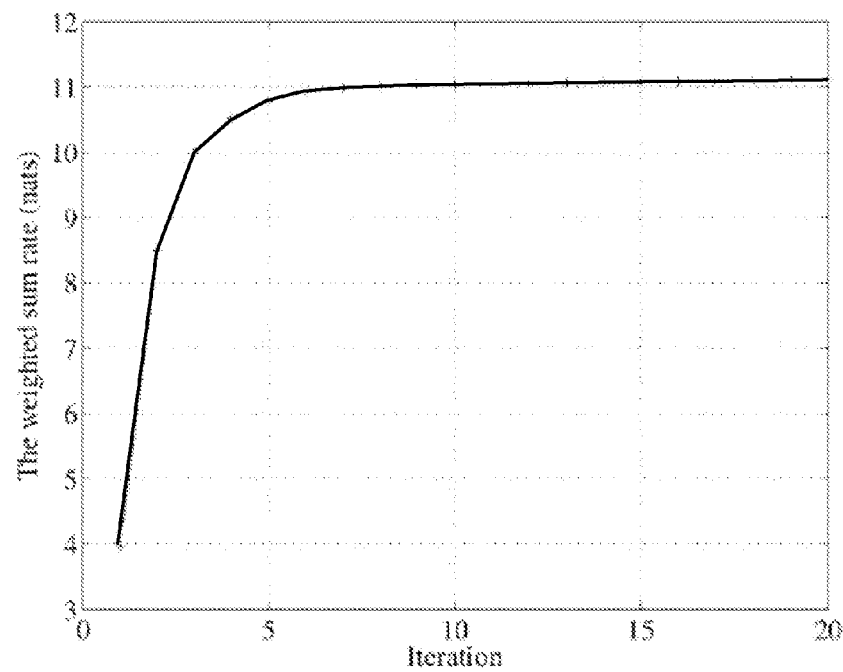
Figure 16:
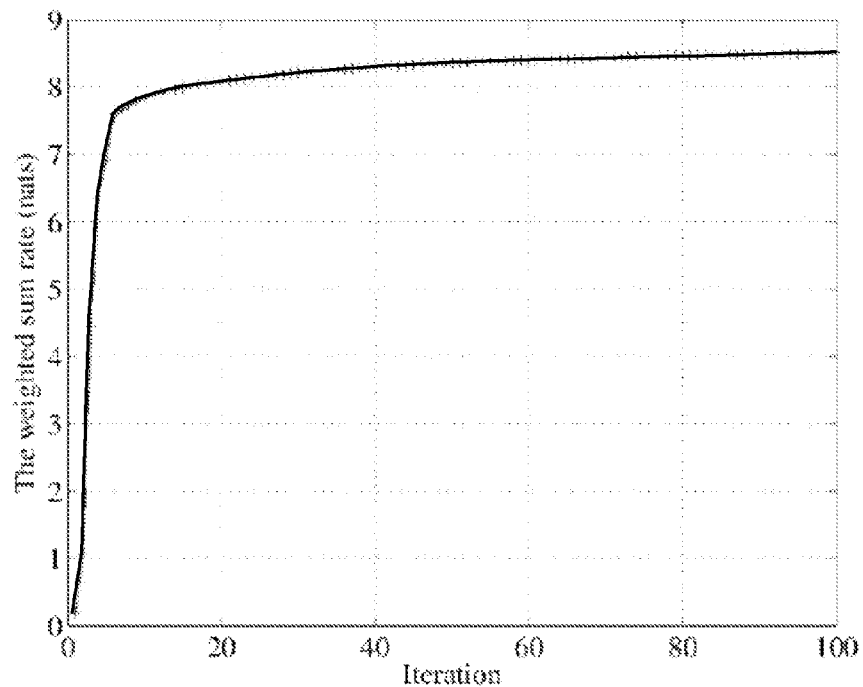

In the numerical contex described above, the approach of Table II can be applied to an illustrative network with |L|=10 interfering links and a total power constraint $P_T$=10 (i.e., the network is optimized to a total power constraint). FIGS. 14-16 show the monotonic convergence of the reduced iterative minimax approach of Table II in such a network. Overall, the approach shows very fast convergence, and the convergence speed depends on the strength of interference. As the interference becomes stronger, the weighted sum-rate becomes highly non-convex, which tends to increase the intrinsic difficulty of the problem and slows the convergence.

Figure 17:
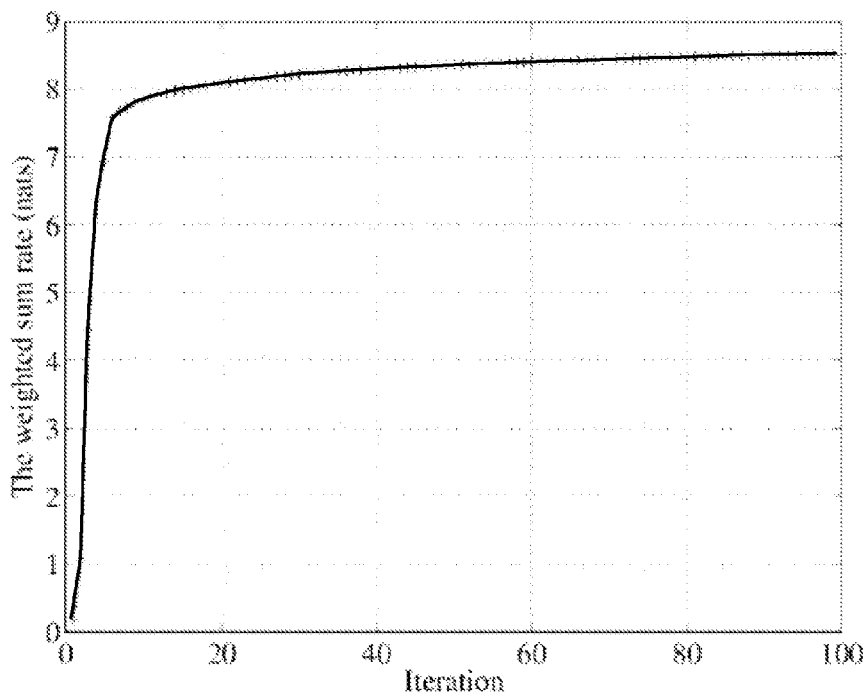
FIGS. 17-19 show the monotonic convergence of reduced iterative minimax approach in a particular illustrative network with per-link power constraints for cases where the interferences are low, moderate and high, respectively.
Figure 18:
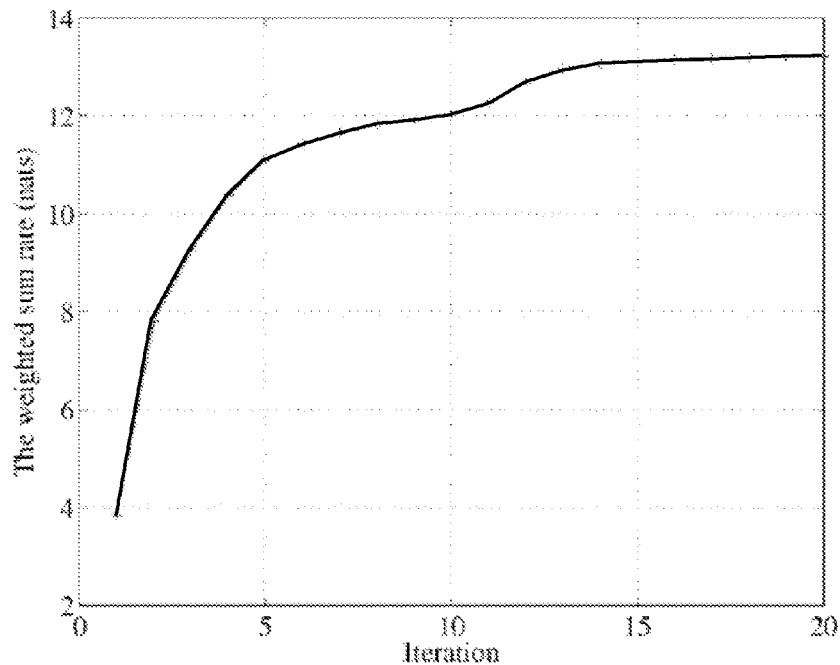
Figure 19:
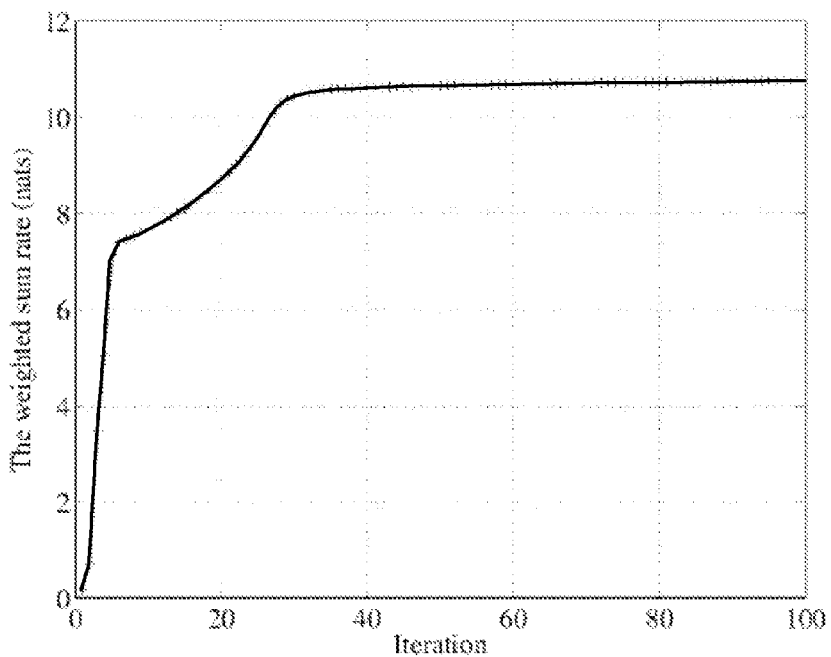

Again, in the numerical contex described above, the approach of Table III can be applied to an illustrative network with |L|=10 interfering links and per-link power constraints where $P_l$'s are uniformly drawn from {1, 2, . . . , 10} (i.e., the network is optimized to multiple linear constraints). FIGS. 17-19 show the monotonic convergence of the reduced iterative minimax approach of Table III in such a network. Again, increased interference strength tends to slow convergence onto a solution; but, overall, the approach shows fast convergence.

As yet another numberical example, results are presented for applying the iterative minimax approach (e.g., the non-reduced approach shown in Table I) to a network with |L|=30 interfering links (i.e., the network serves the 30 links or users simultaneously), without using any time, frequency, or code multiplexing. These links are partitioned into five groups: S={{1 }, {2}, {3, . . . , 7}, {8, . . . , 20}, {21, . . . , 30}}. These different groups of links can be viewed as being served by different "cells." Cases can be considered with different combinations of intra-cell interference (i.e., interference between the links within a cell) and inter-cell interference (i.e., interference between the links of different cells). The power constraint matrix $Q_l^s$ is set to the (scaled) identity matrix without loss of generality, and the power budget of each cell is randomly drawn from {1, . . . , 10} and then post-multiplied by the cardinality of the cell.

Figure 20:
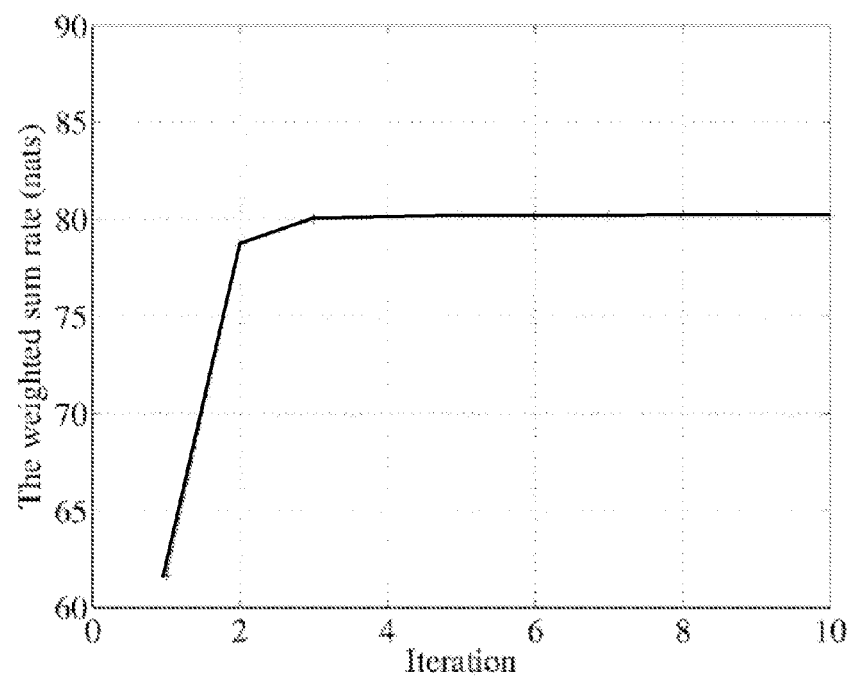
FIGS. 20-22 show an iterative minimax approach in a particular illustrative network with general multi-linear constraints for cases where the intra-cell interference—inter-cell interference are low—low, moderate—low, and high—moderate, respectively.
Figure 21:
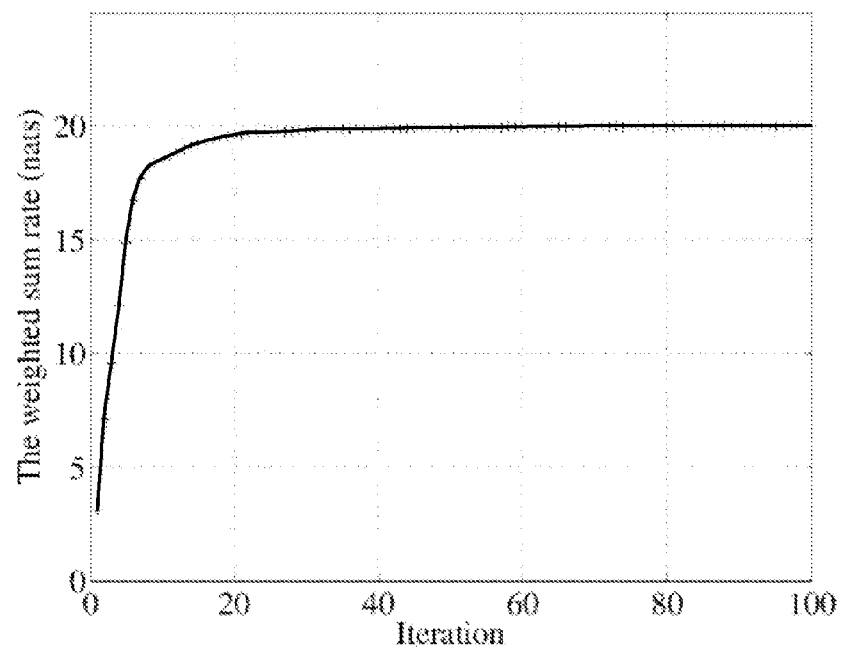
Figure 22:
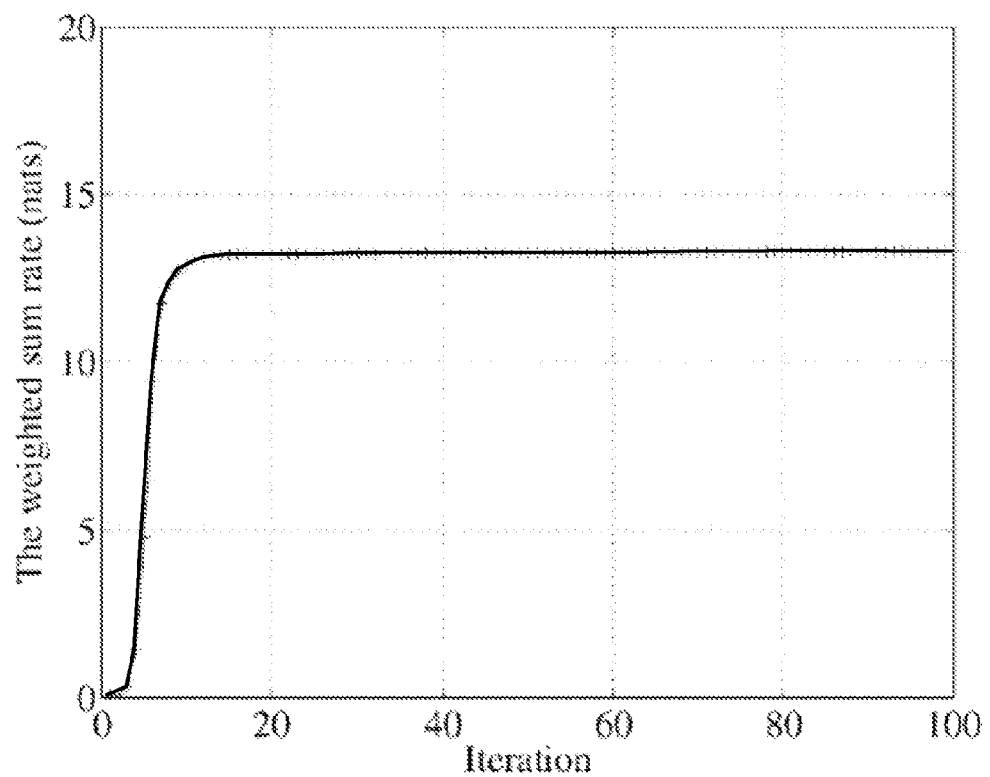

FIGS. 20-22 show the monotonic convergence of the iterative minimax approach iterative minimax approach of FIG. 23 for cases where the intra-cell interference—inter-cell interference are low—low, moderate—low, and high—moderate, respectively. Again, the algorithm shows fast convergence.

It is notable that the numerical experiments described above draw parameters, such as power budgets for the network, randomly for each run of the simulation. So, the sum-rate achieved for specific examples may not appear proportional to the network size. For example, compared to FIGS. 18 and 19 of the 10-link network, FIGS. 21 and 22 of the 30-link network show a much lower rate per-link. This is because examples shown in FIGS. 21 and 22 happen to have appreciably lower aggregate power.

The above the monotonic convergence of the iterative minimax algorithm has been evaluated in terms of the number of iterations. It can be further analyzed in terms of complexity of each iteration. Recall that L is the number of data links, and for simplicity, assume that each link has N transmit (and receive) antennas, so the resulting $\Sigma_l$ is an N×N matrix. Suppose that we use the straightforward matrix multiplication and inversion, then the complexity of these operations are $O(N^3)$. In each iteration, $\Omega_l$ incurs a complexity of $O(LN^3)$, and so does $\Omega_l + H_{l,l} \Sigma_l^{(n+1)} H_{l,l}^+$. Furthermore, $\Phi_l$ incurs a complexity of $O(LN^3)$, and so do $\tilde{\Sigma}_l$ and $\Sigma_l$. Since L of these operations are performed, the total complexity is $O(L^2N^3)$. If we use faster matrix multiplication (e.g., some approaches have been shown to have a complexity of $O(N^{2.3727})$), the computational complexity at each iteration can be reduced to $O(L^2N^{2.3727})$.

The methods disclosed herein include one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method of link optimization in a multi-user communications network having a plurality of transmitter-receiver communications links that are mutually interfering, the method comprising:

initializing a forward-link signal communication model that represents transmit characteristics of a plurality of forward-link transmitters of the communications network;

computing an initial solution to an optimization problem having at least one power constraint corresponding to the transmitters as a function of the initialized forward-link signal communication model; and converging on an optimal solution to the optimization problem by iterating, until an updated solution to the optimization problem satisfies a predetermined convergence criterion, steps comprising:

computing a forward-link interference model as a function of the forward-link signal communication model;

updating a reverse-link signal communication model according to the forward-link interference model;

computing a reverse-link interference model as a function of the updated reverse-link signal communication model;

updating the forward-link signal communication model according to the reverse-link interference model;

normalizing the updated forward-link signal communication model to fit the at least one power constraint; and computing the updated solution to the optimization problem as a function of the normalized updated forward-link signal communication model.

2. The method of claim 1, wherein the optimization problem is a weighted sum-rate maximization objective function constrained by a total power constraint across all the transmitters of the communications network.

3. The method of claim 2, further comprising:

subsequent to updating the reverse-link signal communication model, normalizing the reverse-link signal communication model to fit the total power constraint, wherein the normalizing the updated forward-link signal communication model is to fit the total power constraint.

4. The method of claim 1, wherein the optimization problem is a weighted sum-rate maximization objective function constrained by multiple linear constraints, each associated with at least one of the transmitters of the communications network.

5. The method of claim 4, wherein the normalizing the updated forward-link signal communication model is to fit the multiple linear constraints.

6. The method of claim 4, wherein the normalizing the updated forward-link signal communication model comprises selecting Langrange multipliers that fit the multiple linear constraints such that the computed updated solution is feasible.

7. The method of claim 1, wherein the updated solution to the optimization problem satisfies the predetermined convergence criterion when the updated solution as computed during an iteration N differs from the updated solution as computed during an iteration N-1 by less than a predetermined threshold amount.

8. The method of claim 1, wherein the updated solution to the optimization problem satisfies the predetermined convergence criterion when the updated solution as computed during an iteration N is substantially equivalent to the updated solution as computed during an iteration N-1.

9. The method of claim 1, further comprising:

obtaining, by a centralized transmit controller, channel state information for the plurality of transmitter-receiver communications links, wherein the initial solution is computed further as a function of the channel state information.

10. The method of claim 1, further comprising:
subsequent to converging on the optimal solution, assigning the normalized updated forward-link signal communication model to the transmitters by a centralized transmit controller.

11. The method of claim 1, further comprising:
subsequent to initializing the forward-link signal communication model, generating forward training sequences by the transmitters indicating forward-link channel state information, and communicating the forward training sequences from the transmitters to a plurality of receivers,
wherein computing the forward-link interference model comprises estimating the forward-link interference model by the receivers according to the forward training sequences; and
subsequent to updating the reverse-link signal communication model, generating reverse training sequences by the receivers indicating reverse-link channel state information, and communicating the reverse training sequences from the receivers to the transmitters,
wherein computing the reverse-link interference model comprises estimating the reverse-link interference model by the transmitters according to the reverse training sequences.

12. The method of claim 1, wherein initializing the forward-link signal communication model comprises:
initializing a signal covariance matrix as $\Sigma \ln$, $l \in L$ that is feasible.

13. The method of claim 1, wherein computing the forward-link interference model as a function of the forward-link signal communication model comprises:
calculating an interference-plus-noise covariance matrix, such that $\Omega \ln = I + \Sigma k \in L \backslash \{l\} H l k \Sigma k n H l k +$, $l \in L$,
wherein H represents a forward-link channel state matrix, $\Sigma$ represents a forward-link signal covariance matrix, and L represents a set of the transmitter-receiver communications links.

14. The method of claim 13, wherein:
the optimization problem is a weighted sum-rate maximization objective function;
computing the reverse-link interference model comprises calculating a reverse-link interference-plus-noise covariance matrix $\Omega l$; and
computing the updated solution to the optimization problem comprises reformulating the weighted sum-rate maximization objective function as an equivalent max-min problem by treating the reverse-link interference-plus-noise covariance matrix as a constraint, and minimizing L over $\Omega l$, wherein L is the Lagrangian of the equivalent max-min optimization.

15. The method of claim 1, wherein each transmitter of the communications network corresponds to an antenna.

16. A communications system comprising:
a transmit controller; and
a non-transient storage medium having instructions stored thereon, which, when executed, cause the transmit controller to:
initialize a forward-link signal communication model that represents transmit characteristics of a plurality of forward-link transmitters of the communications network;
compute an initial solution to an optimization problem having at least one power constraint corresponding to the transmitters as a function of the initialized forward-link signal communication model; and
converge on an optimal solution to the optimization problem by iterating, until an updated solution to the optimization problem satisfies a predetermined convergence criterion, steps comprising:
compute a forward-link interference model as a function of the forward-link signal communication model;
update a reverse-link signal communication model according to the forward-link interference model;
compute a reverse-link interference model as a function of the updated reverse-link signal communication model;
update the forward-link signal communication model according to the reverse-link interference model;
normalize the updated forward-link signal communication model to fit the at least one power constraint; and
compute the updated solution to the optimization problem as a function of the normalized updated forward-link signal communication model; and
assigning the normalized updated forward-link signal communication model to the transmitters subsequent to converging on the optimal solution.

17. The system of claim 16, wherein the instructions further cause the transmit controller to:
obtain channel state information for a plurality of transmitter-receiver communications links,
wherein the initial solution is computed further as a function of the channel state information.

18. The system of claim 16, wherein the at least one power constrint is either a total power constraint across all the transmitters or a plurality of linear power constraints each associated with at least one of the transmitters.

19. A communications system comprising:
a plurality of transmitters, each disposed to:
initialize a forward-link signal communication model that represents transmit characteristics of a plurality of forward-link transmitters of the communications network;
compute an initial solution to an optimization problem having at least one power constraint corresponding to the transmitters as a function of the initialized forward-link signal communication model; and
converge on an optimal solution to the optimization problem by iterating, until an updated solution to the optimization problem satisfies a predetermined convergence criterion, steps comprising:
generate a forward training sequence indicating forward-link channel state information of the transmitter;
communicating the forward training sequence to at least one of a plurality of receivers;
receive a reverse training sequence indicating the respective reverse-link channel state information of the at least one receiver, the reverse training sequence generated at the at least one receiver by estimating a forward-link interference model as a function of the forward training sequence, and updating a reverse-link signal communication model according to the forward-link interference model, the reverse training sequence generated according to the updated reverse-link signal communication model;
estimate a reverse-link interference model as a function of the reverse training sequence;
update the forward-link signal communication model according to the reverse-link interference model;
normalize the updated forward-link signal communication model to fit the at least one power constraint; and
compute the updated solution to the optimization problem as a function of the normalized updated forward-link signal communication model.

20. The communications system of claim 19, further comprising:
 a plurality of receivers, each disposed to:
 receive at least one forward training sequence from at least one of the transmitters;
 estimate a forward-link interference model as a function of the at least one forward training sequence;
 update a reverse-link signal communication model according to the forward-link interference model;
 generate the reverse training sequence according to the updated reverse-link signal communication model; and
 communicate the reverse training sequence to the at least one of the transmitters.

\* \* \* \* \*

UNITED STATES PATENT AND TRADEMARK OFFICE
CERTIFICATE OF CORRECTION

PATENT NO. : 9,538,483 B2
APPLICATION NO. : 14/488028
DATED : January 3, 2017
INVENTOR(S) : Lijun Chen, Xing Li and Youjian Liu It is certified that error appears in the above-identified patent and that said Letters Patent is hereby corrected as shown below:

In the Specification

Column 4, Line 9, delete "usesmore" and insert therefor --uses more--.

Column 4, Line 22, delete "opeate" and insert therefor --operate--.

Column 4, Line 24, delete "interfefrence" and insert therefor --interference--.

Column 4, Line 26, delete "opeate" and insert therefor --operate--.

Column 4, Line 32, delete "Embodiemnts" and insert therefor --Embodiments--.

Column 4, Line 40, delete "Varous" and insert therefor --Various--.

Column 4, Line 54, delete "noice" and insert therefor --noise--.

Column 5, Line 58, delete "tpically" and insert therefor --typically--.

Column 7, Line 35, delete "intelligiently" and insert therefor --intelligently--.

Column 7, Line 38, delete "wegithed" and insert therefor --weighted--.

Column 7, Line 41, delete "of of" and insert therefor --of--.

Column 8, Line 34, delete "emdodiments" and insert therefor --embodiments--.

Column 8, Line 40, delete "facilicate" and insert therefor --facilitate--.

Column 11, Line 33, delete "transmisters" and insert therefor --transmitters--.

Signed and Sealed this
Sixth Day of June, 2017

Michelle K. Lee
*Director of the United States Patent and Trademark Office*

CERTIFICATE OF CORRECTION (continued)
U.S. Pat. No. 9,538,483 B2

Column 23, Line 66, delete "Varous" and insert therefor --Various--.

Column 28, Line 1, delete "calcuted" and insert therefor --calculated--.

Column 29, Line 1, delete "characterstcs" and insert therefor --characteristics--.

Column 29, Line 22, delete "transmiters" and insert therefor --transmitters--.

Column 29, Line 23, delete "transmiters" and insert therefor --transmitters--.

Column 29, Line 39, delete "oce" and insert therefor --once--.

Column 30, Line 5, delete "illiustrative" and insert therefor --illustrative--.

Column 31, Line 49, delete "approch" and insert therefor --approach--.

Column 33, Line 2, delete "yeild" and insert therefor --yield--.

Column 38, Line 41, delete "calcuted" and insert therefor --calculated--.

Column 41, Line 34, delete "characterstcs" and insert therefor --characteristics--.

Column 41, Line 57, delete "transmiters" and insert therefor --transmitters--.

Column 41, Line 58, delete "transmiters" and insert therefor --transmitters--.

Column 42, Line 46, delete "aproach" and insert therefor --approach--.

Column 45, Line 62, delete "numberical" and insert therefor --numerical--.

In the Claims

Column 50, Line 28, delete "constrint" and insert therefor --constraint--.